US012548407B2

(12) United States Patent
Lockheed

(10) Patent No.: US 12,548,407 B2
(45) Date of Patent: Feb. 10, 2026

(54) GUI FOR FEATURE GAME WITH HOLD-AND-SPIN FUNCTIONALITY AND ROAMING SELECTED SYMBOL POSITIONS

(71) Applicant: Aristocrat Technologies, Inc., Las Vegas, NV (US)

(72) Inventor: Kelly Lockheed, Elkridge, MD (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 369 days.

(21) Appl. No.: 18/320,880

(22) Filed: May 19, 2023

(65) Prior Publication Data

US 2024/0386780 A1 Nov. 21, 2024

(51) Int. Cl.
*G07F 17/32* (2006.01)

(52) U.S. Cl.
CPC ...... *G07F 17/3265* (2013.01); *G07F 17/3213* (2013.01)

(58) Field of Classification Search
CPC .... G07F 17/32; G07F 17/3213; G07F 17/326; G07F 17/3262; G07F 17/3265; G07F 17/3267; G07F 17/34
See application file for complete search history.

(56) References Cited

U.S. PATENT DOCUMENTS 7,192,347 B1 * 3/2007 Marks ................. G07F 17/3209 463/19
9,600,970 B2 * 3/2017 Meyer ................. G07F 17/3213
9,836,915 B2 * 12/2017 Meyer ................... G07F 17/326
10,818,140 B2 * 10/2020 Halvorson .......... G07F 17/3244
11,922,768 B2 * 3/2024 Hawkins ................. G07F 17/34
12,002,329 B2 * 6/2024 Soong ................. G07F 17/3267
2005/0255903 A1 * 11/2005 Jackson .............. G07F 17/3267 463/16
2005/0288090 A1 * 12/2005 Thomas .............. G07F 17/3286 463/20
2006/0058097 A1 * 3/2006 Berman .............. G07F 17/3213 463/20
2008/0176634 A1 * 7/2008 Berman .................. G07F 17/34 463/20
2012/0258785 A1 * 10/2012 Suda ................... G07F 17/3265 463/31
2015/0050983 A1 * 2/2015 Delekta ............... G07F 17/3213 463/20
2016/0027240 A1 * 1/2016 Berman .................. G07F 17/34 463/20
2019/0019371 A1 * 1/2019 Bolling, Jr. ......... G07F 17/3225
2020/0051373 A1 * 2/2020 Meyer ................. G07F 17/3209
2021/0110636 A1 * 4/2021 Halvorson .......... G07F 17/3206
2022/0092917 A1 * 3/2022 Delekta ............... G07F 17/3267
2022/0092918 A1 3/2022 Uberuaga
2022/0101681 A1 3/2022 Sanborn
2022/0157116 A1 5/2022 Delekta
2023/0230440 A1 * 7/2023 Jones .................... G07F 17/326 463/31

* cited by examiner

*Primary Examiner* — Milap Shah
(74) *Attorney, Agent, or Firm* — Weaver Austin Villeneuve & Sampson LLP

(57) ABSTRACT

A graphical user interface for providing a game of chance with a hold-and-spin feature game mechanic in a format that features a smaller number of reels than is provided in typical hold-and-spin games. The graphical interface is configured to nevertheless provide a hold-and-spin gameplay experience similar to that found in hold-and-spin games having a larger number of reels.

20 Claims, 37 Drawing Sheets

| Symbol Position Type: | Non-Selected Symbol Position | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 35% | 32% | 30% | 27% | 25% | 23% | 20% | 15% | 10% | 28% | 25% | 20% | 16% | 11% | 25% | 22% | 16% | 12% | 9% |
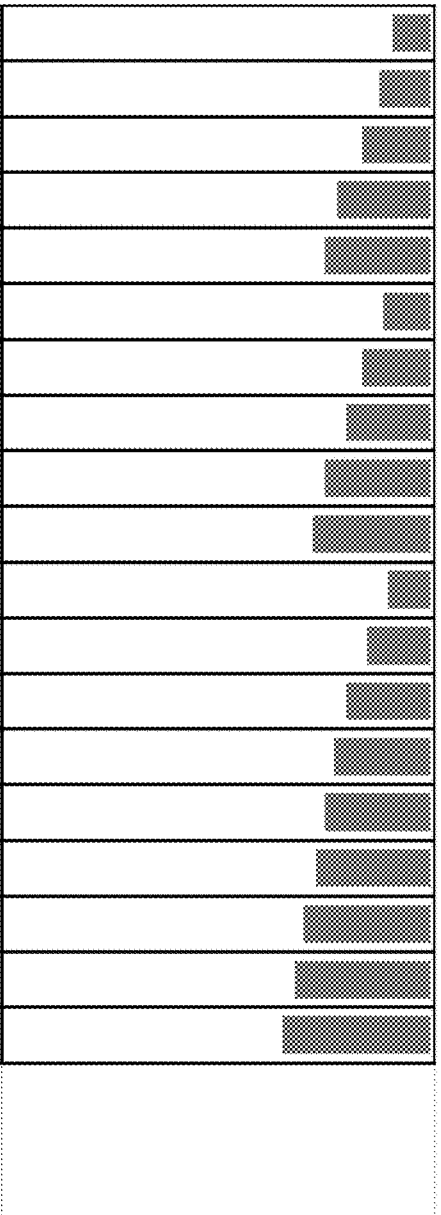
FIG. 30-A
| Symbol Position Type: | Selected Symbol Position A | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 15% | 18% | 22% | 27% | 25% | 24% | 19% | 12% | 9% | 16% | 25% | 20% | 16% | 11% | 14% | 20% | 15% | 10% | 8% |
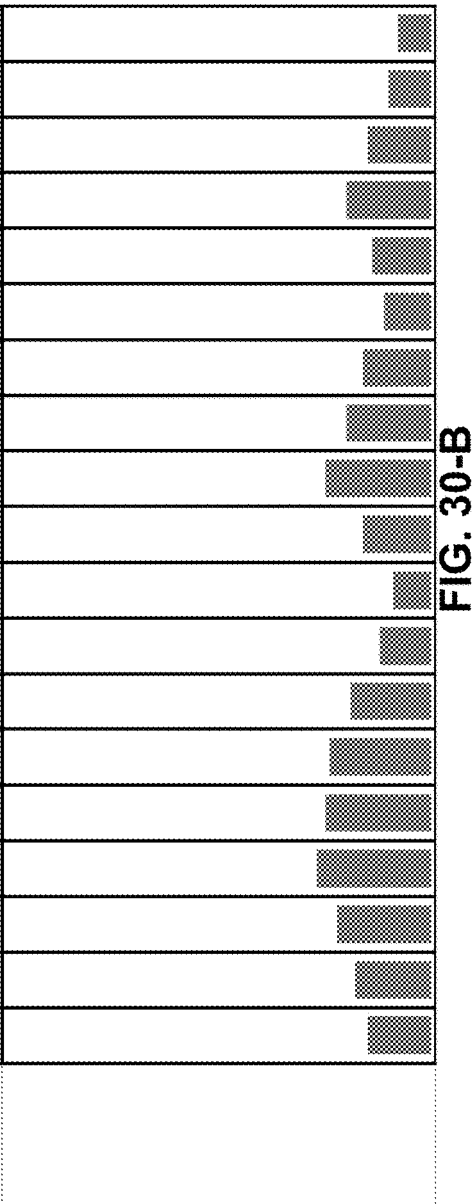
FIG. 30-B

| Symbol Position Type: | Selected Symbol Position B | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 20% | 23% | 29% | 24% | 20% | 20% | 19% | 16% | 12% | 20% | 25% | 20% | 16% | 11% | 19% | 20% | 15% | 10% | 7% |
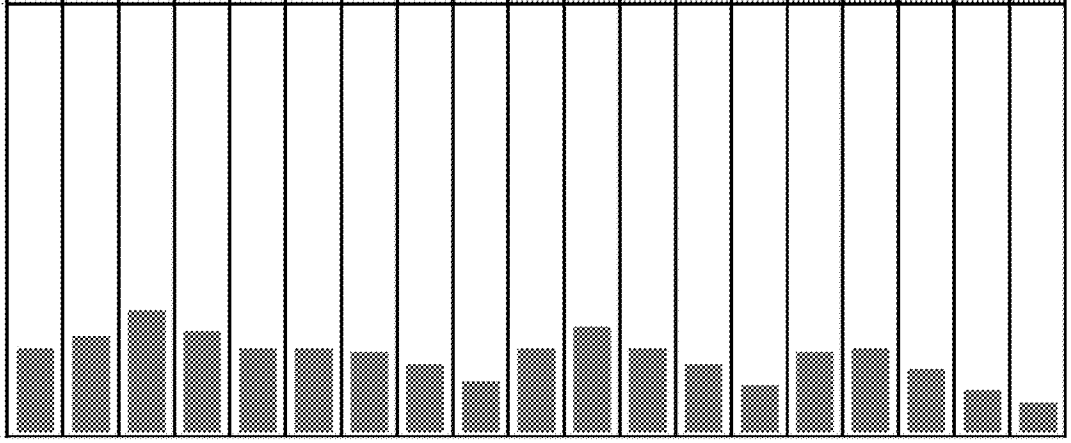
FIG. 30-C
| Symbol Position Type: | Selected Symbol Position C | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 30% | 33% | 34% | 31% | 30% | 28% | 26% | 16% | 12% | 22% | 24% | 20% | 18% | 11% | 24% | 25% | 18% | 16% | 12% |
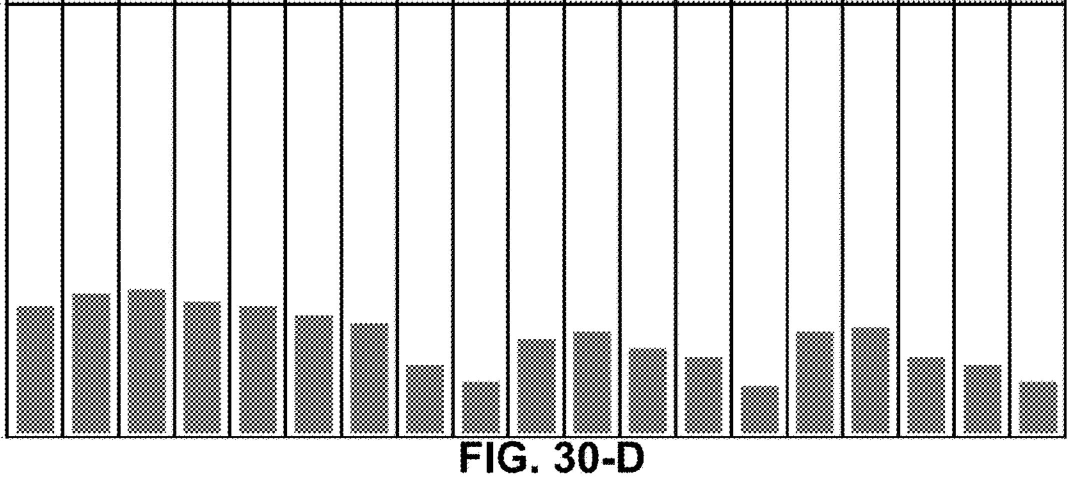
FIG. 30-D

| Symbol Position Type: | Selected Symbol Position AB | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 15% | 17% | 15% | 13% | 10% | 8% | 8% | 7% | 6% | 16% | 15% | 13% | 11% | 8% | 14% | 12% | 12% | 10% | 9% |
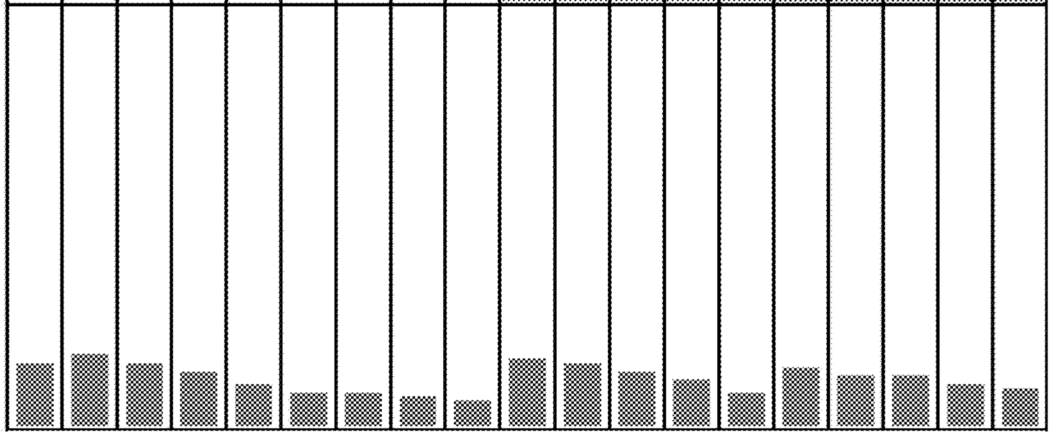
FIG. 30-E
| Symbol Position Type: | Selected Symbol Position BC | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 12% | 11% | 10% | 10% | 8% | 6% | 6% | 5% | 4% | 10% | 11% | 9% | 7% | 5% | 11% | 12% | 9% | 8% | 7% |
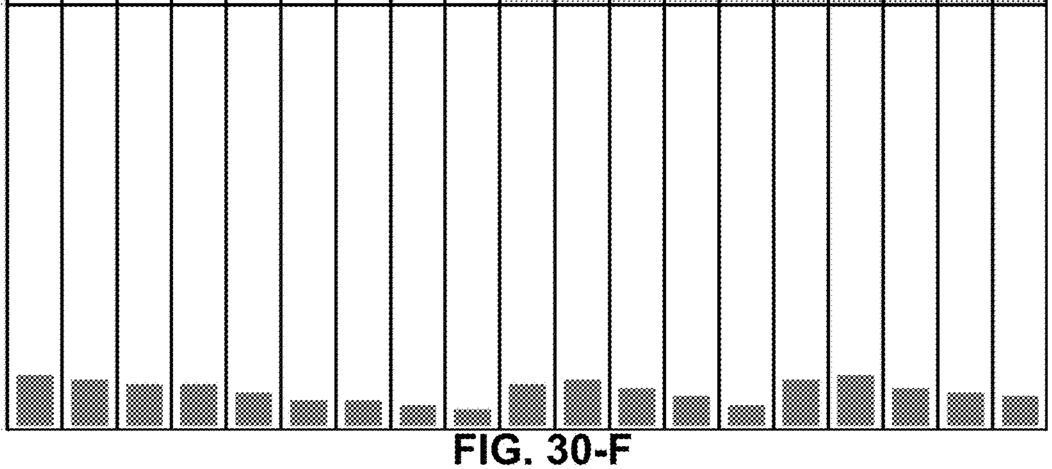
FIG. 30-F

| Symbol Position Type: | | | | | | | | | | Selected Symbol Position AC | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 13% | 15% | 12% | 10% | 8% | 7% | 6% | 4% | 3% | 10% | 13% | 11% | 9% | 7% | 11% | 13% | 10% | 8% | 6% |

FIG. 30-G

| Symbol Position Type: | | | | | | | | | | Selected Symbol Position ABC | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 8% | 9% | 6% | 6% | 5% | 4% | 3% | 3% | 2% | 5% | 5% | 4% | 3% | 2% | 4% | 4% | 3% | 2% | 2% |

FIG. 30-H

| Symbol Position Type: | Enhanced Mode - Non-Selected Symbol Position | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 15% | 17% | 18% | 17% | 15% | 12% | 10% | 10% | 9% | 10% | 12% | 11% | 9% | 7% | 9% | 8% | 6% | 5% | 4% |
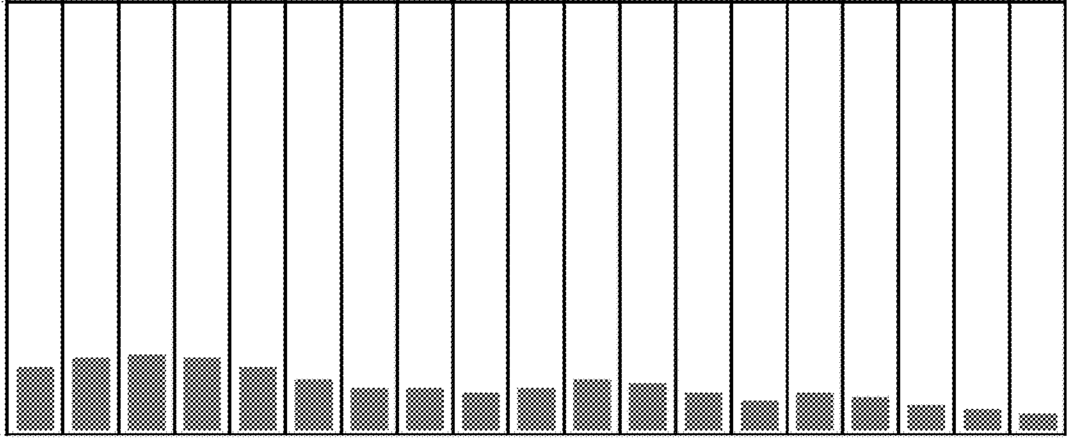
FIG. 30-I
| Symbol Position Type: | Enhanced Mode - Selected Symbol Position ABC | | | | | | | | | | | | | | | | | | |
|---|---|---|---|---|---|---|---|---|---|---|---|---|---|---|---|---|---|---|---|
| # Held Symbols: | 6 | 7 | 8 | 9 | 10 | 11 | 12 | 13 | 14 | 15 | 16 | 17 | 18 | 19 | 20 | 21 | 22 | 23 | 24 |
| % Chance of New Held Symbol: | 10% | 11% | 11% | 10% | 8% | 6% | 6% | 4% | 3% | 8% | 8% | 7% | 6% | 5% | 7% | 7% | 6% | 5% | 4% |
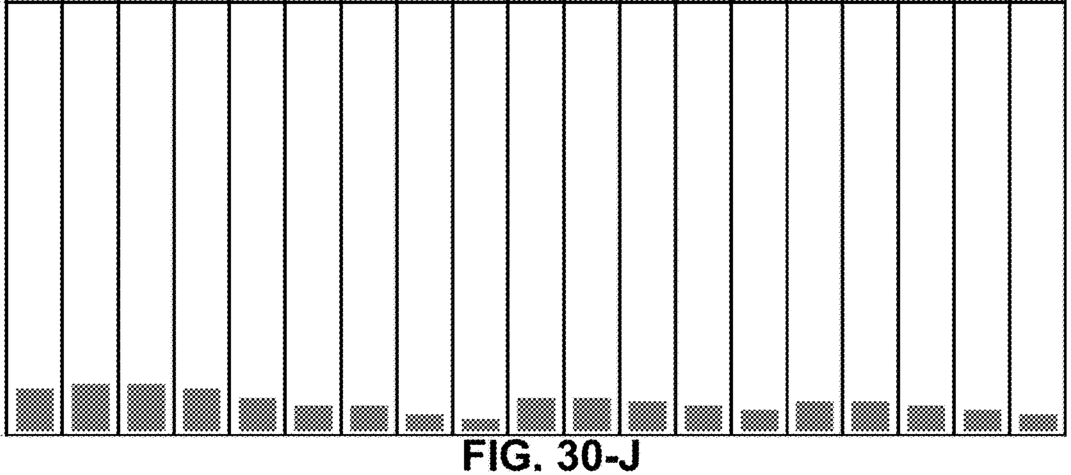
FIG. 30-J

| Wheel Segment | 7 | 8 | 9 | 10 | 11 | 12 | 13 | 14 | 15 |
|---|---|---|---|---|---|---|---|---|---|
| UPGRADE | 6% | 4% | 6% | 4% | 4% | 4% | 4% | 4% | 4% |
| PAY ALL | 14% | 14% | 13% | 22% | 22% | 24% | 20% | 25% | 25% |
| GROW | 13% | 14% | 10% | 7% | 4% | 4% | 5% | 3% | 3% |
| +2 PLAYS | 12% | 12% | 13% | 16% | 16% | 20% | 20% | 17% | 20% |
| UPGRADE | 21% | 18% | 24% | 14% | 9% | 5% | 5% | 3% | 3% |
| PAY ALL | 7% | 13% | 13% | 18% | 20% | 20% | 23% | 25% | 24% |
| GROW | 15% | 13% | 8% | 7% | 7% | 5% | 3% | 3% | 3% |
| +2 PLAYS | 12% | 13% | 13% | 13% | 18% | 20% | 20% | 20% | 18% |

FIG. 31-A

| Wheel Segment | 7 | 8 | 9 | 10 | 11 | 12 | 13 | 14 | 15 | 16 | 17 | 18 | 19 | 20 |
|---|---|---|---|---|---|---|---|---|---|---|---|---|---|---|
| UPGRADE | 6% | 4% | 6% | 4% | 4% | 4% | 4% | 4% | 4% | 3% | 4% | 4% | 3% | 4% |
| PAY ALL | 14% | 14% | 13% | 22% | 22% | 24% | 20% | 25% | 25% | 23% | 20% | 22% | 21% | 22% |
| GROW | 13% | 14% | 10% | 7% | 4% | 4% | 5% | 3% | 3% | 5% | 6% | 5% | 5% | 4% |
| +2 PLAYS | 12% | 12% | 13% | 16% | 16% | 20% | 20% | 17% | 20% | 18% | 16% | 18% | 15% | 15% |
| UPGRADE | 21% | 18% | 24% | 14% | 9% | 5% | 5% | 3% | 3% | 4% | 8% | 8% | 10% | 9% |
| PAY ALL | 7% | 13% | 13% | 18% | 20% | 20% | 23% | 25% | 24% | 22% | 21% | 18% | 21% | 18% |
| GROW | 15% | 13% | 8% | 7% | 7% | 5% | 3% | 3% | 3% | 7% | 7% | 5% | 7% | 8% |
| +2 PLAYS | 12% | 13% | 13% | 13% | 18% | 20% | 20% | 20% | 18% | 18% | 18% | 20% | 18% | 20% |

FIG. 31-B

| Wheel Segment | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|
| UPGRADE | 6% | 4% | 6% | 4% | 4% | 4% | 4% | 4% | 4% | 3% | 4% | 4% | 3% | 4% | 5% | 10% | 8% | 3% | 4% |
| PAY ALL | 14% | 14% | 13% | 22% | 22% | 24% | 20% | 25% | 25% | 23% | 20% | 22% | 21% | 22% | 24% | 21% | 25% | 27% | 23% |
| GROW | 13% | 14% | 10% | 7% | 4% | 4% | 5% | 3% | 3% | 5% | 6% | 5% | 5% | 4% | 0% | 0% | 0% | 0% | 0% |
| +2 PLAYS | 12% | 12% | 13% | 16% | 16% | 20% | 20% | 17% | 20% | 18% | 16% | 18% | 15% | 15% | 20% | 17% | 22% | 22% | 20% |
| UPGRADE | 21% | 18% | 24% | 14% | 9% | 5% | 5% | 3% | 3% | 4% | 8% | 8% | 10% | 9% | 4% | 12% | 3% | 4% | 8% |
| PAY ALL | 7% | 13% | 13% | 18% | 20% | 20% | 23% | 25% | 24% | 22% | 21% | 18% | 21% | 18% | 26% | 22% | 23% | 24% | 25% |
| GROW | 15% | 13% | 8% | 7% | 7% | 5% | 3% | 3% | 3% | 7% | 7% | 5% | 7% | 8% | 0% | 0% | 0% | 0% | 20% |
| +2 PLAYS | 12% | 13% | 13% | 13% | 18% | 20% | 20% | 20% | 18% | 18% | 18% | 20% | 18% | 20% | 21% | 18% | 19% | 20% | 18% |

FIG. 31-C

GUI FOR FEATURE GAME WITH HOLD-AND-SPIN FUNCTIONALITY AND ROAMING SELECTED SYMBOL POSITIONS

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

SUMMARY

Some games of chance may include a base game in which players try and obtain winning combinations of symbols, e.g., a winning combination of symbols along a payline. In some such games of chance, there may be a specified number of paylines, and only combinations of symbols that occur along one or more such paylines may be considered to potentially be winning patterns. In other games of chance, any combination of a displayed symbol from each of the reels may be considered to potentially be a winning pattern. For example, for a 5-reel slot machine game in which each reel has three symbol positions in which to display symbols, there may be 3 to the $5^{th}$ power, i.e., 243, potential combinations of symbols drawn from the three symbols displayed by each reel. In other words, for a slot game with 5 reels, each showing symbols in three symbol positions in a game outcome, there are 243 paylines covering all possible 5-symbol combinations involving one symbol from each reel. The winning symbol combinations that may be obtained along such paylines may result in an award of credits or other items to a player that obtains such winning symbol combinations.

In some such games of chance, there may be a feature game that may be triggerable from the base game. There are a multitude of different feature games that may be used for this purpose, but one popular feature game is a hold-and-spin feature game. In a typical hold-and-spin feature game, each play of the feature game results in one or more symbols being newly selected for display in symbol positions that do not already have a symbol of a particular type displayed therein. For example, if the particular type of symbol is a cash-on-reel (COR) symbol, each COR symbol that is shown in one of the symbol positions during the feature game may be "held" in place during the next play of the feature game. Thus, only the symbols shown in the symbol positions without COR symbols would see a change in the symbols displayed during a play of the feature game.

When such a feature game is initiated for a player, the player receives a set number, e.g., six, spins or plays of the feature game. The number of plays of the feature game is decremented by one for each play of the feature game engaged in by the player. In some implementations, if a play of the feature game results in presentation of a symbol of the particular type of symbol, e.g., a COR symbol, that is to be "held" in place (and which was not displayed by virtue of having been "held" in place from a previous play of the feature game), the number of plays of the feature game may be reset or adjusted to a higher number. For example, in some implementations, each time there is a feature game play in which one or more COR symbols are displayed in symbol positions that did not have such COR symbols displayed after the game play that occurred immediately prior to the current game play, the number of plays remaining that the player may have may be reset to the starting number of feature game plays or, in some cases, incremented by some amount, e.g., two feature game plays.

Such feature games may end either when the number of plays remaining reaches zero (and no additional symbol of the particular type of symbol is shown as a result of the last feature game play) or when all of the symbol positions have symbols of the particular type of symbol shown. When the feature game ends, the player may, in some cases, be awarded with one or more prizes. In some instances, such prizes may include credit or point awards that are commensurate with values associated with the displayed symbols that are of the particular symbol type. For example, symbols that are COR symbols may each have a numeric value associated therewith; such values may be pre-assigned to the COR symbols or may be randomly assigned to a COR symbol at the time that the COR symbol is displayed.

The present disclosure is directed at games of chance featuring a hold-and-spin feature game that includes a plurality of symbol positions. One or more of the symbol positions that do not display symbols of the particular type of symbol may be designated by the GUI for the feature game as selected symbol positions, e.g., using a corresponding frame that extends around, e.g., enclosing, each such symbol position. Each such selected symbol position may be associated with a corresponding bonus game element. For example, if there are initially three selected symbol positions, there may be three corresponding bonus game elements. Such bonus game elements may, for example, each be depicted in a different portion of a bonus game GUI (which may be visible in conjunction with the feature game GUI) and may each be able to be activated, e.g., played, when a symbol of the particular type of symbol is displayed in the corresponding selected symbol position.

For example, the GUI for the bonus game may include three separate wheel displays, each featuring a plurality of wheel segments arranged around a common center point. Each wheel segment may be associated with a particular bonus game outcome (including, in some cases, an outcome in which the player receives no benefit). In some instances, each wheel display may have corresponding wheel segments that are associated with a particular type or class of bonus game outcomes. For example, in some implementations, one wheel display in the GUI for the bonus game may have wheel segments that are each associated with one of a plurality of different potential jackpot awards. In some such implementations, a second wheel display in the GUI for the bonus game may have wheel segments that are each associated with one of a plurality of different multiplier values that, when selected as a bonus game outcome, may be multiplied by a value associated with one of the displayed symbols of the particular type of symbol and a corresponding number of credits or points then awarded to the player. And in some further such implementations, a third wheel display in the GUI for the bonus game may have wheel segments that are each associated with one of a plurality of different feature game benefits that may, if selected as a bonus game outcome, provide the player with a benefit in the feature game. When a symbol of the particular type of symbol is caused to be displayed in a selected symbol position associated with a corresponding bonus game element as the result of a feature game play, the corresponding bonus game may be activated, e.g., provided for play (such play may occur automatically or in response to a user input).

Whenever a symbol of the particular type of symbol is caused to be displayed in a selected symbol position, the GUI for the feature game may also be caused to designate a different one of the symbol positions not showing a symbol of the particular type of symbol as that selected symbol position. The GUI for the feature game may thus be updated to indicate a different one of the symbol positions not showing a symbol of the particular type of symbol as that selected symbol position, e.g., using one or more graphical indicators. For example, if each selected symbol position is indicated by a corresponding frame that extends around that selected symbol position, when a symbol of the particular type of symbol is displayed in one of the selected symbol positions, then the GUI for the feature game may cause the frame that extended around that selected symbol position to be relocated to extend around the symbol position that has been newly selected to be that selected symbol position.

Such GUIs for feature games may thus include selected symbol positions, each of which may offer an additional benefit, e.g., a bonus game play, when a symbol of the particular type of symbol is displayed therein and may then be reassigned such that a different symbol position not displaying a symbol of the particular type of symbol is that selected symbol position. Each selected symbol position may be graphically indicated by the GUI for the feature game in some manner, e.g., using a frame that extends around each selected symbol position.

In many such implementations, when a selected symbol position is reassigned to a different symbol position, the symbol position that is chosen as the new selected symbol position may be selected according to certain constraints. For example, as noted above, the symbol position that is selected to be the new selected symbol position may be selected from the symbol positions that do not display a symbol of the particular symbol type. Additionally, the symbol position that is selected from the symbol positions that do not display a symbol of the particular symbol type may be selected, if possible, from those symbol positions that are not already selected symbol positions. If the only symbol positions that are left that do not display a symbol of the particular symbol type are already selected symbol positions, then the selected symbol position may be reassigned to one of the existing symbol positions. In such cases, that single symbol position may serve as two or more selected symbol positions simultaneously.

These and other features of the GUIs discussed herein are discussed below in more detail with respect to the Figures. However, it will be understood that the present disclosure is directed at least to the following implementations.

In some implementations, a system may be provided that includes one or more displays, one or more processors, and one or more memory devices. The one or more memory devices may store computer-executable instructions which, when executed by the one or more processors, cause the one or more processors to: cause a graphical user interface (GUI) for a feature game to be presented on the one or more displays, the GUI for the feature game including a plurality of symbol positions and indicating at least one selected symbol position of the plurality of symbol positions, cause, for each symbol position not displaying a first type of symbol and responsive to receipt of a signal indicating a play of the feature game, a symbol to be selected from a corresponding plurality of symbols and displayed in that symbol position, wherein at least one of the corresponding pluralities of symbols includes at least one first type of symbol, and cause, responsive to each display of a symbol of the first symbol type in the selected symbol position or one of the selected symbol positions when there is at least one symbol position not displaying the first type of symbol, the GUI for the feature game to change to indicate a different symbol position that is not displaying the first type of symbol as that selected symbol position.

In some implementations, the at least one selected symbol position may include at least a first selected symbol position and a second selected symbol position.

In some such implementations, the at least one selected symbol position may further include at least a third selected symbol position.

In some further such implementations, the one or more memory devices may further store additional computer-executable instructions which, when executed by the one or more processors, further cause the one or more processors to, when causing the GUI for the feature game to indicate a particular one of the first selected symbol position, the second selected symbol position, and the third selected symbol position, cause: the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

In some implementations, the at least one selected symbol position may be a plurality of selected symbol positions, and the one or more memory devices may further store additional computer-executable instructions which, when executed by the one or more processors, further cause the one or more processors to, when causing the GUI for the feature game to indicate a particular one of the selected symbol positions, cause: the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular selected symbol position, and the GUI to indicate, when all of the symbol positions not displaying the first type of symbol are indicated as being one or more of the selected symbol positions, one of the other selected symbol positions as the particular selected symbol position.

In some such implementations, the one or more memory devices may further store additional computer-executable instructions which, when executed by the one or more processors, further cause the one or more processors to cause, for each symbol position that is one or more of the selected symbol positions, a corresponding graphical indicator that designates that symbol position as such to be displayed.

In some further such implementations, each selected symbol position may be associated with a corresponding graphical characteristic, each corresponding graphical characteristic may be different from the other corresponding graphical characteristic or characteristics, and the one or more memory devices may further store additional computer-executable instructions which, when executed by the one or more processors, further cause the one or more processors to: cause each graphical indicator that designates a symbol position that serves as only a single selected symbol position to have the corresponding graphical characteristic for that single selected symbol position, and cause each graphical indicator that designates a symbol position that serves as multiple selected symbol positions to have the corresponding graphical characteristics for those multiple selected symbol positions.

In some additional such implementations, each corresponding graphical characteristic may be a different color, and the one or more memory devices may further store additional computer-executable instructions which, when executed by the one or more processors, further cause the one or more processors to cause each graphical indicator that designates a symbol position that serves as multiple selected symbol positions to have multiple first portions that are each one of the colors associated with those multiple selected symbol positions.

In some implementations, each graphical indicator may be a frame that encloses all or part of the symbol position that is designated thereby as being one or more of the selected symbol positions.

In some such implementations, the first portions of each frame that designates a symbol position that serves as multiple selected symbol positions may be distributed around a perimeter of that frame, each frame that designates a symbol position that serves as multiple selected symbol positions may include second portions distributed around the perimeter of that frame, each second portion of each frame that designates a symbol position that serves as multiple selected symbol positions may be interposed between two of the first portions of that frame that are different colors, and each second portion may include a color gradient that transitions from the color of one of the first portions that that second portion is interposed between to the color of the other of the first portions that that second portion is interposed between.

In some such implementations, the one or more memory devices may further store additional computer-executable instructions which, when executed by the one or more processors, further cause the one or more processors to cause the GUI for the feature game to animate such that the first portions and the second portions of each frame move along the perimeter of that frame.

In some implementations, a method may be provided. The method may include (a) causing, by one or more processors, a graphical user interface (GUI) for a feature game to be presented on one or more displays, the GUI for the feature game including a plurality of symbol positions and indicating at least one selected symbol position of the plurality of symbol positions, (b) causing, by the one or more processors and for each symbol position not displaying a first type of symbol and responsive to receipt of a signal indicating a play of the feature game, a symbol to be selected from a corresponding plurality of symbols and displayed in that symbol position, wherein at least one of the corresponding pluralities of symbols includes at least one first type of symbol, and (c) causing, by the one or more processors and responsive to each display of a symbol of the first symbol type in the selected symbol position or one of the selected symbol positions when there is at least one symbol position not displaying the first type of symbol, the GUI for the feature game to change to indicate a different symbol position that is not displaying the first type of symbol as that selected symbol position.

In some implementations of the method, the at least one selected symbol position may include at least a first selected symbol position and a second selected symbol position.

In some further such implementations, the at least one selected symbol position may further include at least a third selected symbol position.

In some additional such implementations, the method may further include causing the one or more processors to, when causing the GUI for the feature game to indicate a particular one of the first selected symbol position, the second selected symbol position, and the third selected symbol position, cause: (i) the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and (ii) the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

In some implementations, the at least one selected symbol position may be a plurality of selected symbol positions, and the method may further include further causing the one or more processors to, when causing the GUI for the feature game to indicate a particular one of the selected symbol positions, cause: (i) the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular selected symbol position, and (ii) the GUI to indicate, when all of the symbol positions not displaying the first type of symbol are indicated as being one or more of the selected symbol positions, one of the other selected symbol positions as the particular selected symbol position.

In some such implementations, the method may further include causing the one or more processors to cause, for each symbol position that is one or more of the selected symbol positions, a corresponding graphical indicator that designates that symbol position as such to be displayed.

In some such implementations, each selected symbol position may be associated with a corresponding graphical characteristic, each corresponding graphical characteristic may be different from the other corresponding graphical characteristic or characteristics, and the method may further include causing the one or more processors to: cause each graphical indicator that designates a symbol position that serves as only a single selected symbol position to have the corresponding graphical characteristic for that single selected symbol position, and cause each graphical indicator that designates a symbol position that serves as multiple selected symbol positions to have the corresponding graphical characteristics for those multiple selected symbol positions.

In some such implementations, each corresponding graphical characteristic may be a different color, and the method may further include causing the one or more processors to cause each graphical indicator that designates a symbol position that serves as multiple selected symbol positions to have multiple first portions that are each one of the colors associated with those multiple selected symbol positions.

In some further such implementations, each graphical indicator may be a frame that encloses all or part of the symbol position that is designated thereby as being one or more of the selected symbol positions.

In some additional such implementations, the first portions of each frame that designates a symbol position that serves as multiple selected symbol positions may be distributed around a perimeter of that frame, each frame that designates a symbol position that serves as multiple selected symbol positions may include second portions distributed around the perimeter of that frame, each second portion of each frame that designates a symbol position that serves as multiple selected symbol positions may be interposed between two of the first portions of that frame that are different colors, and each second portion may include a color gradient that transitions from the color of one of the first portions that that second portion is interposed between to the color of the other of the first portions that that second portion is interposed between.

In some such implementations, the method may further include causing the one or more processors to cause the GUI for the feature game to animate such that the first portions and the second portions of each frame move along the perimeter of that frame.

In some implementations, one or more computer-readable media may be provided that store computer-executable instructions which, when executed by one or more processors, cause the one or more processors to: cause a graphical user interface (GUI) for a feature game to be presented on one or more displays, the GUI for the feature game including a plurality of symbol positions and indicating at least one selected symbol position of the plurality of symbol positions, cause, for each symbol position not displaying a first type of symbol and responsive to receipt of a signal indicating a play of the feature game, a symbol to be selected from a corresponding plurality of symbols and displayed in that symbol position, wherein at least one of the corresponding pluralities of symbols includes at least one first type of symbol, and cause, responsive to each display of a symbol of the first symbol type in the selected symbol position or one of the selected symbol positions when there is at least one symbol position not displaying the first type of symbol, the GUI for the feature game to change to indicate a different symbol position that is not displaying the first type of symbol as that selected symbol position.

In some implementations, the at least one selected symbol position may include at least a first selected symbol position and a second selected symbol position.

In some further such implementations, the at least one selected symbol position may further include at least a third selected symbol position.

In some additional implementations, the one or more computer-readable media may further store additional computer-executable instructions which, when executed by the one or more processors, further cause the one or more processors to, when causing the GUI for the feature game to indicate a particular one of the first selected symbol position, the second selected symbol position, and the third selected symbol position, cause: the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

In some implementations, the at least one selected symbol position may be a plurality of selected symbol positions, and the one or more computer-readable media may further store additional computer-executable instructions which, when executed by the one or more processors, further cause the one or more processors to, when causing the GUI for the feature game to indicate a particular one of the selected symbol positions, cause: the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular selected symbol position, and the GUI to indicate, when all of the symbol positions not displaying the first type of symbol are indicated as being one or more of the selected symbol positions, one of the other selected symbol positions as the particular selected symbol position.

In some such implementations, the one or more computer-readable media may further store additional computer-executable instructions which, when executed by the one or more processors, further cause the one or more processors to cause, for each symbol position that is one or more of the selected symbol positions, a corresponding graphical indicator that designates that symbol position as such to be displayed.

In some additional such implementations, each selected symbol position may be associated with a corresponding graphical characteristic, each corresponding graphical characteristic may be different from the other corresponding graphical characteristic or characteristics, and the one or more computer-readable media may further store additional computer-executable instructions which, when executed by the one or more processors, further cause the one or more processors to: cause each graphical indicator that designates a symbol position that serves as only a single selected symbol position to have the corresponding graphical characteristic for that single selected symbol position, and cause each graphical indicator that designates a symbol position that serves as multiple selected symbol positions to have the corresponding graphical characteristics for those multiple selected symbol positions.

In some implementations, each corresponding graphical characteristic may be a different color, and the one or more computer-readable media may further store additional computer-executable instructions which, when executed by the one or more processors, further cause the one or more processors to cause each graphical indicator that designates a symbol position that serves as multiple selected symbol positions to have multiple first portions that are each one of the colors associated with those multiple selected symbol positions.

In some implementations, each graphical indicator may be a frame that encloses all or part of the symbol position that is designated thereby as being one or more of the selected symbol positions.

In some further such implementations, the first portions of each frame that designates a symbol position that serves as multiple selected symbol positions may be distributed around a perimeter of that frame, each frame that designates a symbol position that serves as multiple selected symbol positions may include second portions distributed around the perimeter of that frame, each second portion of each frame that designates a symbol position that serves as multiple selected symbol positions may be interposed between two of the first portions of that frame that are different colors, and each second portion may include a color gradient that transitions from the color of one of the first portions that that second portion is interposed between to the color of the other of the first portions that that second portion is interposed between.

In some implementations, the one or more computer-readable media may further store additional computer-executable instructions which, when executed by the one or more processors, further cause the one or more processors to cause the GUI for the feature game to animate such that the first portions and the second portions of each frame move along the perimeter of that frame.

BRIEF DESCRIPTION OF THE DRAWINGS

FIGS. 30-A through 30-J depict tables representing symbol sets for use in selecting symbols during feature game play.

FIGS. 31-A through 31-C depict tables representing bonus game element outcome weightings that may be used in providing a GUI as discussed herein.

The Figures are provided for the purpose of providing examples and clarity regarding various aspects of this disclosure and are not intended to be limiting.

DETAILED DESCRIPTION

The following discussion provides overall context for gaming machines that may be used to implement a feature game mechanic such as is described above and later herein. Following this overview, a more focused discussion of the feature game mechanic concepts discussed above is provided.

Figure 1:
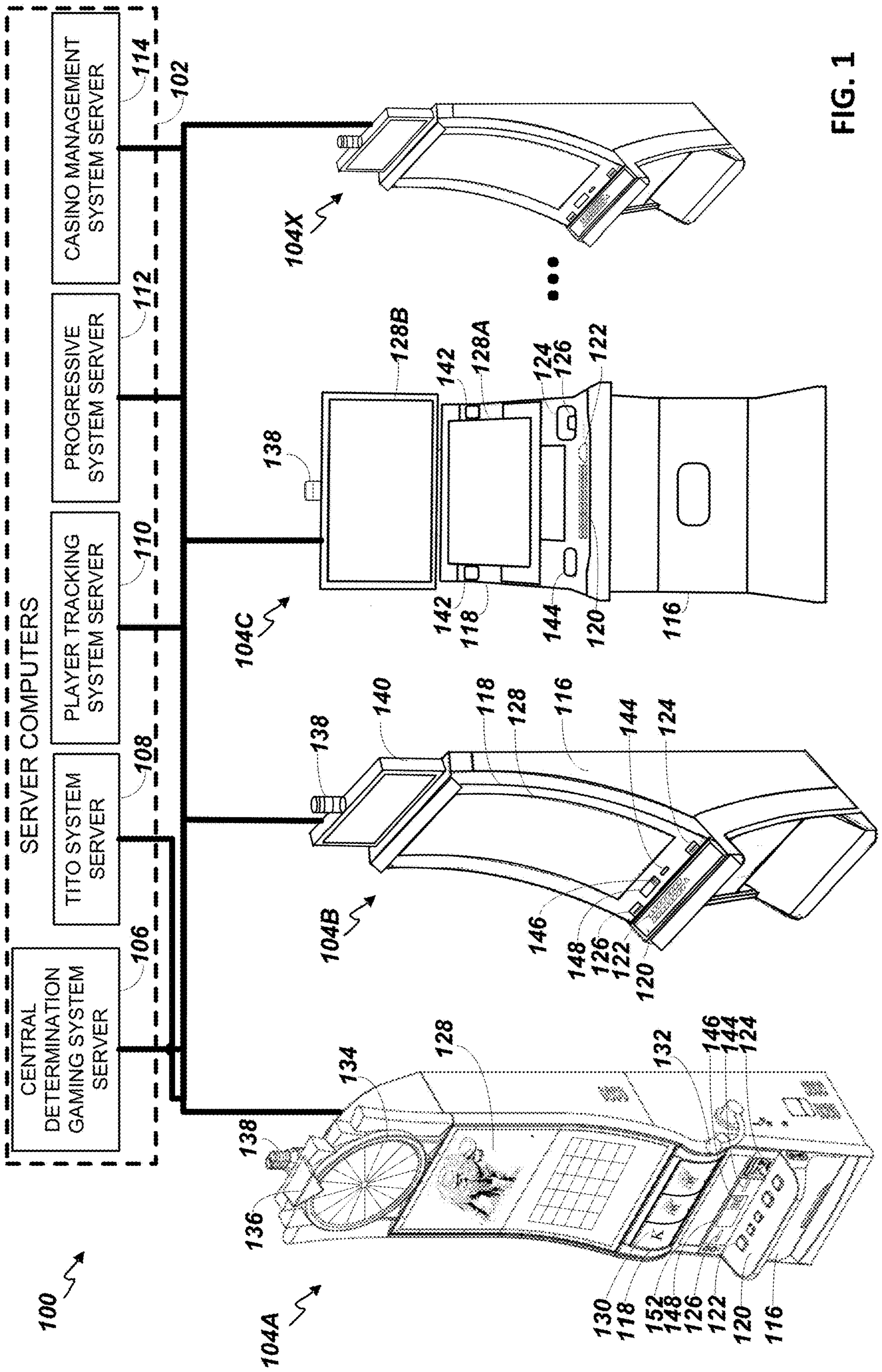
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
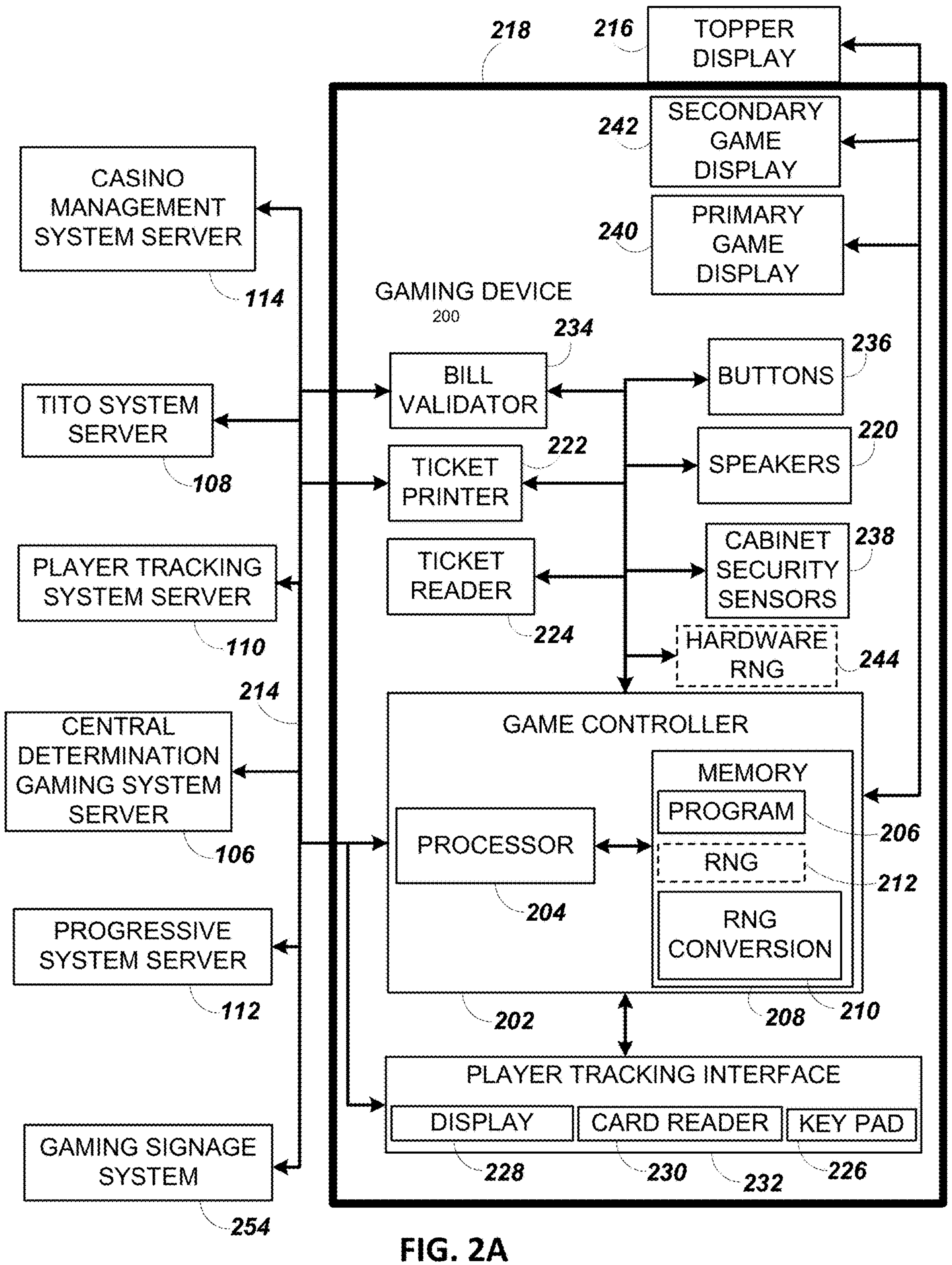
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
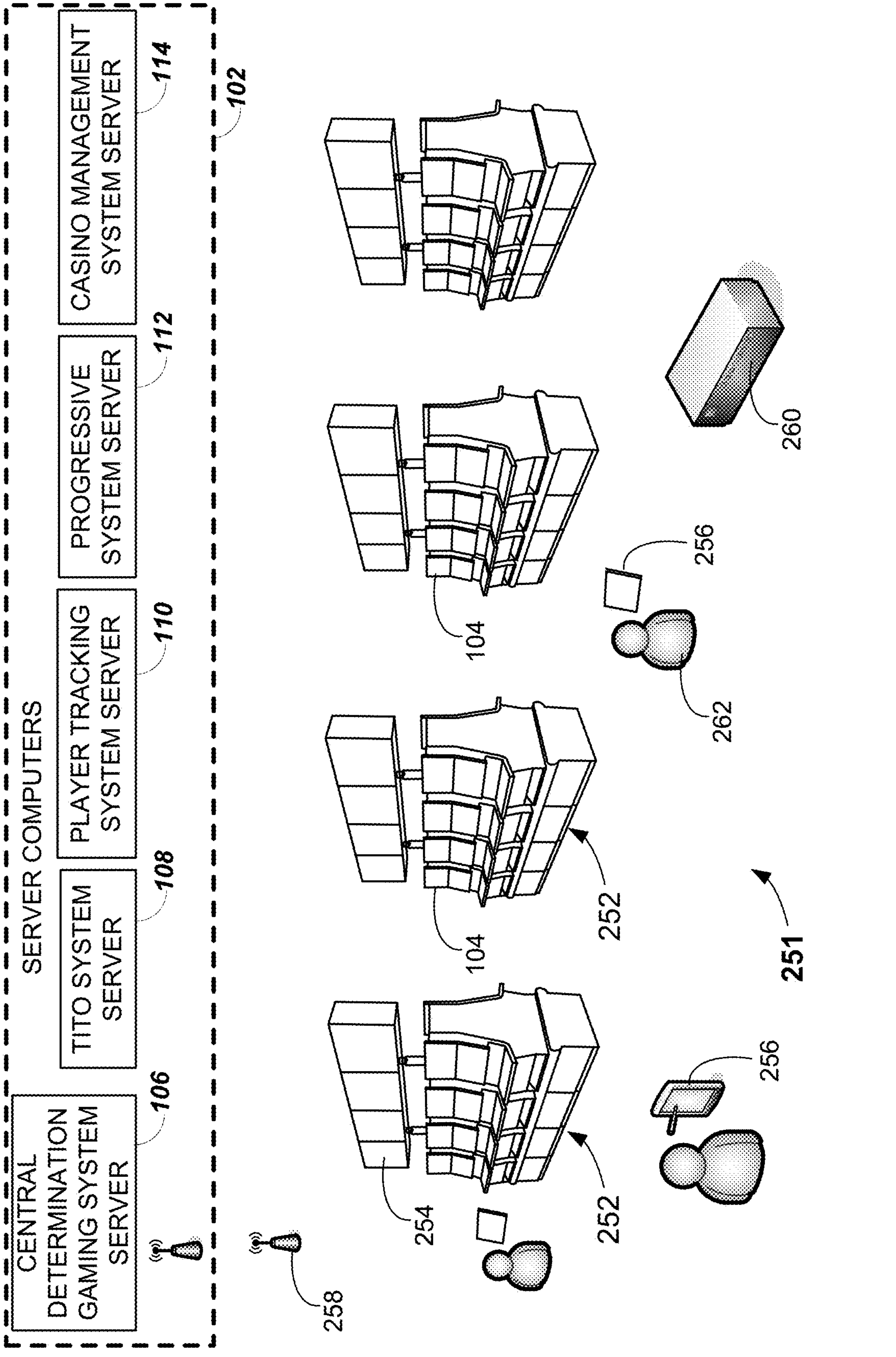
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
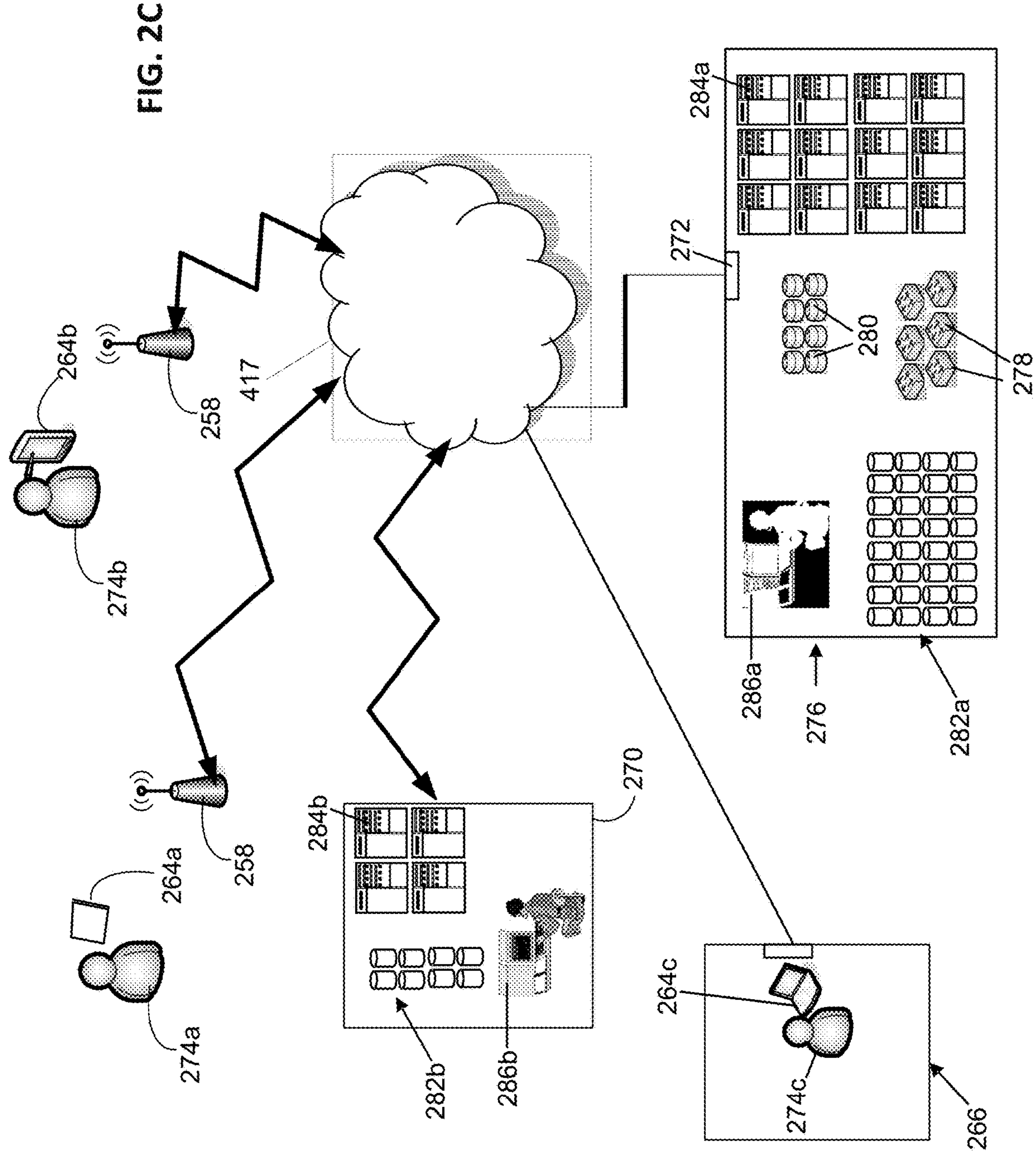
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
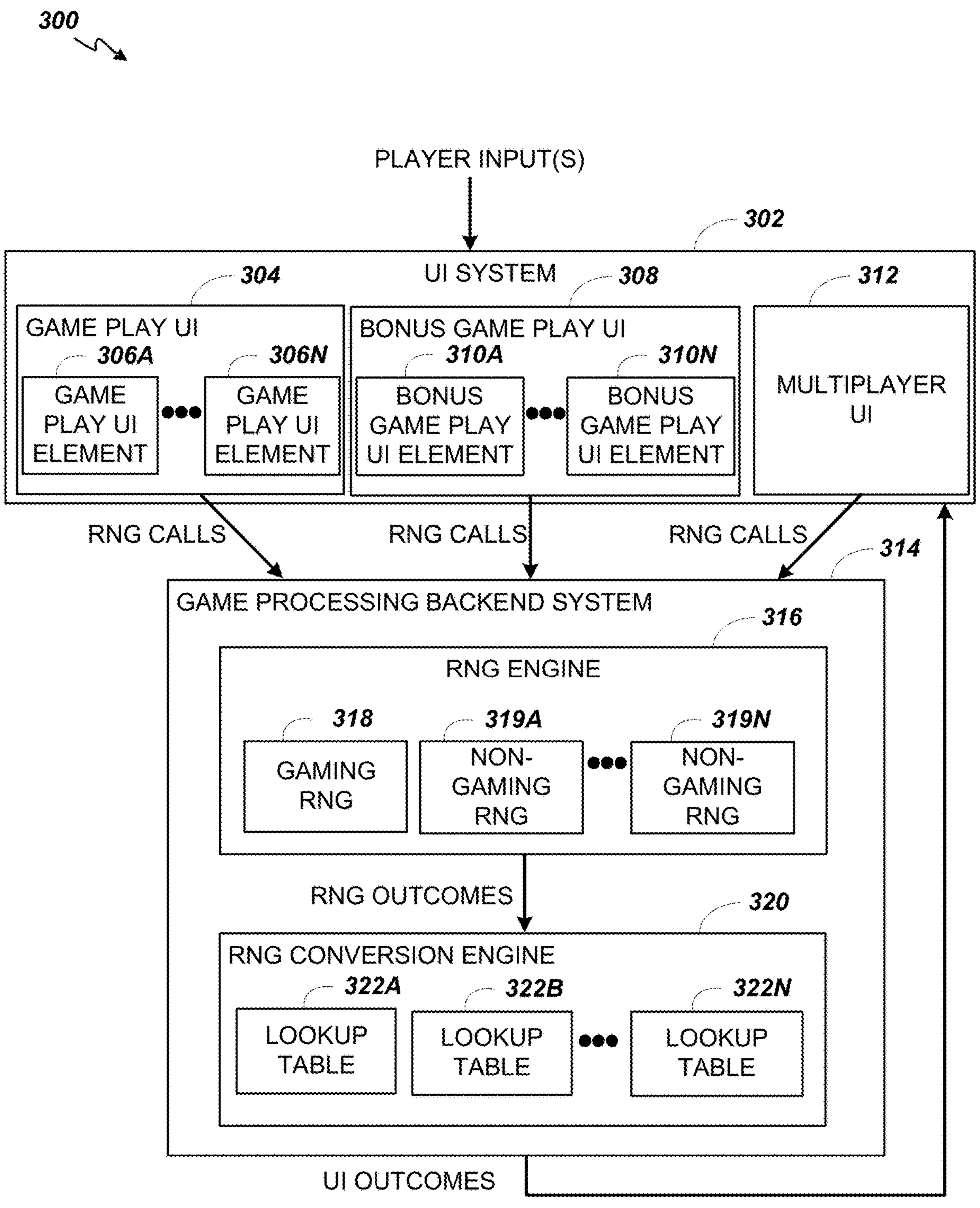
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, the present disclosure is directed at GUIs that may be used to present a base game, feature game, and bonus game. To assist in this discussion, FIGS. 4 through 27 are provided. FIGS. 4 through 27 depict a GUI or GUIs that illustrate the concepts discussed herein. Each of FIGS. 4 through 27 depicts a different game play state of the base game, feature game, and/or bonus game that may be provided using such a GUI or GUIs.

Figure 4:
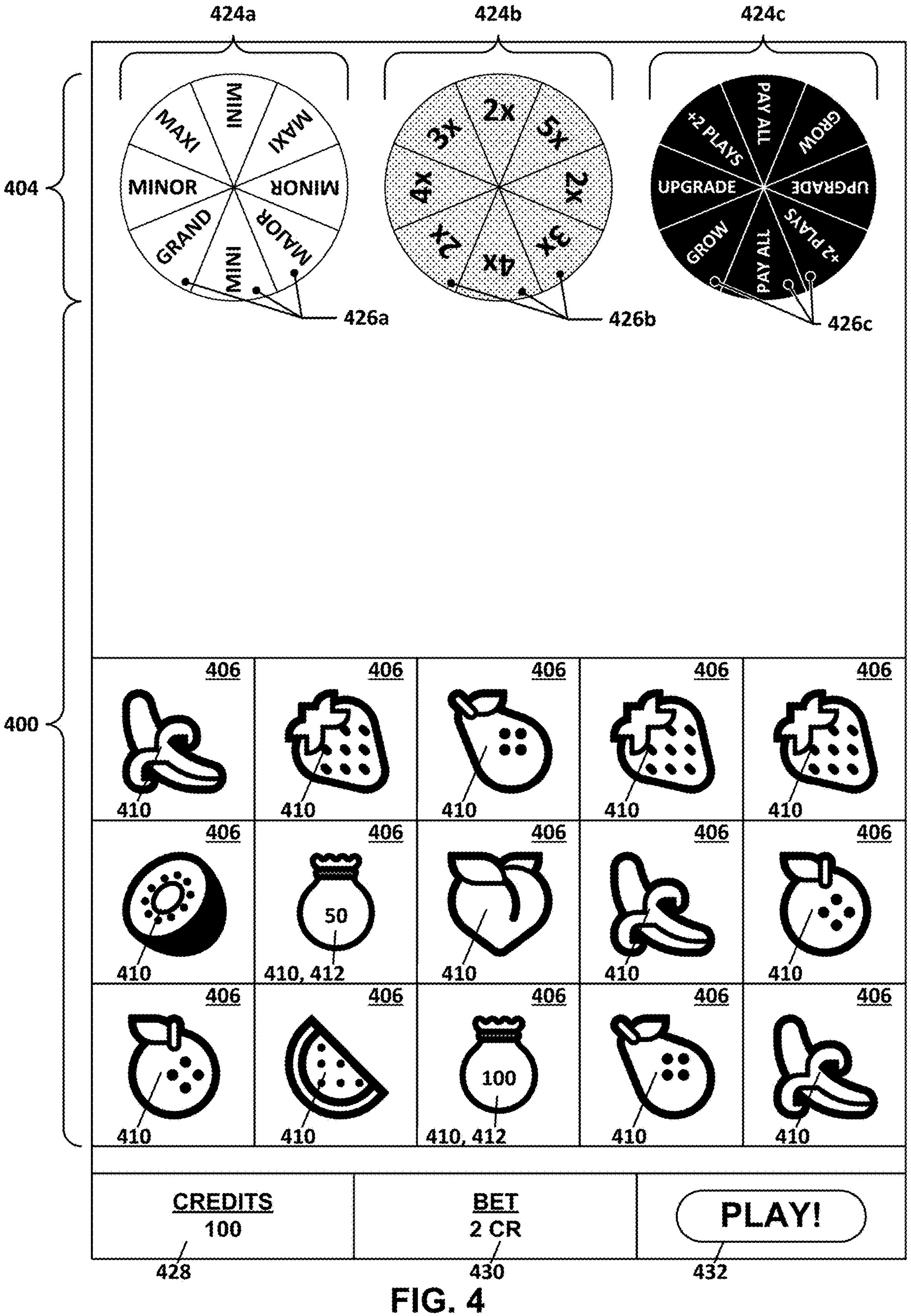
FIGS. 4 through 27 depict various stages of game play for a game having GUIs as disclosed herein.

In FIG. 4, a GUI for a base game 400 is displayed. The GUI for the base game 400 features a plurality of columns of symbol positions 406. Each symbol position 406 may, for example, serve as a placeholder in which a symbol 410 is displayed at the conclusion of a play of the base game. The symbols 410 may be selected from a plurality of different symbol types, including at least a triggering symbol type 412. The triggering symbol type 412, in this example, is a cash-on-reel symbol, which is represented by a money bag that is common to all of the cash-on-reel symbols and an award value which may vary between cash-on-reel symbols. The symbol types may also include other types of symbols. For example, FIG. 4 also depicts symbols of another symbol type, e.g., fruit symbols. While not depicted here, the symbols 410 selected for display in the symbol positions 406 may be of a variety of other different types, such as multiplier symbol types (which may, in some cases, act to cause awards awarded as a result of a game outcome to be multiplied by a specified multiplier), free spin symbol types (which may, in some cases, cause one or more free or additional plays of the base game to be awarded to the player when displayed), wild symbol types (which may act/be treated as any symbol of at least one other symbol type when displayed), etc.

The GUI may also include, for example, a credit meter 428 (in implementations in which players play for points instead of credits, the references to "credit" herein will be understood to apply equally to points instead), a wager amount indicator 430, and a play button 432. The wager amount indicator 430 may indicate how many points or credits the player intends to pay in order to conduct a play of the base game. At present, the credit meter reflects a credit amount of 100 credits.

As can be seen in FIG. 4, the GUI for the base game 400 includes five columns of symbol positions 406, each column of symbol positions 406 including three symbol positions 406. There may be fewer or more than five columns and fewer or more than three symbol positions in each column.

Also visible in FIG. 4 is a GUI for a bonus game 404. The GUI for the bonus game 404 is displayed in tandem with the display of the GUI for the base game 400 in this example so that the player is aware of the existence and general nature of the bonus game that the GUI for the bonus game 404 provides. However, in other implementations, the GUI for the bonus game 404 may not be displayed in tandem with the GUI for the base game 400 and may instead be displayed in tandem with the GUI for the feature game 402 (discussed later) or may not be displayed in tandem with the GUI for the base game 400 or the GUI for the feature game 402, e.g., the GUI for the bonus game 404 may be displayed in isolation.

In this particular GUI for the bonus game 404, multiple wheel displays 424*a*, 424*b*, and 424*c* are shown. Each such wheel display 424 may serve as a different bonus game element of the bonus game. As can be seen in FIG. 4, each of the wheel displays 424*a*, 424*b*, and 424*c* has a corresponding plurality of wheel segments 426*a*, 426*b*, or 426*c*, respectively. Each wheel segment 426 may have an award or benefit associated with it; when a particular bonus game element is activated, the wheel display 424 that is part of that bonus game element may be activated, e.g., spun relative to a pointer (and/or have the pointer spun about the center of that wheel display 424), in order to select a particular benefit or award from those indicated by the wheel segments of that wheel display 424.

It will be noted that each of the wheel displays 424 has a different graphical characteristic. In some implementations, such graphical characteristics may be different colors, e.g., red, green, and blue, or red, blue, and yellow, etc. Such an implementation is depicted in FIG. 4, but due to the limitations of using black and white drawings, the wheel display 424*a*, for example, has wheel segments 426*a* that have a white background, the wheel display 424*b*, for example, has wheel segments 426*b* that have a speckled grey background, and the wheel display 424*c*, for example, has wheel segments 426*c* that have a black background. It will be understood that different graphical characteristics other than different colors may be used to allow a player to differentiate between the different wheel displays 424, e.g., the wheel displays 424 may use different line fonts to define various edges, different fill patterns, etc. However the examples discussed herein assume that the graphical characteristics are different colors.

During each play of the base game, the GUI for the base game 400 may be caused to present a plurality of symbols 410 in the symbol positions 406 responsive to a triggering input, e.g., receipt of a signal indicating a play of the base game received from the play button 432 responsive to a player's selection of the play button 432. The symbols 410 selected for display in the symbol positions 406 of each column may be selected in a variety of ways. In some implementations, each symbol 410 displayed in each symbol position 406 may be selected randomly and independently from the selection of other symbols 410 displayed in the other symbol positions 406. In other implementations, such as the one depicted in FIG. 4, the symbols 410 displayed in each of the symbol positions 406 of each column may be randomly selected as a block from a larger, ordered sequence of symbols 410. For example, each column may be associated with a particular ordered sequence of symbols 410, e.g., a reel strip, and a random selection may be made of X adjacent symbols 410 in that ordered sequence of symbols, where X is the number of symbol positions 406 in the associated column of symbol positions 406 (the ordered sequences of symbols may be circular or modulo sequences such that when a selected block of symbols 410 extends past the start or end of the sequence, the symbols 410 at the other of the end and the start of the sequence are used to provide missing symbols 410).

If a first triggering condition is met during play of the base game, a feature game associated with the base game may be initiated and the GUI for the base game 400 may be caused to be replaced by, or morph into, a GUI for the feature game. While a variety of different first triggering conditions may be used to trigger the initiation of the feature game, in the example of FIG. 4, the feature game is initiated responsive to at least a particular number of symbols 410 of the triggering symbol type 412 being displayed in the symbol positions 406 responsive to a play of the base game. For example, the first triggering condition may be met when six or more symbols 410 of the triggering symbol type 412 are shown in the symbol positions 406 as the result of a play of the base game. In FIG. 4, only two symbols 410 of the triggering symbol type 412 are shown as the result of a play of the base game, so the first triggering condition is not met.

Figure 5:
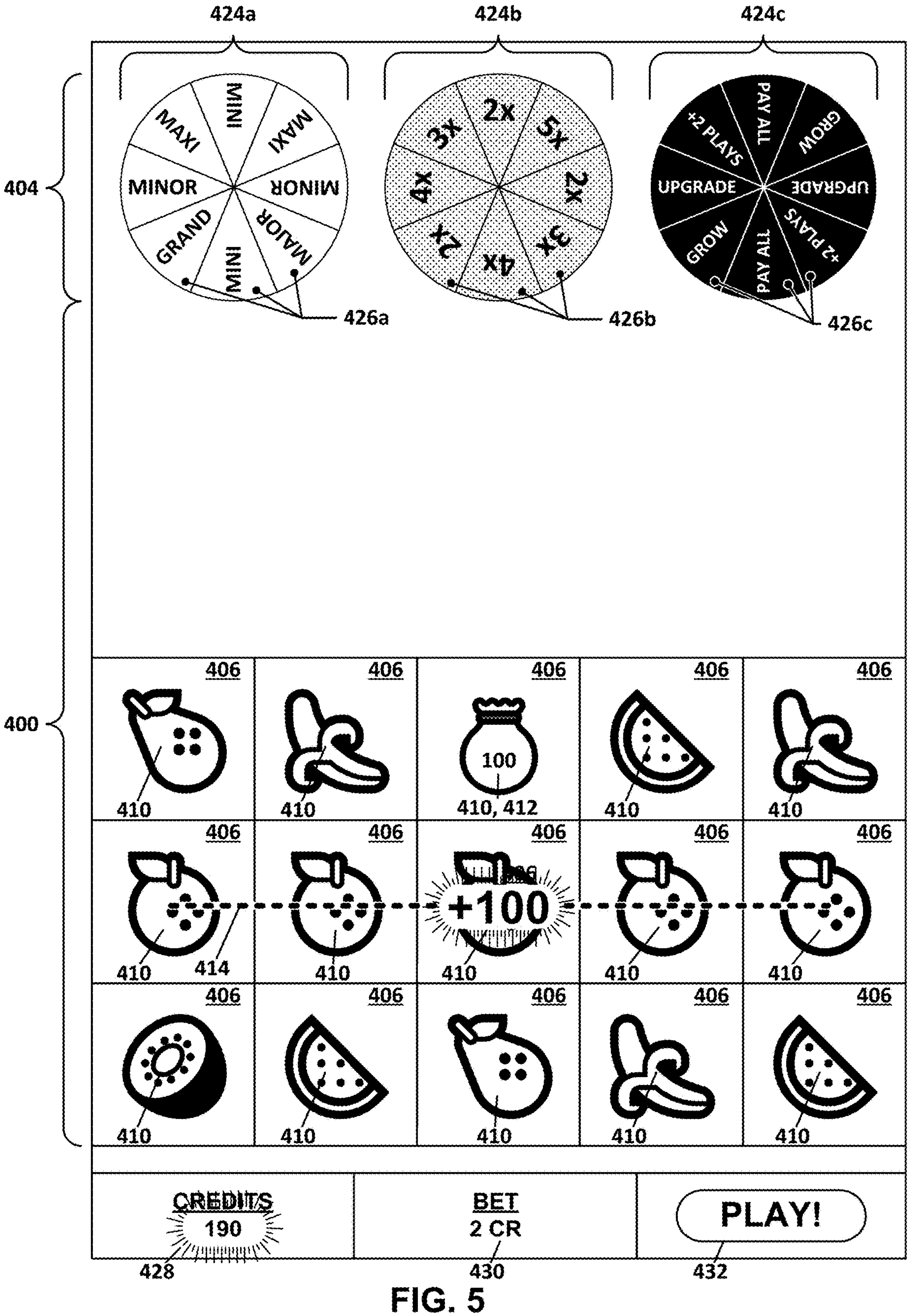

In FIG. 5, a play of the base game has occurred and the GUI for the base game 400 has been updated to display a new set of symbols 410 in the symbol positions 406. Again, the first triggering condition that would cause the feature game to be displayed has not been met in this play of the base game and the feature game is thus not initiated. However, in this particular base game outcome, a set of five identical "orange" symbols (an example of a potential winning pattern of symbols 410) have been displayed along a payline 414, thereby causing an award of points or credits, e.g., 100 credits in this case, to be added to the credit meter 428. It will be appreciated that the payline 414 may be one of several paylines that may be defined for the game of chance, of course. It will be noted that several intervening plays of the base game have occurred in between FIGS. 4 and 5, as the credit meter reflects a value of 190 credits (which includes the 100 credits attributable to the payline outcome). For example, the player may have engaged in four prior plays of the base game prior to this play of the base game, resulting in the number of credits reflected in the credit meter dropping to 90 credits prior to the win of 100 credits reflected in FIG. 5.

Figure 6:
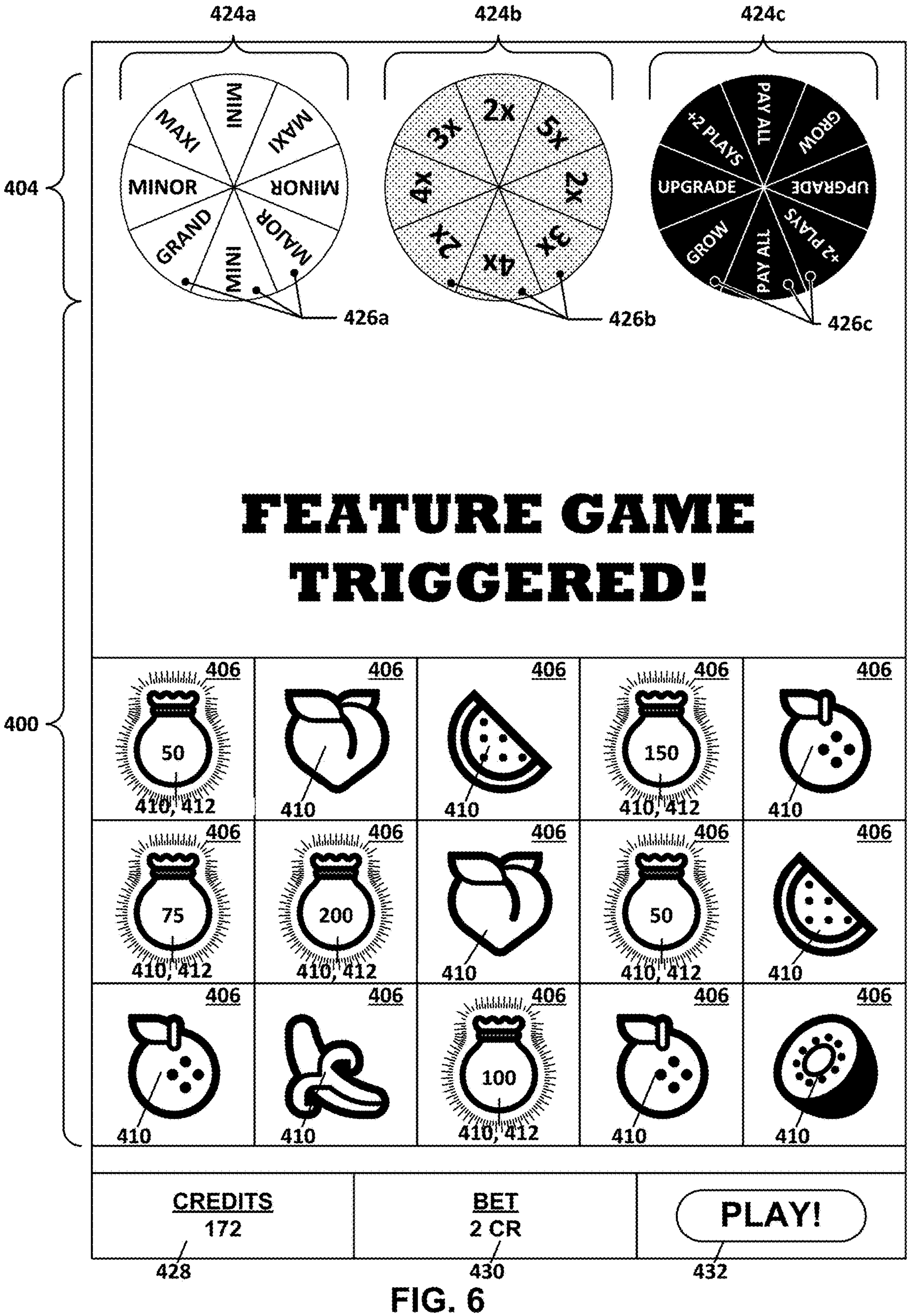

In FIG. 6, the GUI of the base game 400 has been updated to depict another new outcome for another play of the base game. In this particular base game play, the symbols 410 selected for display in the symbol positions 406 include six symbols 410 that are of the triggering symbol type 412, thereby causing the feature game to be initiated. The GUI for the base game 400 may, for example, be updated to indicate, e.g., via text such as "FEATURE GAME TRIGGERED!", that the feature game has been triggered. It will be noted that several plays of the base game have occurred in between FIGS. 5 and 6, as the credit meter has dropped to 172 credits (reflecting at least 8 prior plays of the base game at the indicated bet level).

Figure 7:
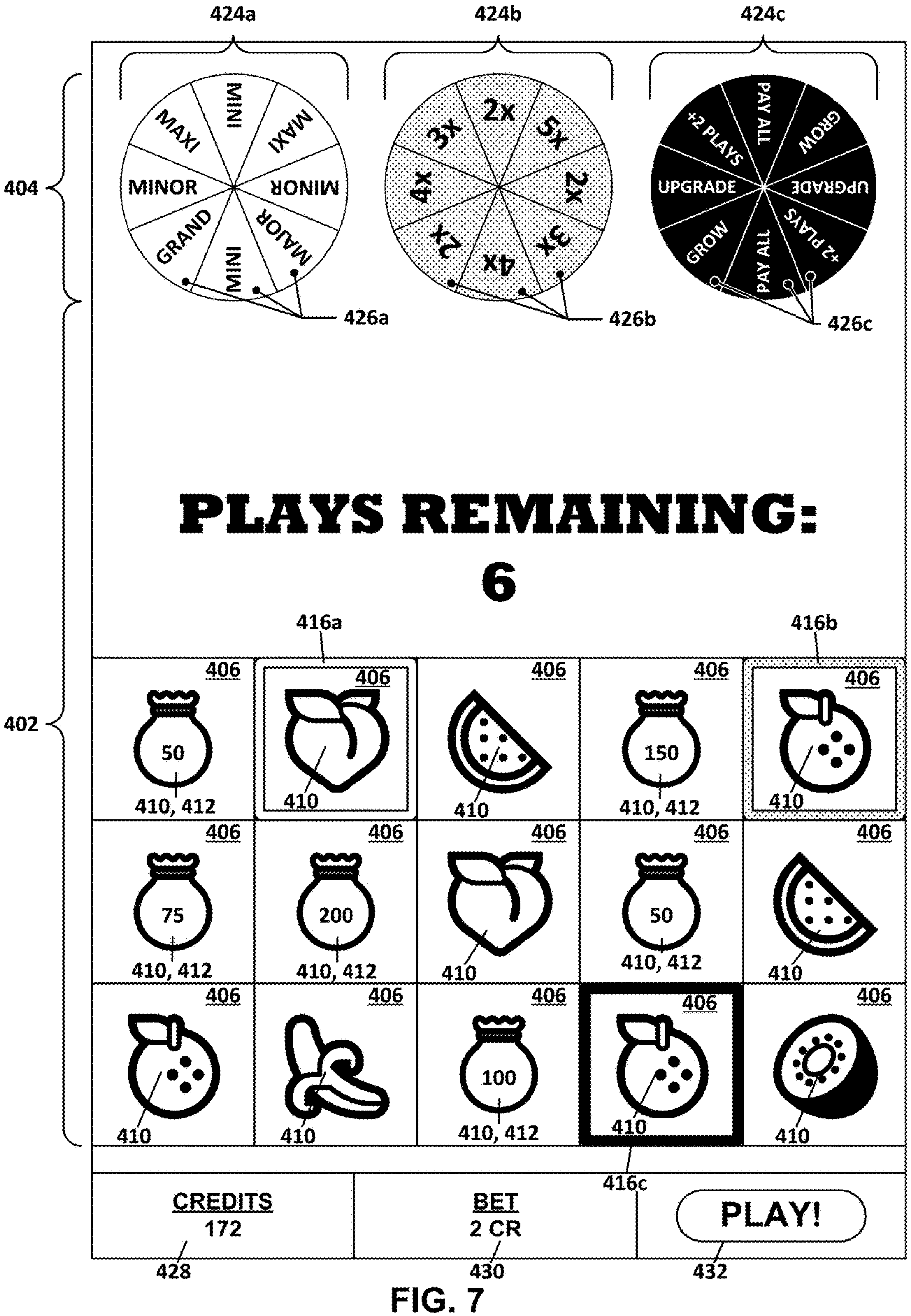

In FIG. 7, a GUI for the feature game 402 has been presented. The GUI for the feature game 402 shares many similarities with the GUI for the base game 400, e.g., sharing the columns of symbol positions 406, as well as the symbols 410 shown in the symbol positions 406 that were displayed in the base game outcome that resulted in the feature game being triggered. Thus, the GUI for the feature game 402 may utilize the same symbol positions 406 as are displayed in the GUI for the base game 400.

During feature game play, symbols 410 that are of a first symbol type may generally be "held" in place during feature game plays, i.e., symbols 410 may be newly selected during each feature game play for symbol positions 406 that do not display symbols 410 that are of the first symbol type, while the symbols 410 that are of the first symbol type that are displayed remain unchanged during such feature game plays. In the present example, the first symbol type is the same as the triggering symbol type 412, and either may be referred to by the callout 412. However, in other implementations, the triggering symbol type 412 may be a different symbol type than the first symbol type. In such alternate implementations, the symbols 410 of the triggering symbol type 412 that triggered the initiation of the feature game due to being displayed in the GUI for the base game 400 may be replaced by newly selected symbols 410 in the first play of the feature game after the initiation of the feature game (although if symbols 410 of the first symbol type were also displayed in the outcome for the base game that resulted in triggering initiation of the feature game, those symbols 410 of the first symbol type would be "held" in their symbol positions 406 during play of the feature game even though the symbols of the triggering symbol type 412 would be replaced with newly selected symbols 410).

As noted earlier, the GUI for the feature game 402 may provide graphical indications of one or more selected symbol positions. Each selected symbol position is selected from the symbol position or positions 406 that do not display a symbol or symbols of the first symbol type. In this example, there are three selected symbol positions and the graphical indications of which symbol positions 406 are selected symbol positions are provided by way of frames 416*a*, 416*b*, and 416*c*. It will be noted that each selected symbol position is associated with a corresponding graphical characteristic that corresponds with the graphical characteristic of one of the bonus game elements, e.g., one of the wheel displays 424*a*, 424*b*, or 424*c*. For example, the frame 416*a* is colored white and thus has the same graphical characteristic as the wheel display 424*a*. Similarly, the frame 416*b* has a speckled gray background and thus has the same graphical characteristic as the wheel display 424*b* and the frame 416*c* has a black background and thus has the same graphical characteristic as the wheel display 424*c*. The selection of which symbol positions 406 are selected symbol positions may, for example, be a random selection in some implementations. In other implementations, the selection of which symbol positions 406 are selected symbol positions may be made according to a predetermined selection rule, e.g., one symbol position may be selected from each row of symbol positions. Once a symbol position 406 is designated as being a selected symbol position (or multiple selected symbol positions), that symbol position 406 may stay as that selected symbol position or those selected symbol positions until either the feature game concludes or until a symbol 410 of the first symbol type is displayed in that symbol position 406.

It will be appreciated that in some implementations, the selected symbol positions may, as noted earlier, be selected such that no symbol position 406 initially serves as more than one selected symbol position. However, as also noted earlier, as the number of symbol positions 406 that do not display a symbol 410 of the first symbol type decrease in number, at some point, it will be necessary (for implementations in which there are multiple selected symbol positions) for a symbol position 406 to serve as two or more selected symbol positions. This is explained in more depth with respect to later Figures.

In some implementations, the selection of symbols 410 for display in the symbol positions 406 during play of the feature game may, for example, be implemented by randomly selecting a symbol 410 for display in a symbol position 406 from a plurality of symbols 410 (which may generally include a mix of different symbols 410) associated with that symbol position 406. In other implementations, the symbols 410 displayed in each of the symbol positions 406 of each column as a result of a play of the feature game may be randomly selected as a block from a larger, ordered sequence of symbols 410, similar to one of the potential symbol selection techniques discussed above with respect to the base game. For example, each column may be associated with a particular ordered sequence of symbols 410, e.g., a reel strip, and a random selection may be made of X adjacent symbols 410 in that ordered sequence of symbols, where X is the number of symbol positions 406 in the associated column of symbol positions 406 (the ordered sequences of symbols may be circular or modulo sequences such that when a selected block of symbols 410 extends past the start or end of the sequence, the symbols 410 at the other of the end and the start of the sequence are used to provide missing symbols 410). The corresponding symbol 410 in the selected block of symbols 410 for each symbol position 406 that does not currently display a symbol 410 of the first symbol type 412 may then be displayed in that symbol position 406.

The GUI for the feature game 402 may also indicate, in some fashion, a number of feature game plays remaining before the feature game terminates. For example, when the feature game is initiated, the player may be provided with a predetermined number of plays of the feature game that may limit the duration of the feature game. The indication of how many feature game plays remain before the feature game terminates may, generally speaking, be updated after each feature game play to reflect an updated number of feature game plays remaining, e.g., decrementing the number of feature game plays available by one play after each play of the feature game. In the GUI for the feature game 402, such an indication is provided by way of the text positioned in the middle of the GUI for the feature game 402, e.g., that indicates “PLAYS REMAINING: 6.”

Figure 8:
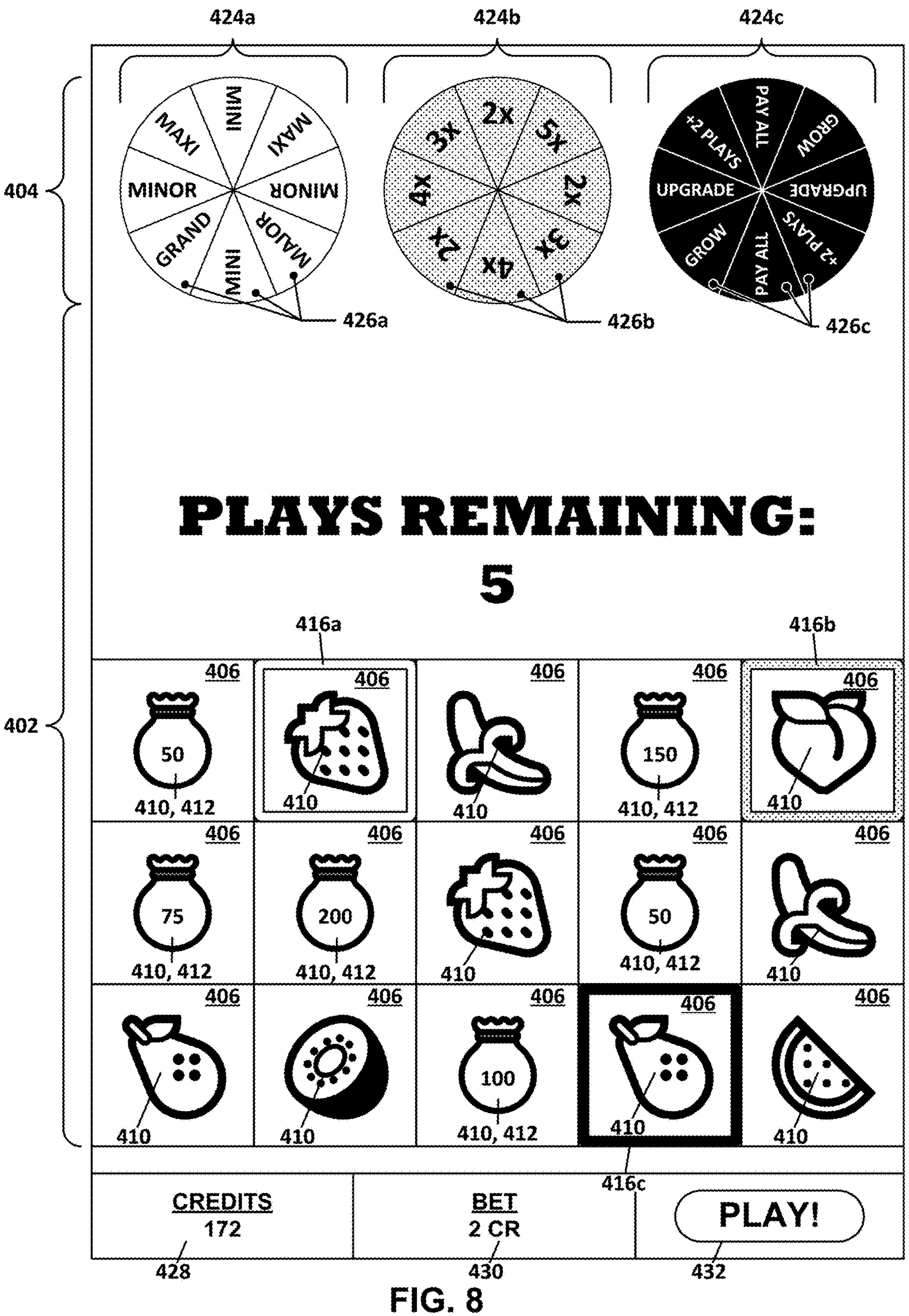

FIG. 8 depicts the GUI for the feature game 402 after a play of the feature game has occurred. New symbols 410 have been selected and displayed in the symbol positions 406 that did not already display symbols 410 of the first symbol type 412. Were the symbols 410 selected for display in such symbol positions to have included another symbol 410 of the first symbol type 412, then the total number of plays of the feature game provided to the player in association with the current presentation of the feature game would be increased by at least one feature game play. In this example, however, this has not occurred, and the indicated number of feature game plays available to the player (as indicated in the text across the middle of the GUI for the feature game 402) has been decremented by one, indicating that the player has five remaining plays of the feature game available.

Figure 9:
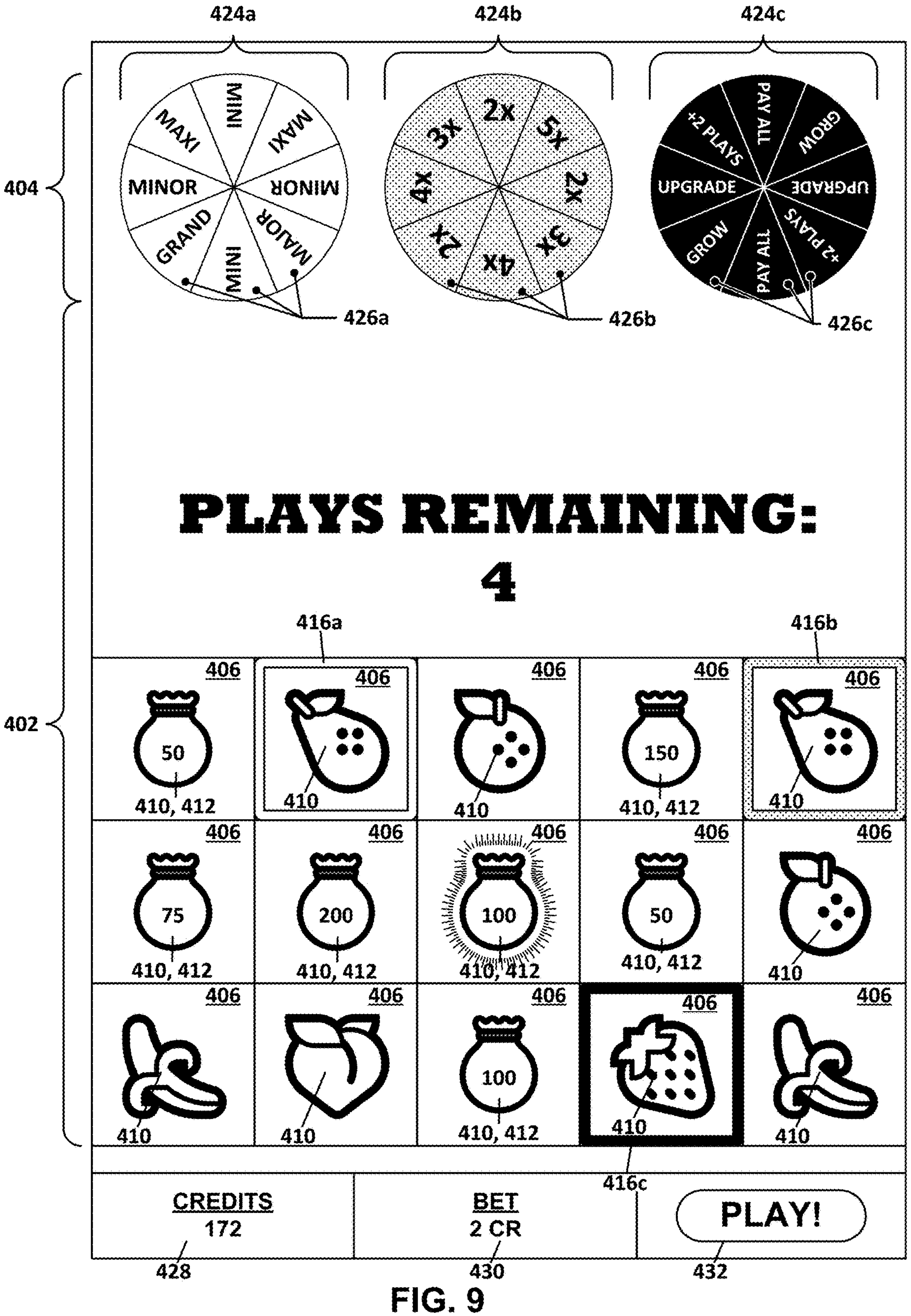

FIG. 9 depicts the GUI for the feature game 402 after another play of the feature game has occurred. As with FIG. 8, a new selection of symbols 410 has been caused to be displayed in the symbol positions 406 that did not already display symbols 410 of the first symbol type 412. In this particular example, one of the symbol positions 406 (the one in the middle row and middle column of symbol positions 406) that did not already display a symbol 410 of the first symbol type 412 immediately prior to this play of the feature game now displays a symbol 410 of the first symbol type 412.

Figure 10:
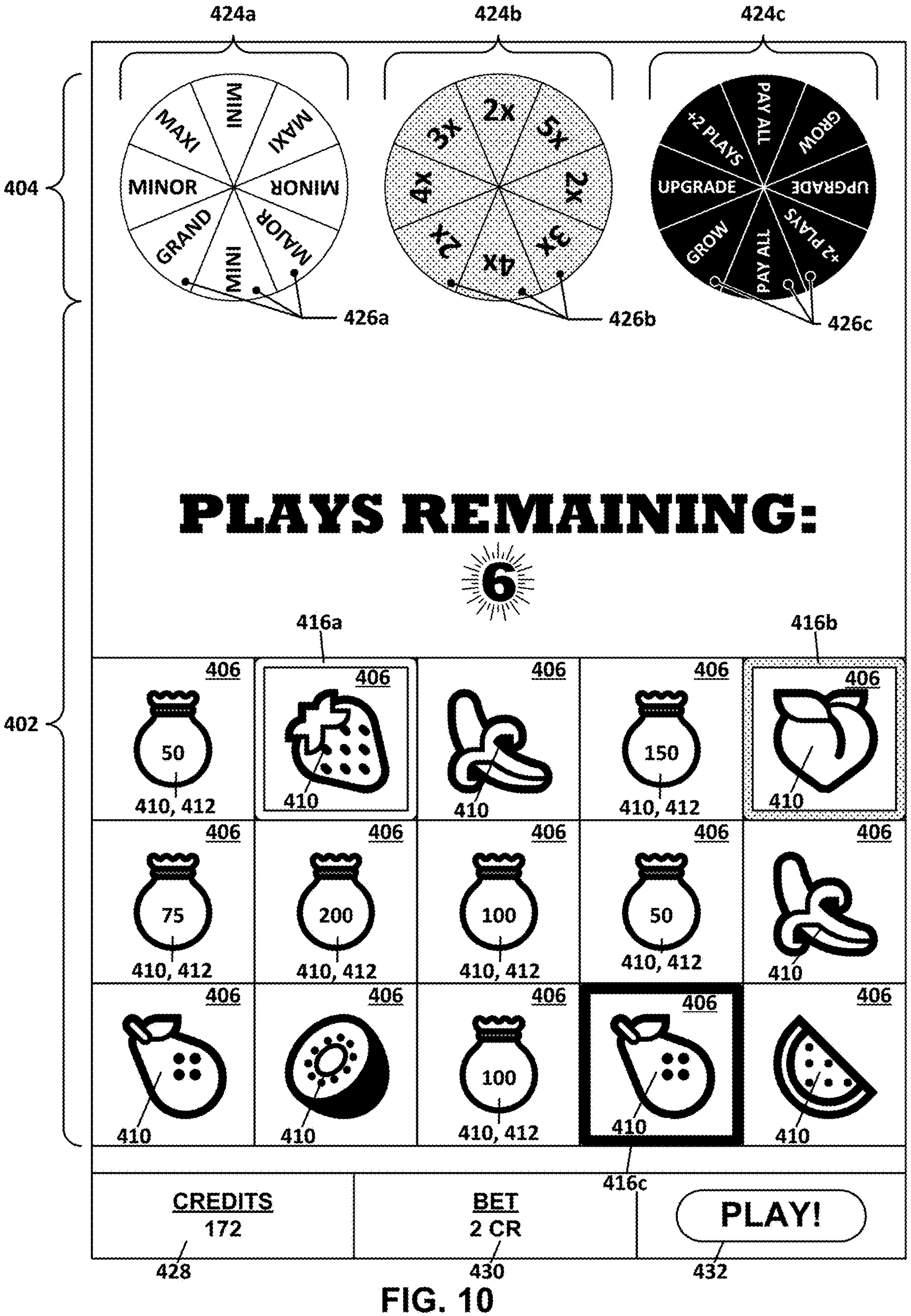

In this example, a display of one or more newly displayed symbols 410 of the first symbol type 412 as a result of a feature game play results in the total number of feature game plays remaining being incremented by an amount sufficient to restore the total number of feature game plays available to the player to the number of feature game plays that were initially made available to the player on initiation of the feature game, e.g., six feature game plays (as indicated by the updated value of “6” shown in association with the “PLAYS REMAINING:” text of FIG. 10). However, in other implementations, the number of additional feature game plays awarded to the player may be increased differently. For example, in some implementations, the number of additional feature game plays that may be awarded to a player as a result of a feature game play that results in one or more newly displayed symbols 410 of the first symbol type 412 being displayed in the symbol positions 406 may be dependent on the number of newly displayed symbols 410 of the first symbol type 412 that are displayed in the symbol positions 406. For example, one newly displayed symbol 410 of the first symbol type 412 being displayed in a symbol position 406 may result in X additional plays of the feature game being awarded to the player, while two newly displayed symbols 410 of the first symbol type 412 being displayed in corresponding symbol positions 406 may result in Y additional plays of the feature game being awarded to the player and three newly displayed symbols 410 of the first symbol type 412 being displayed in corresponding symbol position 406 may result in Z additional plays of the feature game being awarded to the player, where $X<Y<Z$.

In yet other implementations, the number of feature game plays remaining may not be incremented responsive to the mere display of a symbol 410 of the first symbol type 412 as part of the newly displayed symbols, as discussed above. In such implementations, the number of feature game plays remaining may instead be incremented responsive to other conditions being met. For example, in some implementations, additional feature game plays may be provided to a player responsive to obtaining a particular outcome or outcomes during play of a bonus game that may be triggerable from the feature game, e.g., as discussed below with respect to the wheel display 424*c* of FIG. 13. In some such implementations, such a mechanism for providing additional feature game plays, and thus incrementing the “PLAYS REMAINING” counter, may be the only way in which the number of feature game plays remaining may be increased during a play of the feature game.

Figure 11:
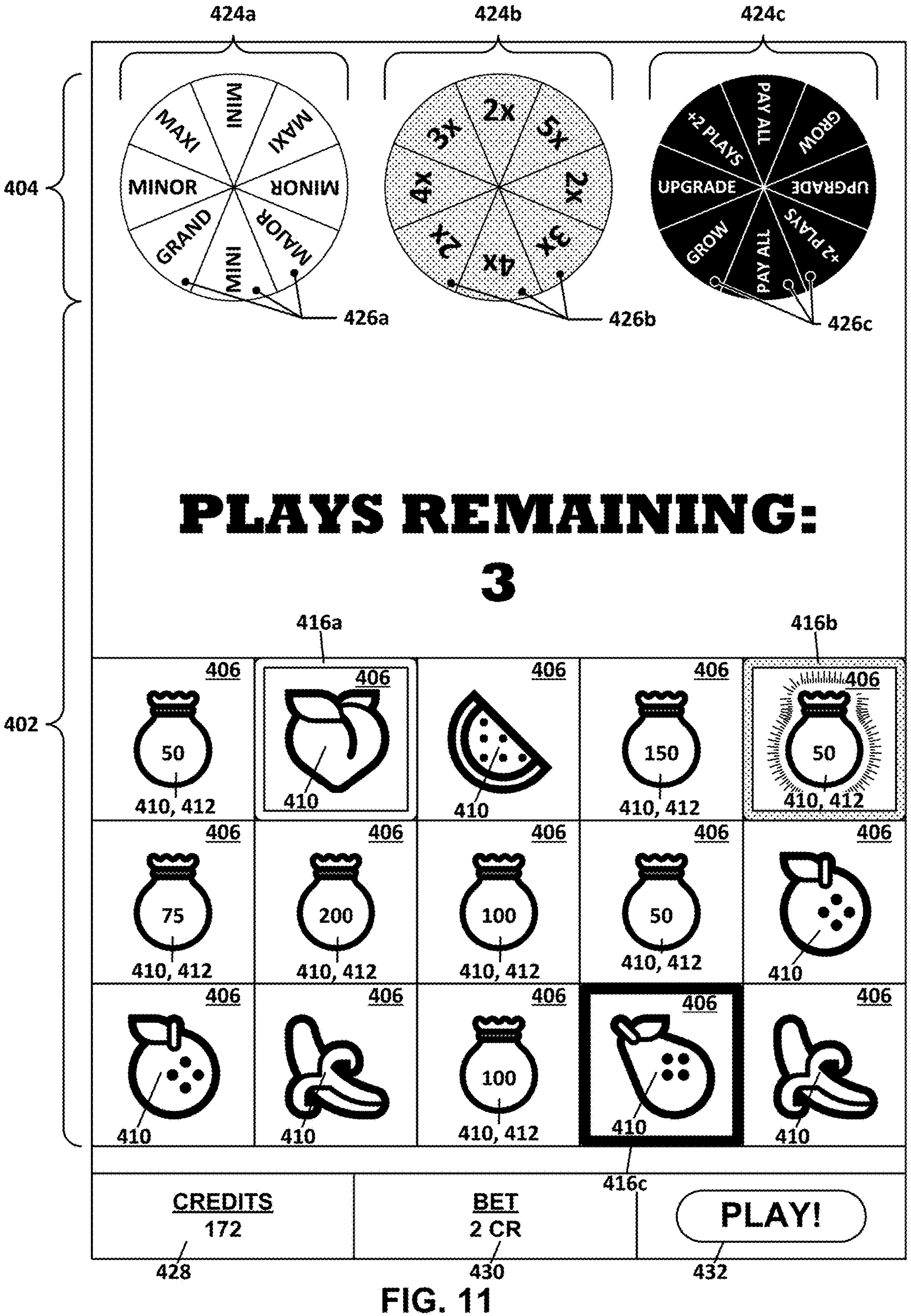

FIG. 11 shows the GUI for the feature game 402 after yet another feature game play has occurred and a new selection of symbols 410 has been caused to be displayed in the symbol positions 406 that did not already display symbols 410 of the first symbol type 412. In this example, one of the newly displayed symbols 410 is a symbol 410 of the first symbol type 412 and is displayed in one of the selected symbol positions, e.g., the selected symbol position indicated by the frame 416*b*.

Figure 12:
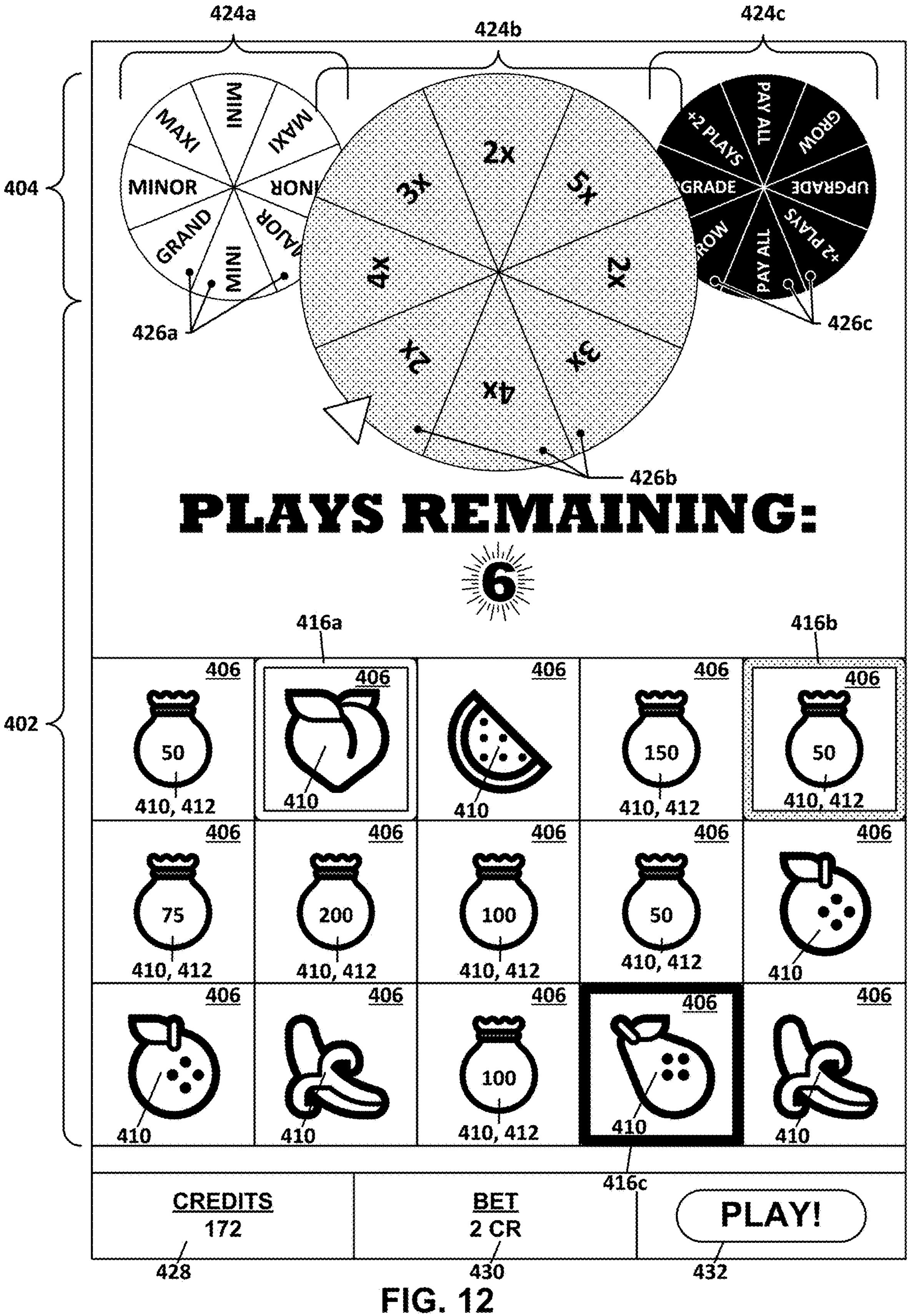

As noted earlier, when a symbol 410 of the first symbol type 412 is caused to be displayed in a selected symbol position during feature game play, play of a corresponding bonus game element may be initiated. In this example, the corresponding bonus game element is the wheel display 424*b*, which has the same graphical characteristic as the frame 416*b*. In this example, when play of a bonus game element is initiated, the bonus game element, e.g., the wheel display 424*b*, may be enlarged and an additional graphical element, e.g., a triangular pointer, may be added to the wheel display 424*b*. This is shown in FIG. 12.

Figure 13:
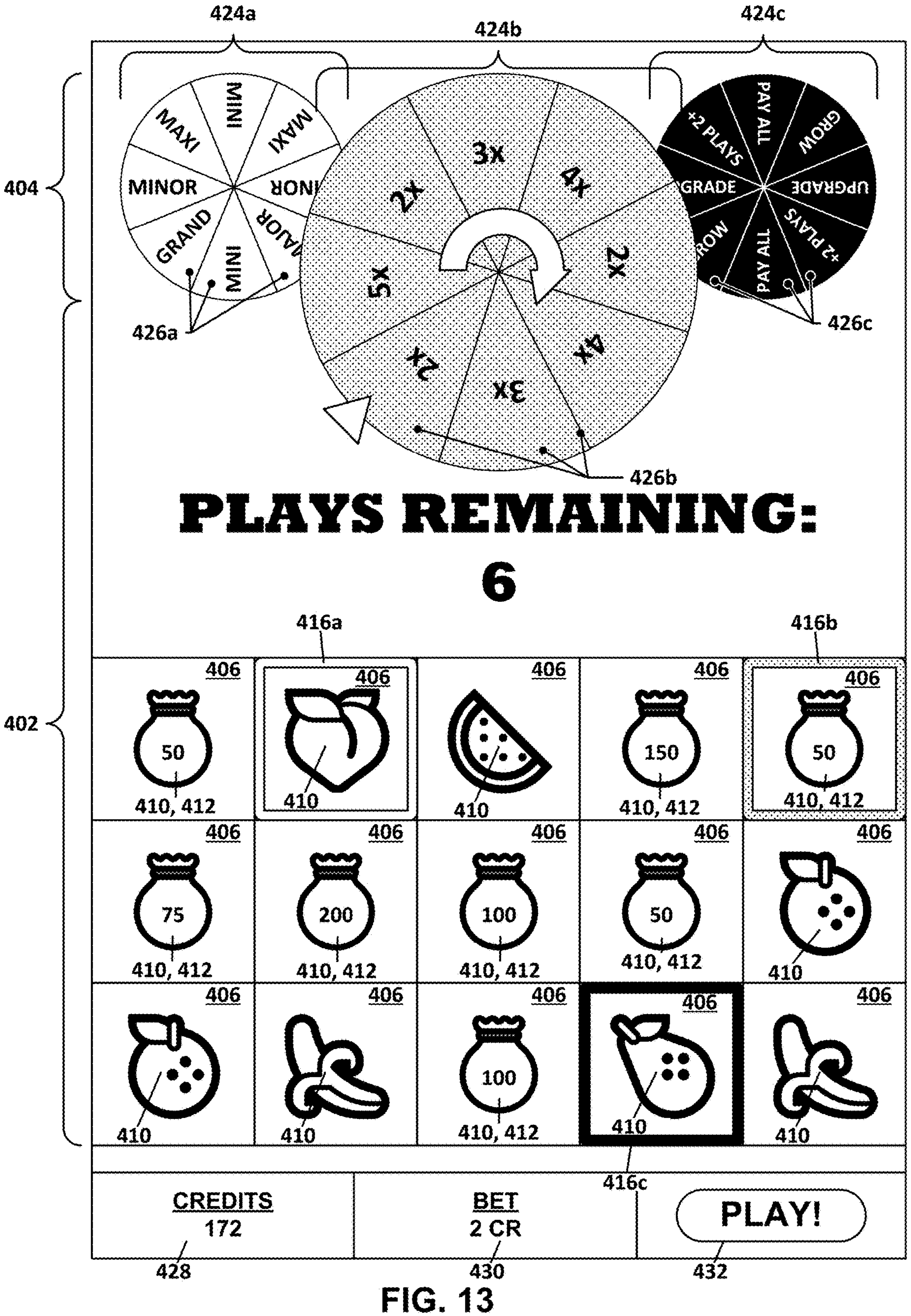

In FIG. 13, the GUI for the bonus game 404 has been updated to reflect a spin of the wheel segments 426*b* about the center of the wheel display 424*b*.

In this example, each of the wheel displays 424*a*, 424*b*, and 424*c* has corresponding wheel segments 426*a*, 426*b*, and 426*c* that feature different types of awards. For example, the wheel segments 426*a* are each associated with a respective jackpot award amounts, e.g., credits or points, that may be immediately awarded to the player if the corresponding wheel segment 426*a* is selected during bonus game play using the wheel display 424*a*. Such jackpot amounts are indicated, in this case, by indicators such as "MINI," "MAXI," "MINOR," "MAJOR," or "GRAND," each of which may correspond to a different jackpot amount. In other implementations, the actual jackpot amounts associated with each such wheel segment 426*a* may actually be indicated on the wheel segments 426*a*.

Similarly, the wheel segments 426*b* are each associated with a respective multiplier value that may, if the corresponding wheel segment 426*b* is selected during bonus game play, be used to multiply a point or credit value that is associated with a randomly selected one of the symbols 410 of the first symbol type 412. The resulting product may then be immediately awarded to the player.

Whereas the wheel displays 424*a* and 424*b* may, when used to provide bonus game play, provide instantaneous awards in the form of credits or points, the wheel display 424*c* may potentially provide different awards. For example, the wheel segments 426*c* indicate awards or benefits that may affect future feature game play in addition to awards or benefits that may take the form of an immediate award of credits or points. For example, the wheel segments 426*c* that indicate "PAY ALL" may, when selected during bonus game play, cause the player to be immediately awarded an amount of credits or points that is the sum of all of the values indicated for the symbols 410 of the first symbol type 412. However, the other wheel segments 426*c* may provide other benefits to the player that may be of use in later plays of the bonus game. For example, the wheel segments 426*c* indicating "+2 PLAYS" may, when selected, increment the number of feature game plays remaining by two additional plays. In another example, the wheel segments 426*c* indicating "UPGRADE" may, when selected, cause one or more of the displayed symbols 410 of the first symbol type 412 to have the credit or point values associated therewith to be increased. The symbol or symbols 410 of the first symbol type 412 that is or are upgraded may, in some cases, be randomly selected, but in other cases may be selected according to predetermined rules, e.g., the symbols 410 of the first symbol type 412 having the lowest-value credit or point values associated therewith may be selected for upgrade. Such upgraded amounts for symbols 410 of the first symbol type 412 may be selected in a variety of ways. In some implementations, there may be a plurality of different pre-set amounts that the value associated with each symbol 410 of the first symbol type 412 may be drawn from; when such a value is "upgraded," it may be caused to be replaced by the next largest amount in the pre-set amounts. In other implementations, the value associated with an upgraded symbol 410 may be based on the pre-upgraded value of that symbol 410, e.g., a 2× or 3× multiple of the pre-upgraded value of that symbol 410. In yet further implementations, such a symbol 410 may be upgraded by a pre-set value that is independent of the pre-upgraded value, e.g., by 100 credits.

In yet another example, the wheel segments 426*c* indicating "GROW" may, when selected, cause an additional row of symbol positions 406 to be added to the GUI for the feature game 402 (up to a maximum predetermined number of symbol positions 406).

In FIG. 13, the spin of the wheel segments 426*b* about the center of the wheel display 424*b* has resulted in a wheel segment 426*b* indicating a "2×" multiplier being selected (indicated by the triangular pointer).

Figure 14:
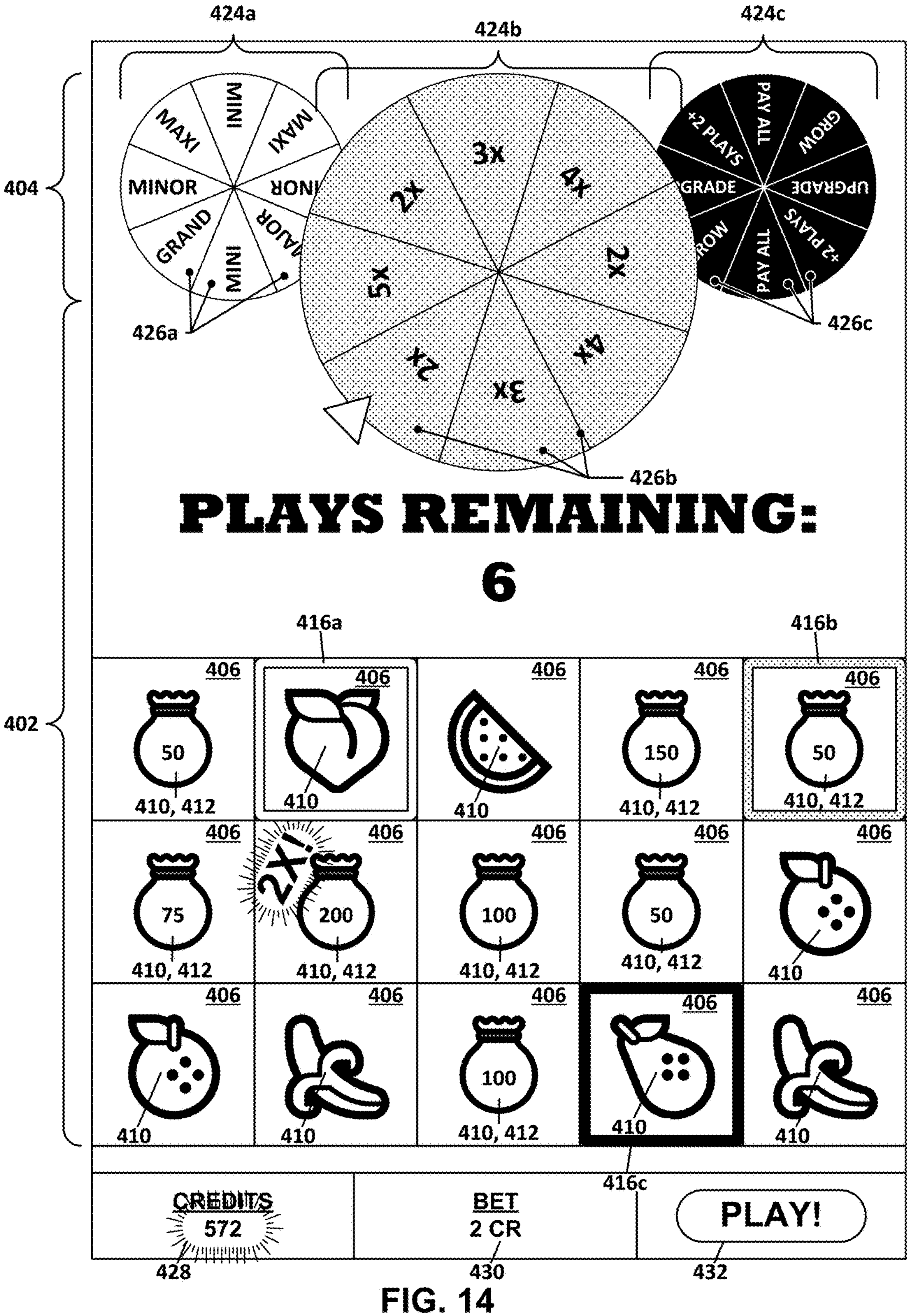

In FIG. 14, one of the symbol positions 406 displaying a symbol 410 of the first symbol type 412 has been selected, e.g., randomly, to be multiplied by the 2× multiplier value that was selected through the bonus game play. The GUI for the feature game 402 has been updated to indicate that the symbol 410 of the first symbol type 412 located in the symbol position 406 second from the left in the middle row of symbol positions 406 will have its value, e.g., 200 credits or points, multiplied by a value of two and then added to the credits or points of the player.

Figure 15:
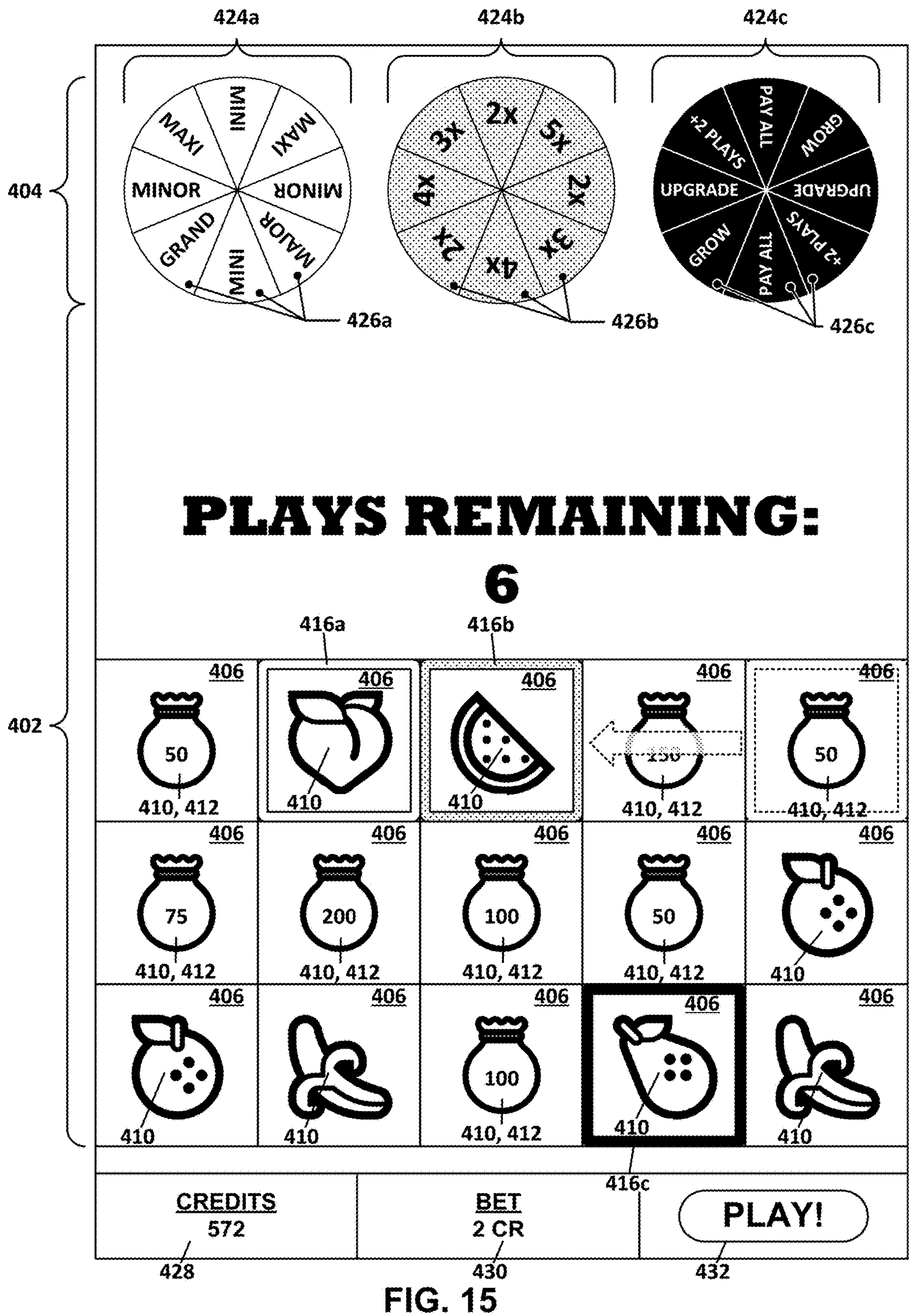

In FIG. 15, the bonus game play has concluded and the GUI for the feature game 402 has been updated to indicate that a new symbol position 406 that is not displaying a symbol 410 of the first symbol type 412 is the selected symbol position associated with the bonus game element for which play just concluded. For example, the frame 416*b* that indicated the upper right symbol position 406 as the selected symbol position associated with the wheel display 424*b* has been relocated (as indicated by the dotted arrow-however, the GUI for the feature game may not include display of such an arrow) to indicate that the symbol position 406 in the middle of the top row of symbol positions 406 is the selected symbol position associated with the wheel display 424*b*.

Figure 16:
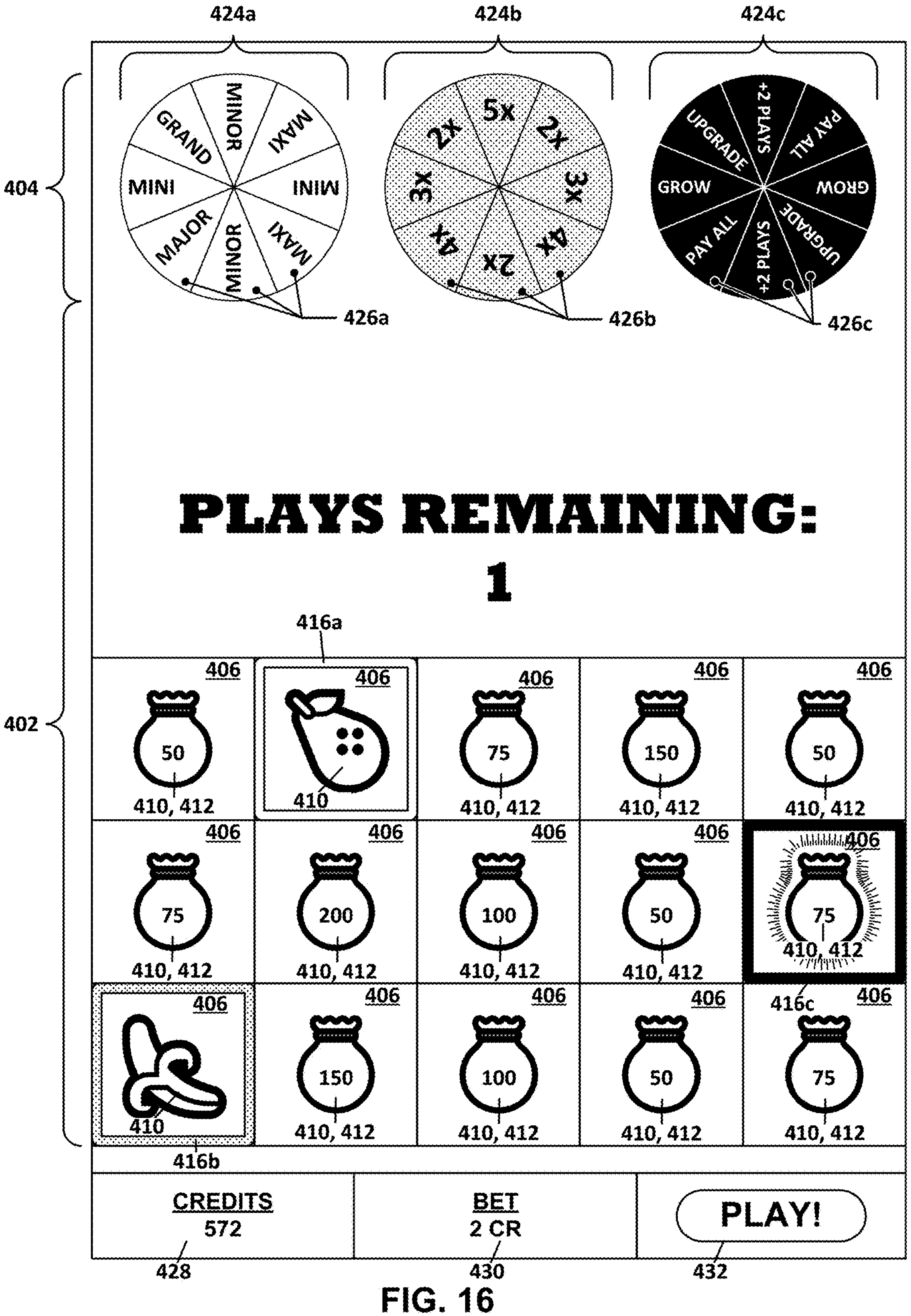

In FIG. 16, a further play of the feature game has occurred. In this instance, there have been several additional plays of the feature game in between the state depicted in FIG. 15 and that depicted in FIG. 16. As a result of such feature game plays, every symbol position 406 either depicts a symbol 410 of the first symbol type 412 or is indicated as being a selected symbol position via one of the frames 416*a*, 416*b*, or 416*c*. In the feature game play of FIG. 16, the middle symbol position 406 of the right-most column of symbol positions 406 (which is also the selected symbol position associated with the wheel display 424*c*) has a newly displayed symbol 410 of the first symbol type 412 located therein. This, in turn, causes initiation of play of the bonus game element, e.g., the wheel display 424*c*, associated with that symbol position 406.

Figure 17:
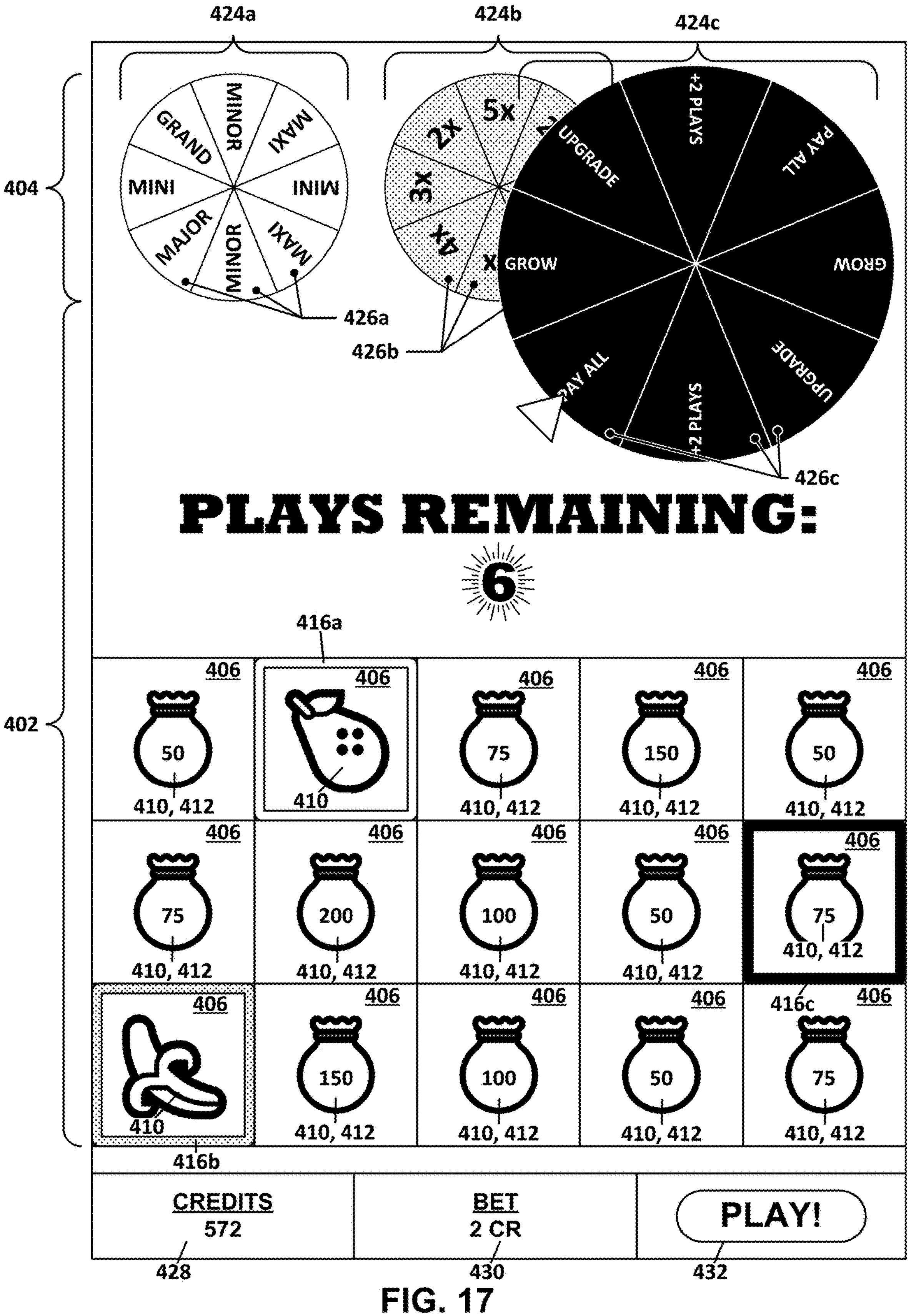
Figure 18:
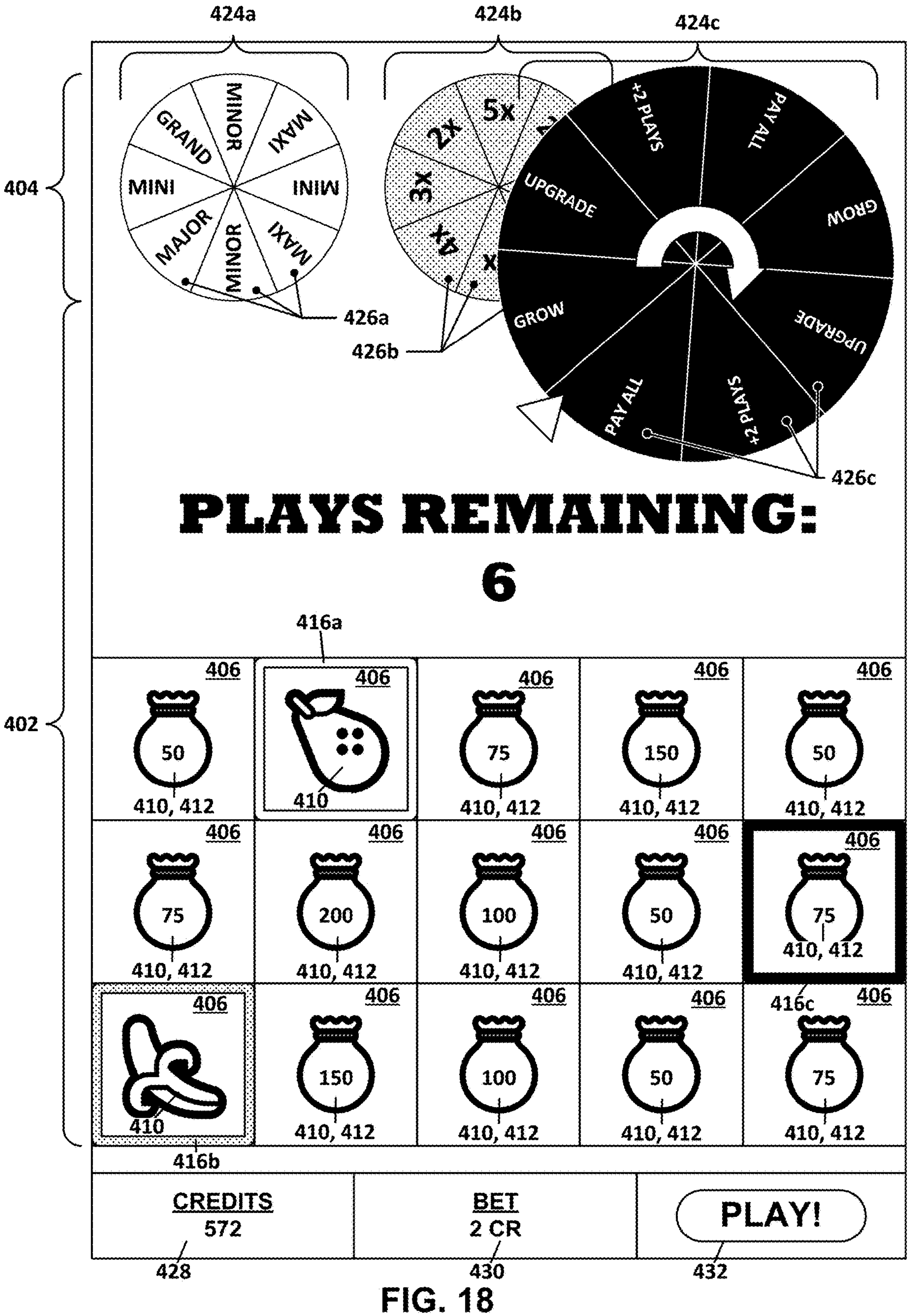
Figure 19:
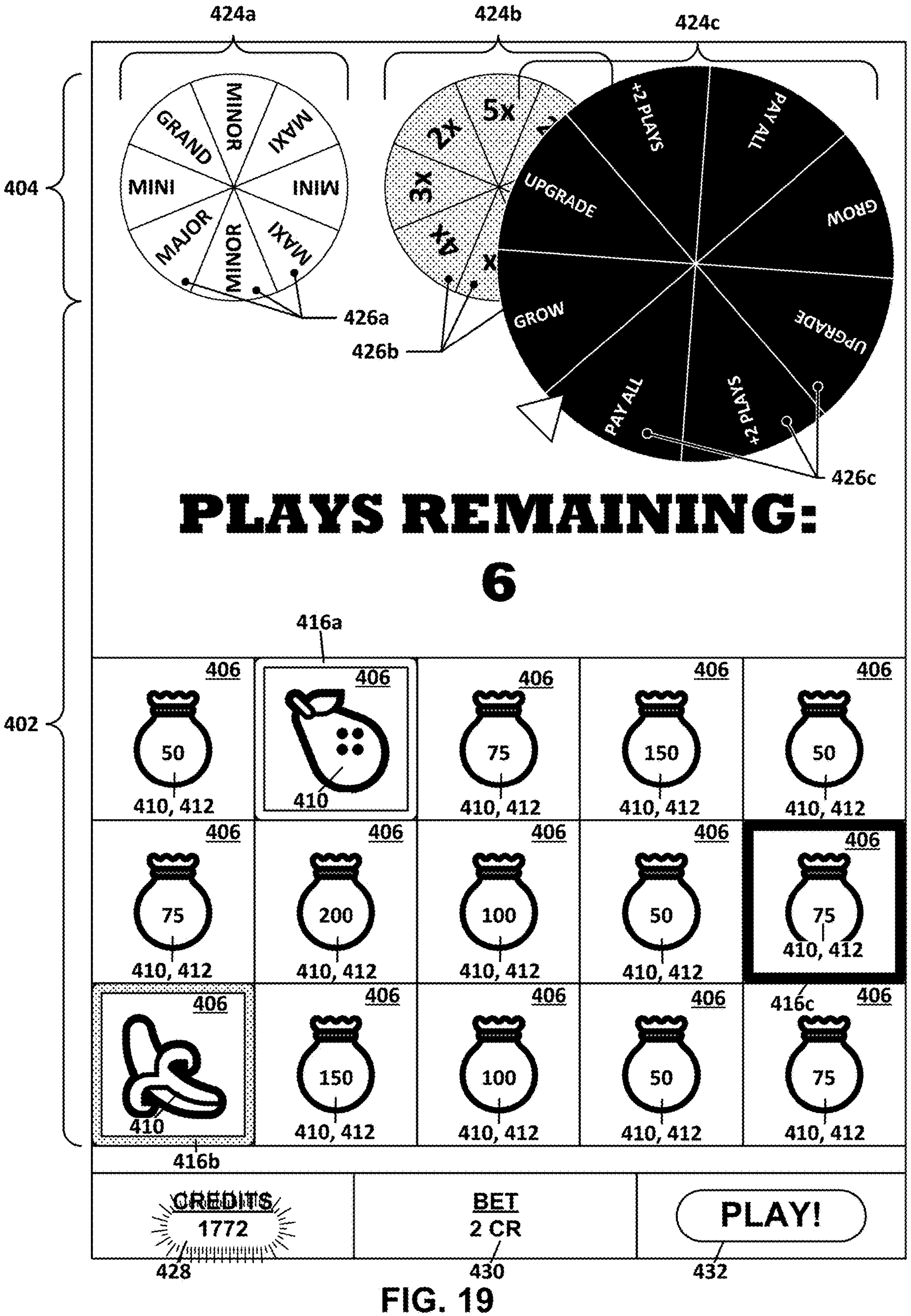

In FIG. 17, the wheel display 424*c* has been expanded in size (similar to how the wheel display 424*b* was enlarged earlier) and a pointer element added thereto. In FIG. 18, the wheel segments 426*c* have been caused to rotate about the center of the wheel display 424*c* during play of the bonus game element, resulting in a wheel segment 426*c* indicating "PAY ALL" being selected as a result of that bonus game play. As discussed above, this causes an immediate award of the sum of all of the amounts indicated for the symbols 410 of the first symbol type 412, as shown in FIG. 19.

Figure 20:
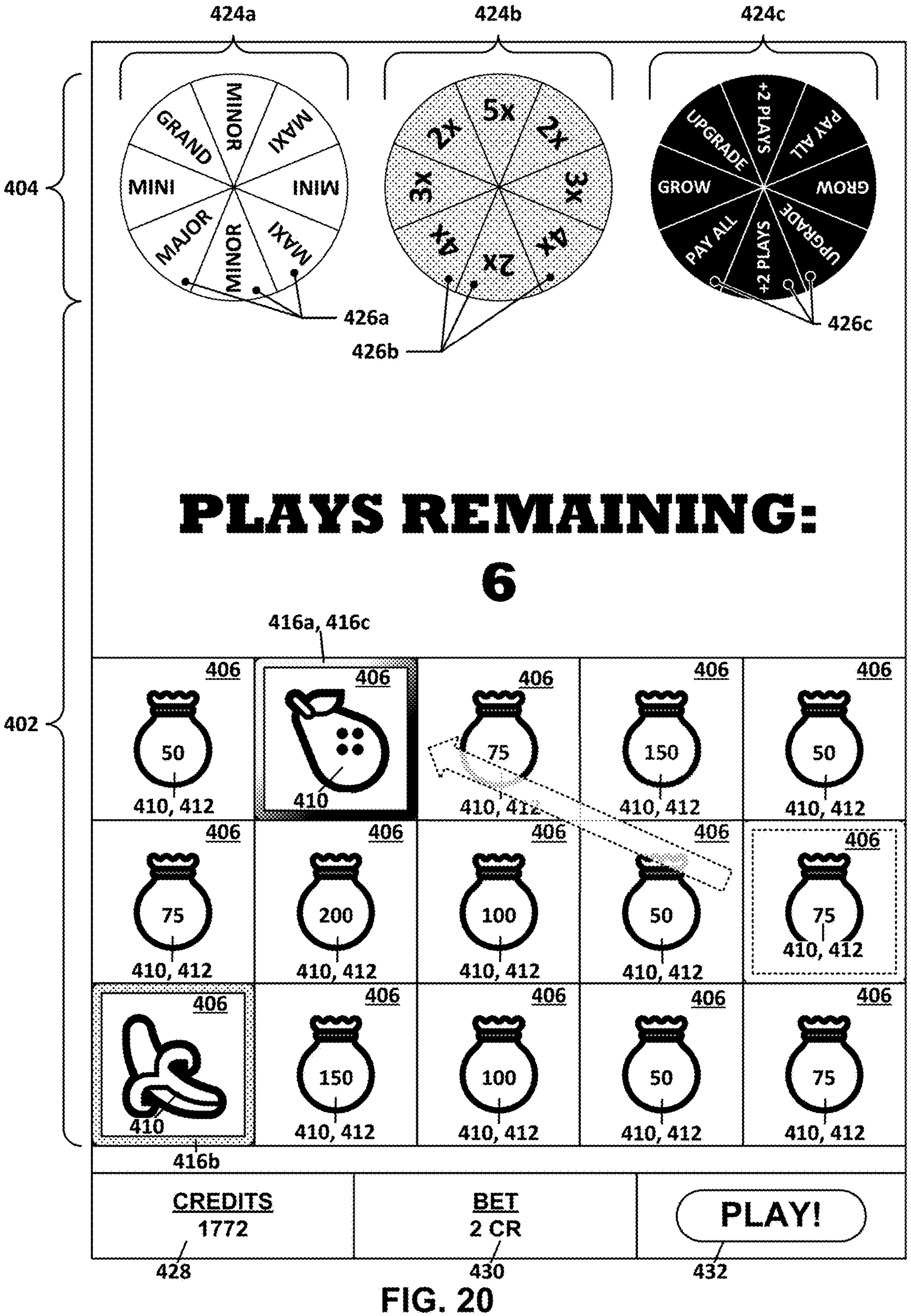

In FIG. 20, the bonus game play has concluded and the GUI for the feature game 402 has been updated to indicate that a new symbol position 406 that is not displaying a symbol 410 of the first symbol type 412 is the selected symbol position associated with the bonus game element for which play just concluded. For example, the frame 416*c* that indicated the middle right symbol position 406 as the selected symbol position associated with the wheel display 424*c* has been relocated (as indicated by the dotted arrow-however, the GUI for the feature game may not include display of such an arrow) to indicate that the symbol position 406 in the second symbol position 406 from the left of the top row of symbol positions 406 is the selected symbol position associated with the wheel display 424*c*. It will be noted that the second symbol position 406 from the left of the top row of symbol positions 406 is two selected symbol positions simultaneously—the selected symbol position associated with the wheel display 424*a* and the selected symbol position associated with the wheel display 424*c*. As there are no other symbol positions 406 that do not display a symbol 410 of the first symbol type 412 other than symbol positions 406 that are selected symbol positions, assigning a new symbol position 406 to be the selected symbol position associated with the wheel display 424*c* requires that one of the remaining symbol positions 406 that is already a selected symbol position associated with one of the other wheel displays 424 be assigned to be the selected symbol position associated with the wheel display 424*c*.

It will be noted that the frame 416*a*/416*c* is a frame that shares graphical characteristics with both the frame 416*a* and the frame 416*c* prior to the reassignment of the selected symbol position(s) discussed above. Thus, the frame 416*a*/416*c* has both a white area and a black area.

Figure 21:
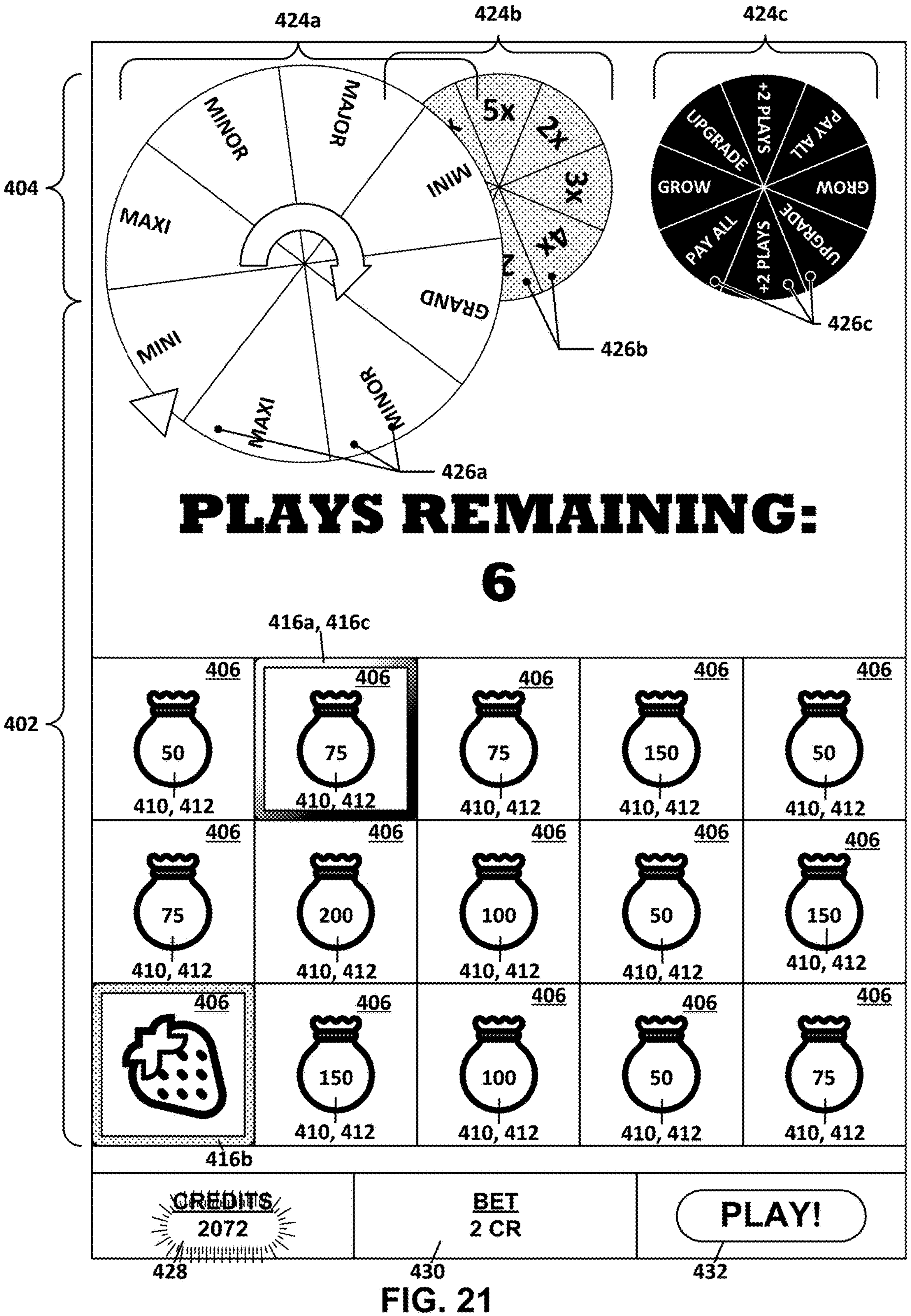

In FIG. 21, a further play of the feature game occurred previously and the GUI for the feature game 402 was updated such that new symbols 410 were displayed in the symbol positions 406 that were not already displaying symbols 410 of the first symbol type 412. There were, prior to the most recent prior play of the feature game, only two such symbol positions 406 left—the one indicated by the frames 416*a* and 416*c*, and the one indicated by the frame 416*b*. In the most recent feature game play, a symbol 410 of the first symbol type 412 was caused to be displayed in the symbol position 406 indicated by the frames 416 and 416*c*, thereby causing play of the bonus game elements represented by the wheel displays 424*a* and 424*c* to be initiated. Such play of bonus game elements may be sequential, e.g., according to a predetermined order. In this example, when a symbol 410 of the first symbol type 412 is displayed in a symbol position 406 that serves as multiple selected symbol positions, a play may be initiated of each bonus game element that is associated with one of the multiple selected symbol positions associated with that symbol position 406. In this particular example, however, if there are multiple selected symbol positions that are associated with a single symbol position 406 that has a symbol 410 of the first symbol type 412 displayed therein, the bonus game elements associated with those selected symbol positions may be activated from left to right.

In FIG. 21, the first bonus game element of the two bonus game elements associated with the wheel displays 424*a* and 424*c* has been caused to be initiated (as indicated by its enlarged size) and the wheel segments 426*a* of the wheel display 424*a* have been caused to rotate about a center of the wheel display 424*a* and a wheel segment 426*a* indicating a "MINI" outcome has been selected by the pointer. The credit meter 428 has been updated to reflect an award of 300 credits, which, in this example, is the amount of credits associated with the MINI jackpot award. It will also be noted that the amount indicated for the symbol 410 of the first symbol type 412 in the right-most symbol position 406 of the middle row of symbol positions 406 has changed from 75 to 150; this resulted from an earlier bonus game element activation in which the wheel segments 426*c* of the wheel display 424*c* were spun about the center of the wheel display 424*c* and a wheel segment 426*c* indicating "UPGRADE" was selected (resulting in the value of the above-referenced symbol 410 of the first symbol type 412 being upgraded, as discussed earlier).

Figure 22:
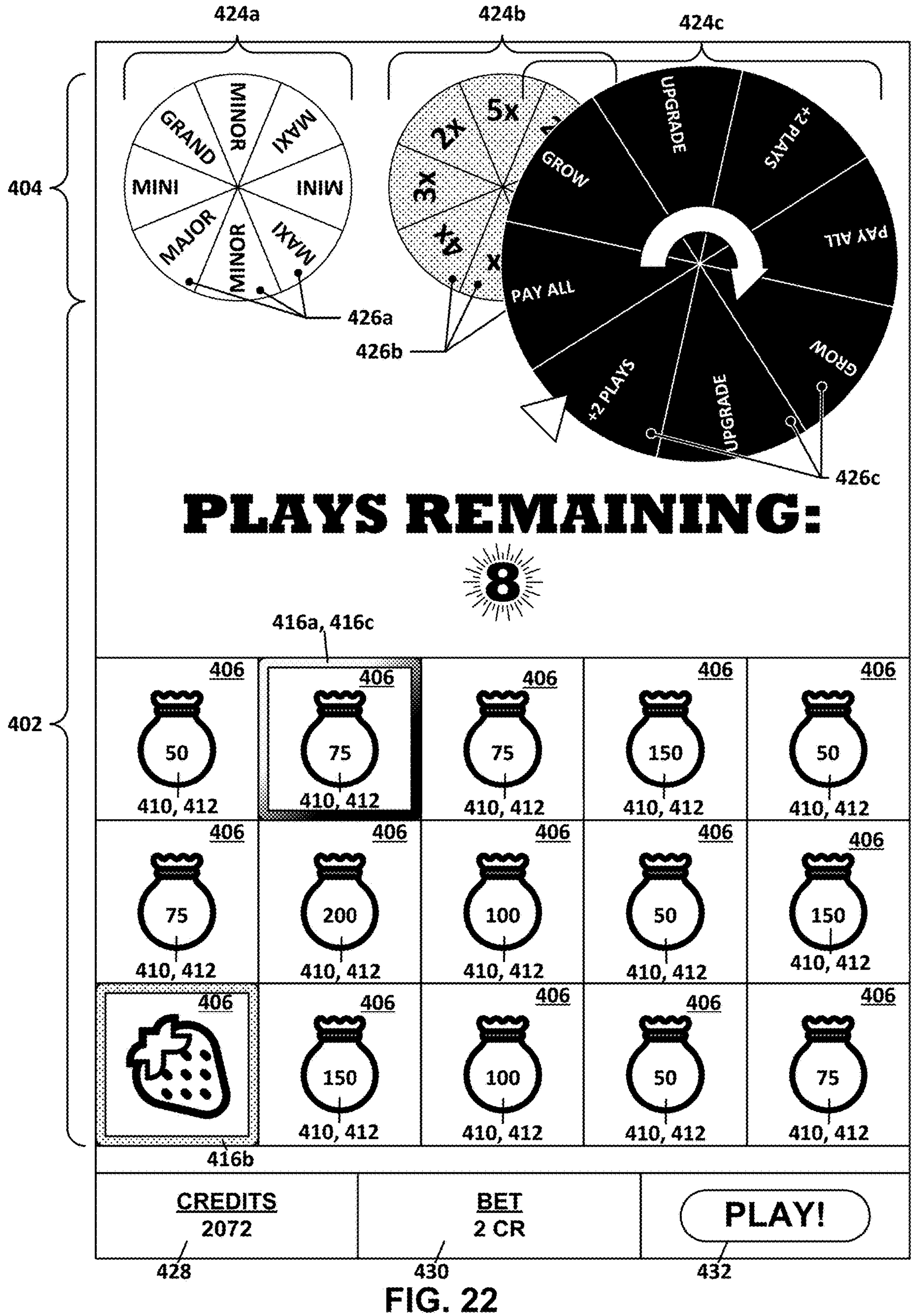

In FIG. 22, the wheel display 424*a* has been caused to return to its normal position and size and the wheel display 424*c*, which is the other bonus game element associated with the selected symbol position indicated by the frame 416*a*/416*c*, has been caused to be initiated (as indicated by its enlarged size) and the wheel segments 426*c* of the wheel display 424*c* have been caused to rotate about a center of the wheel display 424*c* and a wheel segment 426*c* indicating a "+2 PLAYS" outcome has been selected by the pointer. As can be seen, the "plays remaining" counter has been caused to change from 6 plays remaining (see FIG. 21) to 8 plays remaining in FIG. 22 to reflect the award of the extra two plays.

Figure 23:
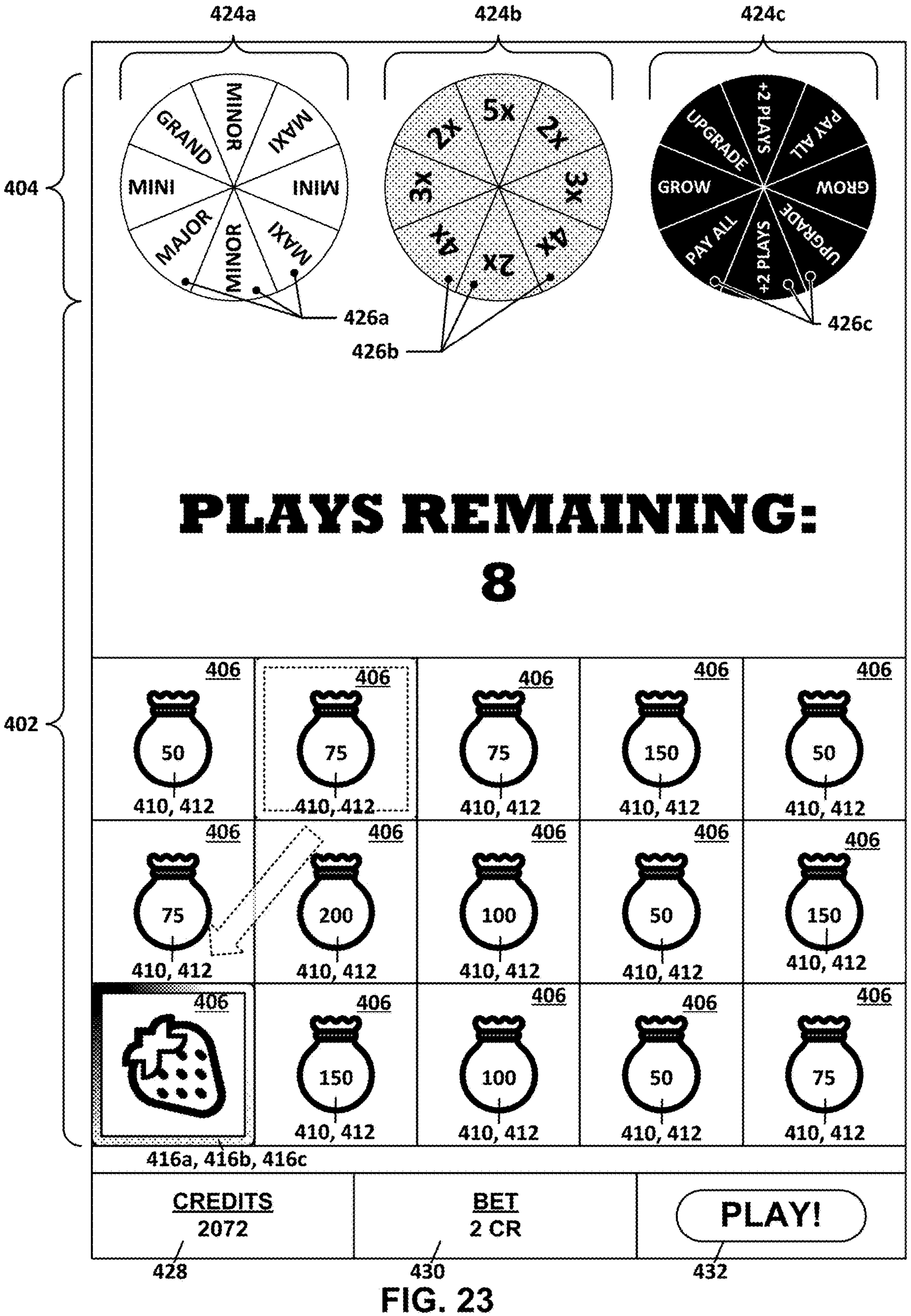

In FIG. 23, the wheel display 424*c* has been caused to return to its original size, the number of feature game plays remaining has been updated to reflect the additional two plays that have been awarded as a result of the outcome indicated by the wheel display 424*c*, and the frame(s) 416*a*/416*c* has/have been reassigned to indicate the last symbol position 406 that remains that does not display a symbol 410 of the first symbol type 412 therein. In this example, all three selected symbols are assigned to the same symbol position (the one in the lower left corner). As a result, there is a single frame that represents frames 416*a*, 416*b*, and 416*c*.

Figure 24:
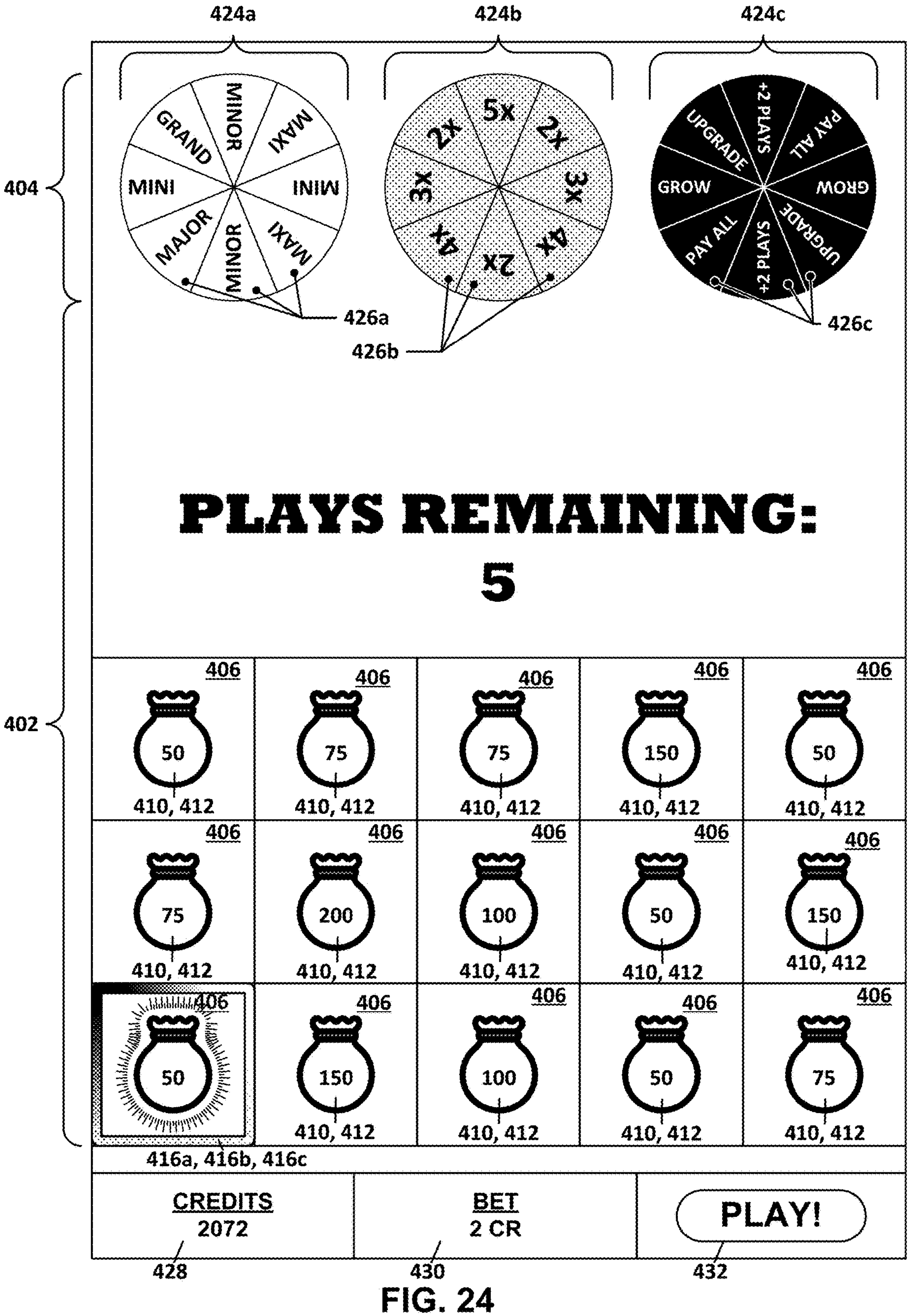

FIG. 24 depicts an outcome for a further play of the feature game in which a symbol 410 of the first symbol type 412 has been caused to be displayed in the last symbol position 406 that does not contain a symbol 410 of the first symbol type 412. It will be noted that this outcome has occurred after several additional feature game plays, as reflected in the "plays remaining" counter showing 5 plays remaining.

As the frame 416 that is associated with that symbol position 406 indicates that that symbol position 406 is the selected symbol positions that are associated with the first, second, and third bonus game elements, all three of the wheel displays 424*a*, 424*b*, and 424*c* may be activated in turn in order to provide additional awards to the player responsive to display of a symbol 410 that is of the first symbol type 412 in that symbol position 406.

Figure 25:
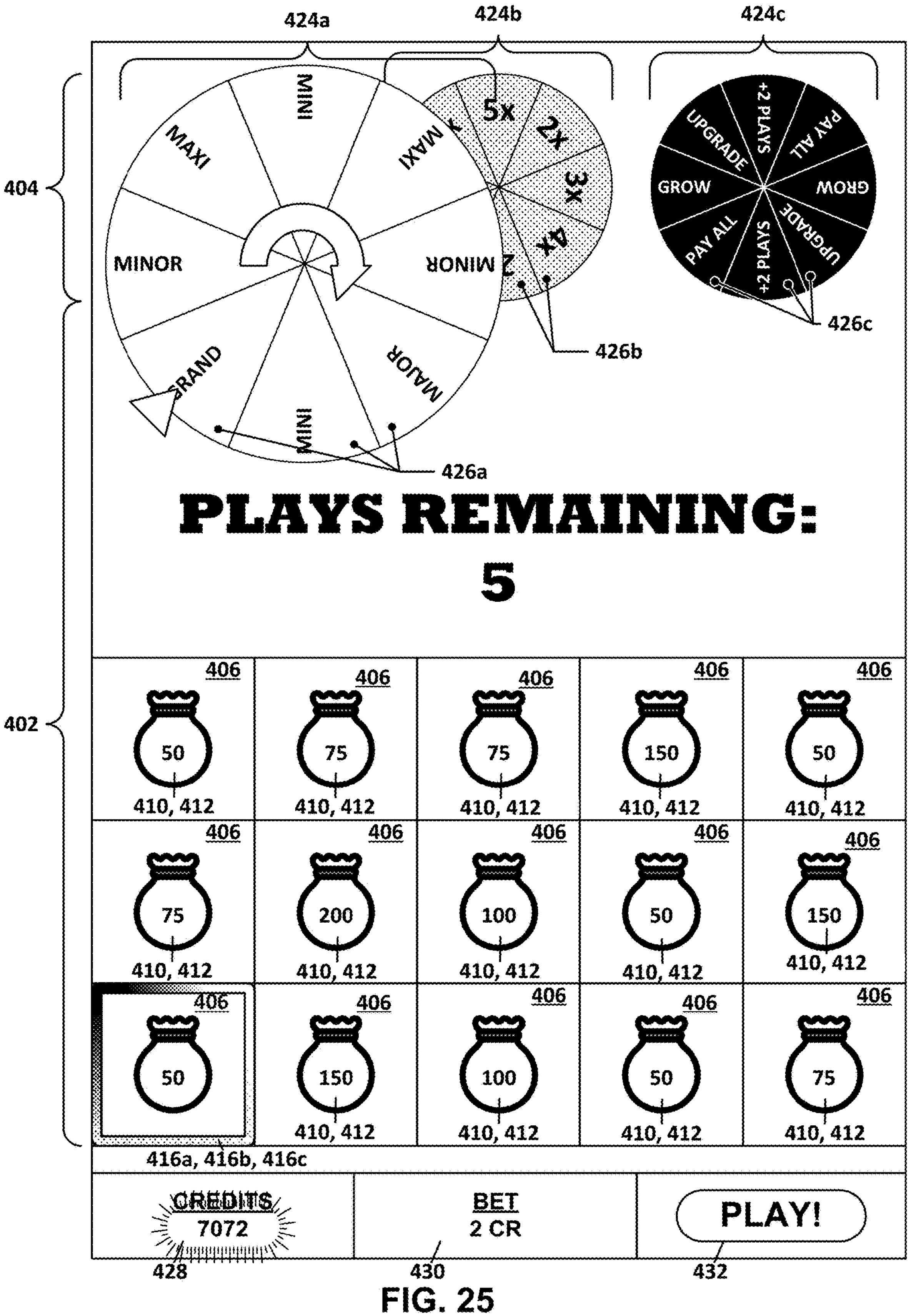

For example, as shown in FIG. 25, the first bonus game element of the three bonus game elements associated with the wheel displays 424*a*, 424*b*, and 424*c* has been caused to be initiated (as indicated by its enlarged size) and the wheel segments 426*a* of the wheel display 424*a* have been caused to rotate about a center of the wheel display 424*a* and a wheel segment 426*a* indicating a "GRAND" outcome has been selected by the pointer. The credit meter 428 has been updated to reflect an award of 5000 credits, which, in this example, is the amount of credits associated with the GRAND jackpot award. This amount is then awarded to the player, e.g., the credit meter 428 is caused to increase by the GRAND jackpot award.

Figure 26:
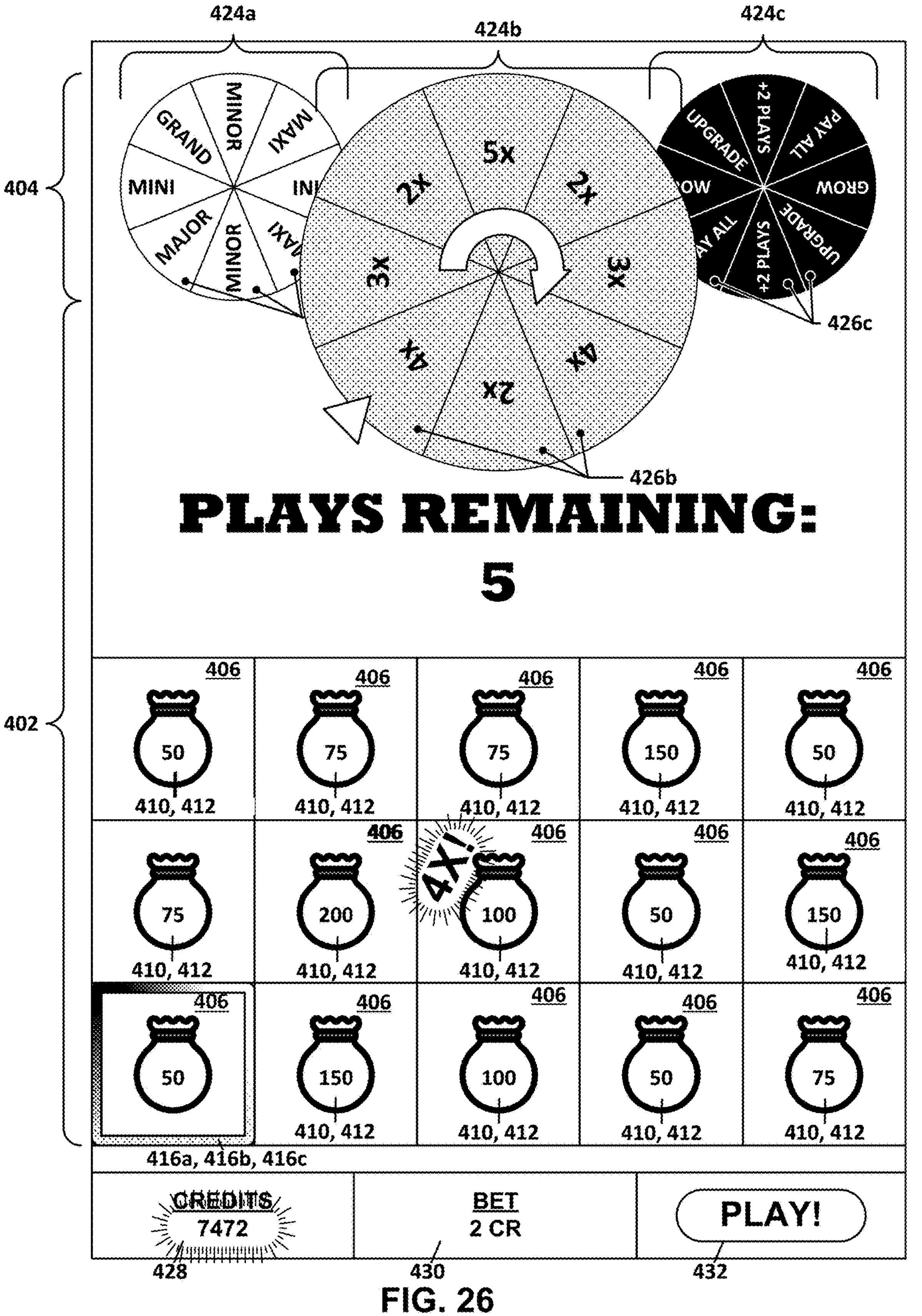

In FIG. 26, the wheel display 424*a* has been caused to return to its normal position and size and the bonus game element associated with the wheel display 424*b* has been caused to be initiated (as also indicated by its enlarged size)

and the wheel segments 426*b* of the wheel display 424*b* have been caused to rotate about a center of the wheel display 424*c* and a wheel segment 426*b* indicating a "4×" outcome has been selected by the pointer. Accordingly, a value associated with one of the symbols 410 of the first symbol type 412 may be multiplied by the indicated multiplier value (4×) and then added to the player's credit or point total reflected in the credit meter 428. In this example, the 4× multiplier value has been applied to the value (100) associated with the symbol 410 of the first symbol type 412 that is shown second from the left in the middle row of symbol positions 406. The credit meter 428 has been incremented to reflect the award of the product (400) that resulted from the application of the multiplier value to the displayed amount of that symbol 410.

Figure 27:
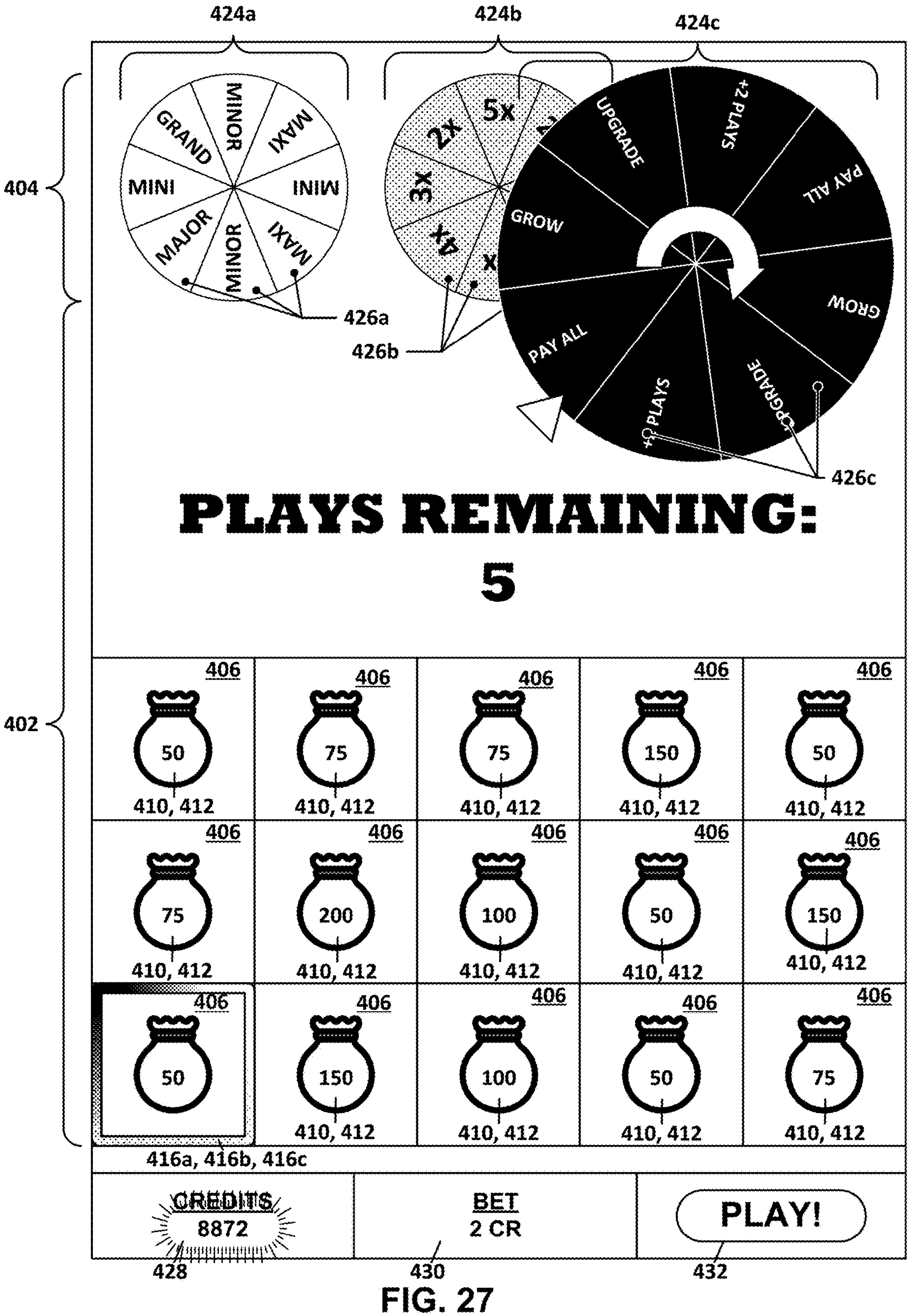

In FIG. 27, the wheel display 424*b* has been caused to return to its normal position and size and the bonus game element associated with the wheel display 424*c* has been caused to be initiated (as also indicated by its enlarged size) and the wheel segments 426*c* of the wheel display 424*c* have been caused to rotate about a center of the wheel display 424*c* and a wheel segment 426*c* indicating a "PAY ALL" outcome has been selected by the pointer. The credit meter 428 has been incremented to reflect the award of all of the amounts associated with the displayed symbols 410 of the first symbol type 412.

In many implementations, feature games such as those depicted in the above-discussed Figures may generally conclude when either all of the symbol positions 406 have symbols 410 of the first symbol type 412 displayed therein, as shown in FIG. 27, or when the player has used all available feature game plays, e.g., the "PLAYS REMAINING:" indicator indicates zero plays remaining. In either case, in some implementations, the player may be awarded the values of all of the indicated amounts associated with the symbols 410 of the first symbol type 412; this total award amount may be added to the amount indicated in the credit meter 428.

In implementations in which there is a potential for growth in the number of symbol positions 406, e.g., as a potential result of bonus game play, there is a possibility that when the last symbol position 406 that does not display a symbol 410 of the first symbol type 412 finally has such a symbol 410 displayed therein, the resulting play of the bonus game elements may result in a "growth" outcome that causes new symbol positions 406 that do not display symbols 410 of the first symbol type 412 to be added to the GUI for the feature game 402. In this circumstance, even though all of the symbol positions 406 displayed symbols 410 of the first symbol type 412 after the most recent feature game play and prior to the activation of the bonus game elements, the feature game would not be viewed as having concluded since there would be additional opportunities to land additional symbols 410 of the first symbol type 412 in the newly added symbol positions 406.

The bonus game elements discussed herein are provided in the form of wheel displays 424, but it will be understood that the bonus game elements may be provided using other types of GUI elements, e.g., reel displays. It will also be understood that certain outcomes provided by way of the bonus game elements may, in some cases, be "retired" when no longer relevant to play. For example, the wheel display 424*c* has four separate types of awards indicted-"PAY ALL," "UPGRADE," "+2 PLAYS," and "GROW." The "GROW" award, as discussed earlier, may cause additional symbol positions 406 to be added to the GUI for the feature game 402. However, there may also be an upper limit set for how many symbol positions 406 may be added to the GUI for the feature game 402—if that limit is reached, then no further symbol positions 406 may be caused to be added. In some such implementations, when the maximum number of symbol positions 406 have been added to the GUI for the feature game 402, the wheel segments 426*c* that indicate the "GROW" award may be removed and the remaining wheel segments 426*c* increased in size to fill the gaps where the removed wheel segments 426*c* were (or the wheel segments 426*c* that indicate the "GROW" award may be replaced with wheel segments 426*c* that indicate other awards, such as "UPGRADE"). This avoids a scenario where bonus game element play provides an award that ends up providing the player with no benefit.

Similarly, the "+2 PLAYS" award that may be provided may be similarly removed or otherwise made non-available for bonus game element play once such an outcome becomes irrelevant, e.g., during bonus game play when all of the symbol positions 406 display symbols 410 of the first symbol type 412. In such a scenario, earning further plays of the feature game will not provide any benefit since the feature game will conclude after the bonus game play ends. There is a possibility that there may be further feature game play after this point if the bonus game play results in more symbol positions 406 being added, but if the same bonus game element provides both the option for symbol position growth and for additional plays being awarded, the symbol position growth award and the extra plays award may be mutually exclusive outcomes.

As indicated earlier, when a symbol position 406 is selected to serve as multiple selected symbol positions, the graphical indicator(s) used to indicate that that symbol position 406 serves as those multiple selected symbol positions may be caused to have graphical characteristics that are associated with each of the bonus game elements that are associated with those selected symbol positions.

Figure 28:
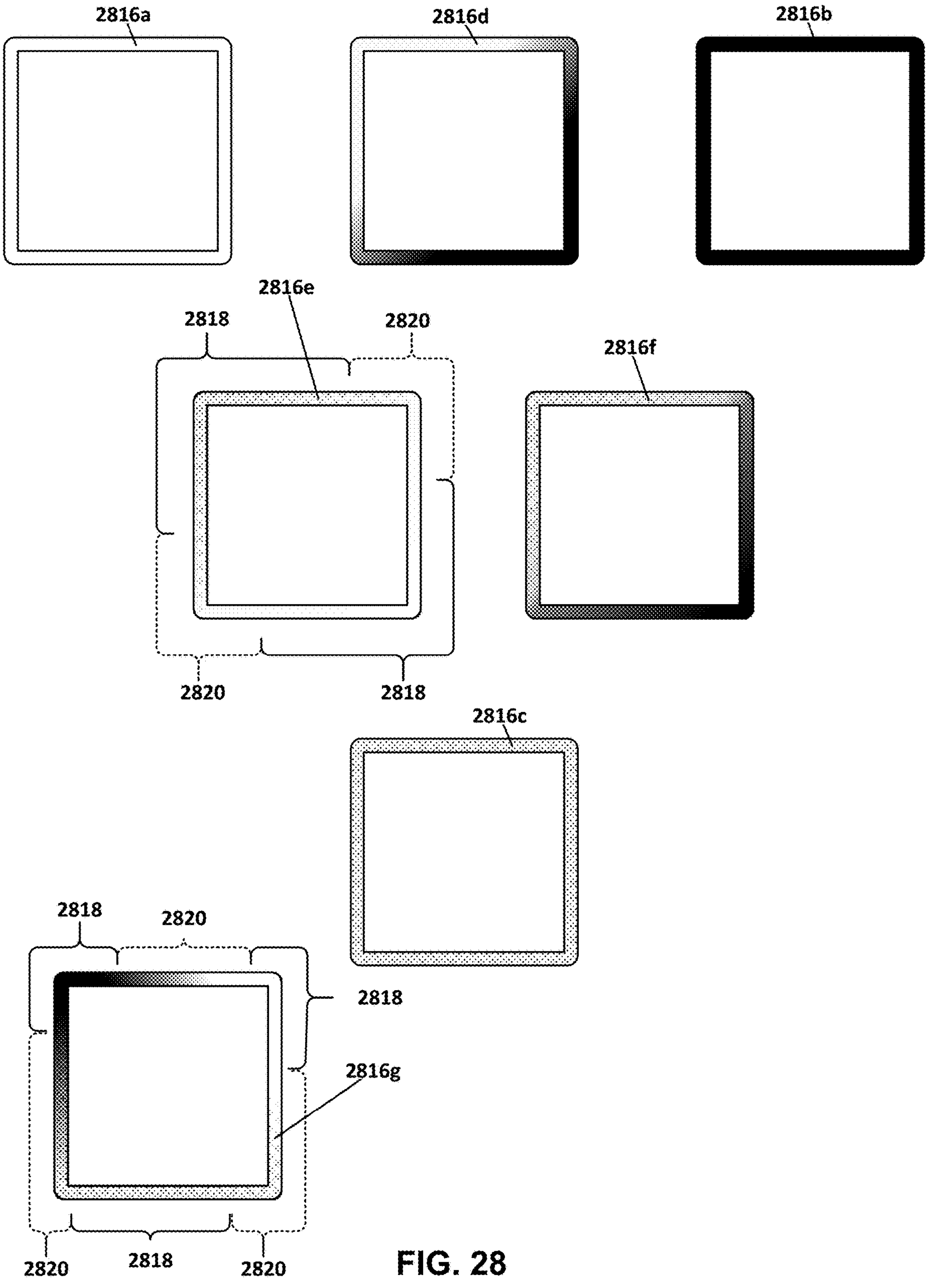
FIG. 28 depicts example frames with different graphical characteristics.

For example, in some implementations, a compact indication of which symbol positions 406 are selected symbol positions may be provided by a single frame 2816 that may exhibit the graphical characteristics that are associated with all of the selected symbol positions that the frame 2816 represents. This approach is used in the examples discussed above with respect to FIGS. 4 through 27. FIG. 28 depicts examples of such frames 2816. In FIG. 28, frames 2816 are depicted for a set of three selected symbol positions. Frames 2816*a*, 2816*b*, and 2816*c* each exhibit a single graphical characteristic, e.g., a single color, and would thus be used to indicate a symbol position that serves as a single selected symbol position. Frames 2816*d*, 2816*e*, and 2816*f* each exhibit two graphical characteristics, e.g., colors, and would thus be used to indicate a symbol position that serves as two selected symbol positions. For example, each of the frames 2816*d*, 2816*e*, and 2816*f* has first portions 2818 located along a perimeter of that frame 2816 that each exhibit a different color that corresponds to a color associated with the bonus game element associated with a corresponding one of the selected symbol positions. In this example, second portions 2820 that are interposed between the first portions 2818 along the perimeters of each of the frames 2816*d*, 2816*e*, and 2816*f* each feature a color gradient that changes from the color of one of the first portions 2818 that is adjacent to that second portion 2820 to the color of the other of the first portions 2818 that is adjacent to that second portion 2820.

The frame 2816*g* depicts an example of a frame that exhibits all three graphical characteristics of this example. For example, such a frame 2816*g* may be used to indicate a symbol position 406 that serves as all three of the selected symbol positions in this example. Accordingly, there are three first portions 2818 located along the perimeter of the frame 2816*g*, each of which exhibits a color associated with a different one of the bonus game elements. Similarly, there are three second portions 2820 that are each interposed between a different pair of adjacent first portions 2818; each such second portion may exhibit a color gradient that changes from the color of one of the first portions 2818 that is adjacent to that second portion 2820 to the color of the other of the first portions 2818 that is adjacent to that second portion 2820.

Frames such as the frames 2816*d* through 2816*g* may be aesthetically pleasing to the player, as they smoothly transition from one color to the next about their perimeters. In some such implementations, the first portions 2818 and the second portions 2820 of such frames 2816*d* through 2816*g* may be caused to animate such that the first portions 2818 and the second portions 2820 travel or move along the perimeters of the frames 2816*d* through 2816*g* in a clockwise or counter-clockwise direction (or both such directions, e.g., in an oscillatory fashion). Such implementations may more effectively draw the player's attention to the fact that a particular symbol position 406 serves as multiple selected symbol positions.

Figure 29:
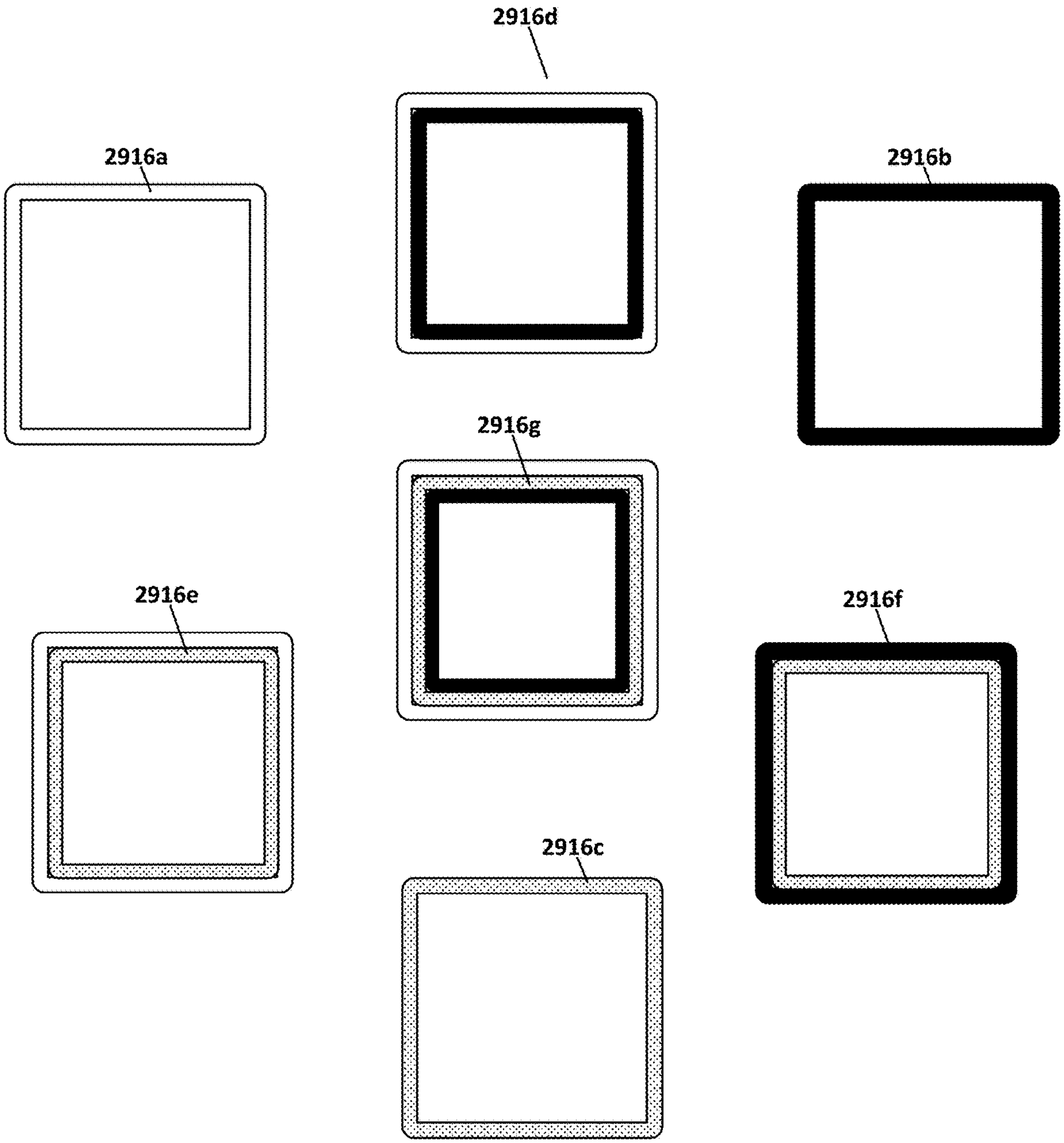
FIG. 29 depicts different example frames with different graphical characteristics.

In other implementations, e.g., as shown in FIG. 29, multiple frames, e.g., of decreasing size and each nested within another, may be placed so as to extend around the symbol position 406 that serves as the multiple selected symbol positions. Each such frame may be a different color, e.g., corresponding to the color associated with the corresponding bonus game element, thereby indicating the various bonus game elements that are associated with the selected symbol positions indicated by such frames. For example, frames 2916*a*, 2916*b*, and 2916*c*, like frames 2816*a*, 2816*b*, and 2816*c*, each exhibit a single graphical characteristic, e.g., a single color, and would thus be used to indicate a symbol position that serves as a single selected symbol position. Frames 2916*d*, 2916*e*, and 2916*f* each have an inner frame and an outer frame that each exhibit one of two graphical characteristics, e.g., colors, and would thus be used to indicate a symbol position that serves as two selected symbol positions. For example, each of the frames 2916*d*, 2916*e*, and 2916*f* has an inner frame and an outer frame that each exhibit a different color that corresponds to a color associated with a bonus game element associated with a corresponding one of the selected symbol positions indicated by that frame 2916.

The frame 2916*g* depicts an example of a frame that exhibits all three graphical characteristics of this example. For example, such a frame 2916*g* may be used to indicate a symbol position 406 that serves as all three of the selected symbol positions in this example. Accordingly, the frame 2916*g* includes an inner frame, an outer frame, and a middle frame interposed between the inner and outer frames. Each of the inner frame, the middle frame, and the outer frame may exhibit a color associated with a different one of the bonus game elements. 2920.

In yet another example, a frame may be caused to exhibit multiple graphical characteristics, but separated in time. For example, a frame that represents two or more selected symbol positions may be caused to change colors, switching between the colors associated with each bonus game element associated with each selected symbol position represented by the symbol position enclosed within the frame.

In some implementations, an activated bonus game element may be made no longer available and its associated selected symbol position may be deactivated after the current bonus game element activation is resolved, e.g., a prize awarded, and when there are no symbol positions 406 left that do not display symbols 410 of the first symbol type 412 and that are not selected symbol positions. In such implementations, none of the symbol positions 406 would serve as more than one selected symbol position.

Once the bonus game has concluded, the GUI for the bonus game 404 may be caused to transition back to the GUI for the base game 400 (potentially with an intermediate transition to the GUI for the feature game 402, e.g., to provide awards of each value associated with the displayed symbols 410 of the first symbol type 412).

Various additional variations of the GUIs discussed above may be provided in some implementations. For example, in some implementations, the GUI for the base game 400 may periodically be caused to provide the player with one of several potential benefits, e.g., changing one or more displayed symbols to be "wild" symbols that may act as any other symbol for the purposes of determining winning combinations of symbols along paylines such as payline 414, applying a multiplier to all payline wins earned in one or more base game plays, or changing a sufficient number of non-first symbol type 412 symbols 410 to be symbols 410 of the first symbol type 412 to trigger the feature game. In some implementations, such benefits may be awarded randomly, e.g., each base game play may have a random chance of having such a benefit being provided to the player randomly. In some such implementations, an animated mascot or other character may be caused to be displayed in the GUI for the feature game in association with each time such a benefit is provided, e.g., the animated character may be caused to appear to sprinkle "wild" symbols or symbols 410 of the first symbol type 412 across the field of symbol positions 406 that then drift downward to land on the symbol positions 406 that are to receive such symbols.

In some implementations, the base game may also include a "boost" mode that may be activated responsive to one or more boost mode activation criteria being satisfied. In some implementations, the boost mode may have a random chance of being activated in a given base game play, whereas in other implementations, the boost mode may be activated responsive to a player-initiated request, e.g., the player may purchase activation of the boost mode using, for example, credits, non-cashable social gaming currency, a coupon, or a single-use code. Once activated, the boost mode may last for a given number of base game plays, e.g., three, four, five, six, seven, eight, etc. plays. The base game may be configured such that while the boost mode is activated, each play of the base game will result in one or more of the benefits that may normally be randomly triggerable to be provided to the player. In other words, the player is guaranteed to receive at least one such benefit during each base game play while the boost mode is active.

In some such implementations, if the feature game is activated or triggered as a result of a base game play that occurred while boost mode was still active (or as the result of a base game play that occurred while boost mode was active), the feature game may be caused to be presented in an enhanced reward mode in which each selected symbol position that is indicated, e.g., by a frame, is treated as being a selected symbol position for all of the potential bonus game elements. Thus, for example, if a symbol 410 of the first symbol type 412 is displayed in any selected symbol position while boost mode is active, then each bonus game element will be activated in response (instead of only the bonus game element for a single selected symbol position).

For example, in the examples discussed above, outcomes from the wheel segments 426 of all three wheel displays 424 may be selected and awarded to the player responsive to each new display of a symbol 410 of the first symbol type 412 in any of the selected symbol positions while the boost mode is active. If symbols 410 of the first symbol type 412 are displayed in multiple selected symbol positions as a result of a common play of the feature game, then all of the bonus game elements may be activated for each such symbol display. For example, if symbols 410 of the first symbol type 412 are displayed as a result of a play of the feature game in two separate symbol positions 406 that are each a selected symbol position, then each bonus game element, e.g., wheel display 424, may be activated twice, once for each such symbol position 406.

It will be recognized that a variety of underlying mechanisms may be used to determine outcomes for games such as those described above. However, one potential approach that may be followed is outlined below.

In some implementations, a plurality of different sets of ordered sequences of symbols, e.g., reel strip sets, may be defined; during base game play, subsets of symbols may be selected from each ordered sequence of symbols and displayed in the symbol positions 406. Such reel strip sets may, for example, be designed to produce different base game play experiences, e.g., having a greater or lesser likelihood of triggering the feature game or having a greater or lesser chance of generating a winning symbol pattern during base game play, when symbols are selected for display in the symbol positions 406 of the columns from the reel strip sets. Generally speaking, each set of ordered sequences of symbols may have one ordered sequence of symbols for each column of symbol positions 406. When such a set of ordered sequences of symbols is used to determine an outcome for the base game, a block of sequentially adjacent symbols (as discussed earlier) may be selected from each ordered sequence of symbols and the symbols in that block of sequentially adjacent symbols may then be displayed, in the same sequence, in the symbol positions 406 of a corresponding one of the columns (and as noted earlier, such ordered sequences may be circular or modulo sequences such that when blocks of sequentially adjacent symbols are selected that straddle the start or end of the sequence, symbols from the other of the start or end of the sequence are used to complete the block of symbols).

There may, in some implementations, be a plurality of sets of ordered sequences of symbols that may be usable for selecting symbols for display in the columns of symbol positions 406 for each play of the base game. The particular set of ordered sequences of symbols that is used for symbol selection for any given play of the base game may, in some instances, be randomly selected from the plurality of sets of ordered sequences of symbols in association with that play of the base game. Such random selection may, for example, be a weighted random selection in which weighting factors assigned to each set of ordered sequences of symbols may determine the likelihood of any particular ordered sequence of symbols being randomly selected from the plurality of sets of ordered sequences of symbols.

In some implementations, a plurality of different sets of symbols may be defined for use in selecting symbols during feature game plays. For example, a different set of symbols may be defined for each combination of the number of symbol positions 406 that display symbols 410 of the first symbol type 412 and what the selection status is for the symbol position 406 for which a symbol 410 is to be selected and displayed. For example, if the above example GUI implementation is expandable to potentially have a total of 25 symbol positions, e.g., through "GROW" bonus game outcomes, the number of sets of symbols 410 for each selection status may be equal to the total number of symbol positions 406 minus one and minus the number of symbol positions 406 that will always have a symbol 410 of the first symbol type 412 therein. For example, in the earlier-discussed example, six symbols 410 are needed to trigger the feature game-thus, there will always be at least six symbols 410 held in the feature game. There may thus be separate sets of symbols 410 for use in selecting a symbol 410 for display in any given symbol position 406 that correspond to when 6 such symbols 410 are held, when 7 such symbols 410 are held, when 8 such symbols 410 are held, and so forth. In FIGS. 30-A through 30-J, notional examples are provided of such symbol sets; each symbol set is represented by a percentage chance of a symbol 410 of the first symbol type 412 being randomly selected from that symbol set (put another way, the percentage chance represents the weighting, out of 100%, that a symbol 410 of the first symbol type 412 will be randomly selected). For example, there are symbol sets for eight different symbol position selection statuses reflected in FIGS. 30-A through 30-J. FIG. 30-A provides symbol sets for use in selecting a symbol that is to be displayed in a symbol position 406 that is not a selected symbol position, FIGS. 30-B through 30-D provide symbol sets for use in selecting a symbol that is to be displayed in a symbol position that serves as a single selected symbol position (each of these symbol sets may be used when selecting a symbol for a different one of three different selected symbol positions), FIGS. 30-E through 30-G provide symbol sets for use in selecting a symbol that is to be displayed in a symbol position that serves as a dual selected symbol position (e.g., as indicated by a frame that has graphical characteristics corresponding to those of two different bonus game elements), and FIG. 30-H provides symbol sets for use in selecting a symbol that is to be displayed in a symbol position that serves as a triple-selected symbol position (this example assumes there are three selected symbol positions that may be assigned to symbol positions 406, e.g., as in the example GUI discussed above). FIGS. 30-I and 30-J provide symbol sets for use in selecting symbols during enhanced reward mode (as described above) that, respectively, are to be displayed in symbol positions that are not selected symbol positions or that are to be displayed in symbol positions that serve as triple-selected symbol positions.

As can be seen, each of FIGS. 30-A through 30-J shows nineteen different symbol sets—each one corresponds to a different number of held symbols being displayed in the GUI for the feature game 402. For example, if a symbol is to be selected for display in a symbol position 406 that serves as both selected symbol position A and selected symbol position B and there were, prior to the current play of the feature game, 13 symbols 410 of the first symbol type 412 displayed, the symbol 410 would be randomly selected from the symbol set represented by the "#Held Symbols" of 13 in FIG. 30-E, e.g., yielding a 7% chance that a symbol 410 of the first symbol type 412 would be selected.

Such an approach allows for the frequency with which symbols 410 of the first symbol type 412 are selected during play to be tuned with a high level of granularity and control, thereby allowing the gameplay experience to be managed so as to maintain a frequent-enough occurrence of symbols 410 of the first symbol type 412 that gameplay is still enjoyable to players but not so frequent that the game does not present a challenge.

The outcomes of the bonus game elements may similarly be tunable. For example, FIGS. 31-A through 31-C depict sets of weighting percentages that may be used to govern how likely each wheel segment of a wheel display is to be selected if a random selection is made from the wheel segments of that wheel display. There may at least be as many such sets as the maximum number of symbol positions 410 that may be displayed in the GUI for the feature game (e.g., if there is a "GROW" feature that has been activated to the maximum extent possible) minus the minimum number of symbol positions 406 in which a symbol 410 of the first symbol type 412 is displayed. For example, if the bonus game element is triggered in the example discussed earlier, there will be at least seven symbols 410 of the first symbol type 412 displayed—the six used to trigger play of the feature game and one further such symbol 410 that causes the bonus game element to trigger. In this example, this means there would be a minimum of nineteen such sets (assuming there are no duplicates).

However if greater control over bonus game element outcomes is desired, different sets of bonus game element outcome weightings may be referenced depending on how large the array of symbol positions 406 is. For example, FIG. 31-A depicts bonus game element outcome weightings that may be used when selecting a particular bonus game element outcome in a feature game having a "GROW" feature that has not yet been triggered (there are thus, in this example, 15 symbol positions 406 visible/in play). FIG. 31-B depicts bonus game element outcome weightings that may be used when selecting a particular bonus game element outcome for the feature game when the "GROW" feature has been caused to trigger once, resulting in 20 symbol positions 406 being visible/in play. FIG. 31-C depicts bonus game element outcome weightings that may be used when selecting a particular bonus game element outcome for the feature game when the "GROW" feature has been caused to trigger twice, resulting in 25 symbol positions 406 being visible/in play. Regardless of which set of bonus game element weightings is used, the weightings that are selected for determining a bonus game element outcome may be selected based on the number of symbol positions 406 that display a symbol 410 of the first symbol type 412. For example, if the "GROW" feature has been caused to trigger once and there are 16 symbols 410 of the first symbol type 412 displayed in the symbol positions 406, an outcome for a bonus game element play would be selected according to the weightings reflected in FIG. 31-B in the column headed by the number 16.

Similarly constructed bonus game element weighting tables may be utilized to select outcomes for other bonus game elements as well—the weighting sets depicted in FIGS. 31-A through 31-C represent a potential example of such weightings for use with a wheel display similar to the wheel display 424*c* discussed earlier. It will be noted, for example, that the weightings for selecting the "GROW" outcomes from the wheel display 424*c* in FIG. 31-C are zero since the GUI for the feature game 402 only permits two potential "GROW" feature activations.

It will be appreciated that the sets of symbols referred to above may be a list of symbols, with each instance of a symbol in the list having an equal chance of being randomly selected, or may be a weighted list, e.g., with symbols in the list having unequal chances of being randomly selected. In some instances, the set of symbols may have only two symbols-symbols of the first symbol type and symbols of a type other than the first symbol type. In some implementations, the latter may be a "blank" symbol. In implementations with only two symbols, different weights may be assigned to the two symbols such that they each have a corresponding probability of being randomly selected during play of the feature game.

As is evident from FIGS. 31-A through 31-C, the selection of a particular bonus game element outcome for a bonus game element may also be by weighted random selection. For example, in the wheel display 424 and as discussed above, the wheel segments 426 in each set of wheel segments 426 may be assigned weights that govern how likely each wheel segment 426 is to be selected during a given bonus game play.

It will be understood that the various GUIs and game mechanics discussed herein may be implemented entirely locally, e.g., by a processor or processors of a single device, such as a smartphone, or may be provided using processors located in different devices or systems. Information regarding the selection of symbols, awards associated with special symbols, etc., may be transmitted, e.g., via a network connection (wired, wireless, or a mixture of both) to another device, e.g., a smartphone, the processor or processors of which may then implement the GUI and/or feature game mechanic using the information regarding the symbols, awards, etc. Such information may be generated and/or sent in response to receipt of a request from such another device, e.g., a request from a smartphone for the server to provide such information. Such distributed-computing implementations of the GUI provisioning techniques discussed herein is to be understood to also be within the scope of this disclosure.

It will be appreciated that in such distributed computing arrangements, the computer-executable instructions for implementing the GUI may be distributed between different memory devices located in different devices, e.g., the computer-executable instructions for selecting symbols stored on one or more memory devices of a server, while the computer-executable instructions for presenting the GUI may be stored on one or more memory devices of a client gaming device, e.g., a smartphone.

In recognition of the possibility of such distributed processing arrangements, the term "collectively," as used herein with reference to memory devices and/or processors or various other items, should be understood to indicate that the referenced collection of items has the characteristics or provides the functionalities that are associated with that collection. For example, if a server and a client device collectively store instructions for causing A, B, and C to occur, this encompasses at least the following scenarios:

a) The server stores instructions for causing A, B, and C to occur, but the client device stores no instructions that cause A, B, and C to occur.

b) The client device stores instructions for causing A, B, and C to occur, but the server stores no instructions that cause A, B, and C to occur.

c) The server stores instructions for causing a proper subset of A, B, and C to occur, e.g., A and B but not C, and the client device stores instructions that cause a different proper subset of A, B, and C to occur, e.g., C but not A and B, where instructions for causing each of A, B, and C to occur are respectively stored on either or both the client device and the server.

d) The server stores instructions for causing a subset of A, B, and C to occur, e.g., A and B but not C, and the client device stores instructions that cause a different subset of A, B, and C to occur, e.g., B and C but not A, where instructions for causing each of A, B, and C to occur are respectively stored on either or both the client device and the server.

e) The server stores instructions for causing A and a portion of B to occur, and the client device stores instructions that cause C and the remaining portion of B to occur.

In all of the above scenarios, between the server and the client device, there are, collectively, instructions that are stored for causing A, B, and C to occur, i.e., such instructions are stored on one or both devices and it will be recognized that using the term "collectively," e.g., the server and the client device, collectively, store instructions for causing A, B, and C to occur, encompasses all of the above scenarios as well as additional, similar scenarios.

Similarly, a collection of processors, e.g., a first set of one or more processors and a second set of one or more processors, may be caused, collectively, to, perform one or more actions, e.g., actions A, B, and C. As with the previous example, various permutations fall within the scope of such "collective" language:

a) The first set of one or more processors may be caused to perform each of A, B, and C, and the second set of one or more processors may not perform any of A, B, or C.

b) The second set of one or more processors may be caused to perform each of A, B, and C, and the first set of one or more processors may not perform any of A, B, or C.

c) The first set of one or more processors may be caused to perform a proper subset of A, B, and C, and the second set of one or more processors may be caused to perform a different proper subset of A, B, and C to be performed such that between the two sets of processors, all of A, B, and C are caused to be performed.

d) The first set of one or more processors may be caused to perform A and a portion of B, and the second set of one or more processors may be caused to perform C and the remainder of B.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more displays;

one or more processors; and one or more memory devices, the one or more memory devices storing computer-executable instructions which, when executed by the one or more processors, cause the one or more processors to:

cause a graphical user interface (GUI) for a feature game to be presented on the one or more displays, the GUI for the feature game including a plurality of symbol positions and indicating at least one selected symbol position of the plurality of symbol positions, wherein a symbol of a first type of symbol is displayed in one or more of the symbol positions other than the at least one selected symbol position, cause, for each symbol position not displaying the first type of symbol and responsive to receipt of a signal indicating a play of the feature game, a symbol to be selected from a corresponding plurality of symbols and displayed in that symbol position, and cause, responsive to each selection and display of a symbol of the first type of symbol in the selected symbol position or one of the selected symbol positions when there is at least one symbol position not displaying the first type of symbol, the GUI for the feature game to change to indicate a different symbol position that is not displaying the first type of symbol as that selected symbol position.

2. The system of claim 1, wherein the at least one selected symbol position includes at least a first selected symbol position and a second selected symbol position.

3. The system of claim 2, wherein the at least one selected symbol position further includes at least a third selected symbol position.

4. The system of claim 3, wherein:

the one or more memory devices further store additional computer-executable instructions which, when executed by the one or more processors, further cause the one or more processors to, when causing the GUI for the feature game to indicate a particular one of the first selected symbol position, the second selected symbol position, and the third selected symbol position, cause:

the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

5. The system of claim 1, wherein:

the at least one selected symbol position is a plurality of selected symbol positions, and the one or more memory devices further store additional computer-executable instructions which, when executed by the one or more processors, further cause the one or more processors to, when causing the GUI for the feature game to indicate a particular one of the selected symbol positions, cause:

the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular selected symbol position, and the GUI to indicate, when all of the symbol positions not displaying the first type of symbol are indicated as being one or more of the selected symbol positions, one of the other selected symbol positions as the particular selected symbol position.

6. The system of claim 5, wherein the one or more memory devices further store additional computer-executable instructions which, when executed by the one or more processors, further cause the one or more processors to cause, for each of the symbol positions that is one or more of the selected symbol positions, a corresponding graphical indicator that designates that symbol position as such to be displayed.

7. The system of claim 6, wherein:

each selected symbol position is associated with a corresponding graphical characteristic, each corresponding graphical characteristic is different from the other corresponding graphical characteristic or characteristics, and the one or more memory devices further store additional computer-executable instructions which, when executed by the one or more processors, further cause the one or more processors to:

cause each graphical indicator that designates a symbol position of the symbol positions that serves as only a single selected symbol position of the plurality of selected symbol positions to have the corresponding graphical characteristic for that single selected symbol position, and cause each graphical indicator that designates a symbol position of the symbol positions that serves as multiple selected symbol positions of the plurality of selected symbol positions to have the corresponding graphical characteristics for those multiple selected symbol positions.

8. The system of claim 7, wherein:

each corresponding graphical characteristic is a different color, and the one or more memory devices further store additional computer-executable instructions which, when executed by the one or more processors, further cause the one or more processors to cause each graphical indicator that designates a symbol position that serves as multiple selected symbol positions to have multiple first portions that are each one of the colors associated with those multiple selected symbol positions.

9. The system of claim 8, wherein each graphical indicator is a frame that encloses all or part of the symbol position that is designated thereby as being one or more of the selected symbol positions.

10. A method comprising:

causing, by one or more processors, a graphical user interface (GUI) for a feature game to be presented on one or more displays, the GUI for the feature game including a plurality of symbol positions and indicating at least one selected symbol position of the plurality of symbol positions, wherein a symbol of a first type of symbol is displayed in one or more of the symbol positions other than the at least one selected symbol position;

causing, by the one or more processors and for each symbol position not displaying the first type of symbol and responsive to receipt of a signal indicating a play of the feature game, a symbol to be selected from a corresponding plurality of symbols and displayed in that symbol position, wherein at least one of the corresponding pluralities of symbols includes at least one first type of symbol; and causing, by the one or more processors and responsive to each selection and display of a symbol of the first type of symbol in the selected symbol position or one of the selected symbol positions when there is at least one symbol position not displaying the first type of symbol, the GUI for the feature game to change to indicate a different symbol position that is not displaying the first type of symbol as that selected symbol position.

11. The method of claim 10, wherein the at least one selected symbol position includes at least a first selected symbol position and a second selected symbol position.

12. The method of claim 11, wherein the at least one selected symbol position further includes at least a third selected symbol position.

13. The method of claim 12, further comprising causing the one or more processors to, when causing the GUI for the feature game to indicate a particular one of the first selected symbol position, the second selected symbol position, and the third selected symbol position, cause:

the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

14. The method of claim 10, wherein:

the at least one selected symbol position is a plurality of selected symbol positions, and the method further comprises further causing the one or more processors to, when causing the GUI for the feature game to indicate a particular one of the selected symbol positions, cause:

the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular selected symbol position, and the GUI to indicate, when all of the symbol positions not displaying the first type of symbol are indicated as being one or more of the selected symbol positions, one of the other selected symbol positions as the particular selected symbol position.

15. The method of claim 14, further comprising causing the one or more processors to cause, for each of the symbol positions that is one or more of the selected symbol positions, a corresponding graphical indicator that designates that symbol position as such to be displayed.

16. The method of claim 15, wherein:

each selected symbol position is associated with a corresponding graphical characteristic, each corresponding graphical characteristic is different from the other corresponding graphical characteristic or characteristics, and the method further includes causing the one or more processors to:

cause each graphical indicator that designates a symbol position of the symbol positions that serves as only a single selected symbol position of the plurality of selected symbol positions to have the corresponding graphical characteristic for that single selected symbol position, and cause each graphical indicator that designates a symbol position of the symbol positions that serves as multiple selected symbol positions of the plurality of selected symbol positions to have the corresponding graphical characteristics for those multiple selected symbol positions.

17. One or more computer-readable media storing computer-executable instructions which, when executed by one or more processors, cause the one or more processors to:

cause a graphical user interface (GUI) for a feature game to be presented on one or more displays, the GUI for the feature game including a plurality of symbol positions and indicating at least one selected symbol position of the plurality of symbol positions, wherein a symbol of a first type of symbol is displayed in one or more of the symbol positions other than the at least one selected symbol position, cause, for each symbol position not displaying the first type of symbol and responsive to receipt of a signal indicating a play of the feature game, a symbol to be selected from a corresponding plurality of symbols and displayed in that symbol position, wherein at least one of the corresponding pluralities of symbols includes at least one first type of symbol, and cause, responsive to each selection and display of a symbol of the first type of symbol in the selected symbol position or one of the selected symbol positions when there is at least one symbol position not displaying the first type of symbol, the GUI for the feature game to change to indicate a different symbol position that is not displaying the first type of symbol as that selected symbol position.

18. The one or more computer-readable media of claim 17, wherein the at least one selected symbol position includes at least a first selected symbol position and a second selected symbol position.

19. The one or more computer-readable media of claim 18, wherein the at least one selected symbol position further includes at least a third selected symbol position.

20. The one or more computer-readable media of claim 19, wherein the one or more computer-readable media further store additional computer-executable instructions which, when executed by the one or more processors, further cause the one or more processors to, when causing the GUI for the feature game to indicate a particular one of the first selected symbol position, the second selected symbol position, and the third selected symbol position, cause:

the GUI to indicate, when there is at least one of the symbol positions that is not indicated as being one or more of the at least one selected symbol position and not displaying the first type of symbol, one of the one or more symbol positions that are not indicated as being one or more of the selected symbol positions and that are not displaying the first type of symbol to be indicated as the particular one of the first selected symbol position, the second selected symbol position, and the third selected symbol position, and the GUI to also indicate, when each of the symbol positions not displaying the first type of symbol is indicated as being one or more of the first selected symbol position, the second selected symbol position, and the third selected symbol position, one of the other selected symbol positions as the particular selected symbol position.

* * * * *